US012647583B2

(12) United States Patent
Kim et al.

(10) Patent No.: US 12,647,583 B2
(45) Date of Patent: Jun. 2, 2026

(54) METHOD, APPARATUS, AND RECORDING MEDIUM FOR REGION-BASED DIFFERENTIAL IMAGE ENCODING/DECODING

(71) Applicant: Electronics and Telecommunications Research Institute, Daejeon (KR)

(72) Inventors: Youn-Hee Kim, Daejeon (KR); Seung-Hyun Cho, Daejeon (KR); Hyunsuk Ko, Daejeon (KR); Hyoung-Jin Kwon, Daejeon (KR); Dong-Hyun Kim, Daejeon (KR); Jong-Ho Kim, Daejeon (KR); Joo-Young Lee, Daejeon (KR); Se-Yoon Jeong, Daejeon (KR); Tae-Jin Lee, Daejeon (KR); Jin-Soo Choi, Daejeon (KR)

(73) Assignee: ELECTRONICS and TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/782,568

(22) PCT Filed: Dec. 7, 2020

(86) PCT No.: PCT/KR2020/017795
§ 371 (c)(1),
(2) Date: Jun. 3, 2022

(87) PCT Pub. No.: WO2021/112652
PCT Pub. Date: Jun. 10, 2021

(65) Prior Publication Data
US 2023/0052774 A1 Feb. 16, 2023

(30) Foreign Application Priority Data

Dec. 5, 2019 (KR) ........................ 10-2019-0161042
Dec. 7, 2020 (KR) ........................ 10-2020-0169643

(51) Int. Cl.
*H04N 19/30* (2014.01)
*H04N 19/119* (2014.01)
(Continued)

(52) U.S. Cl.
CPC ........... *H04N 19/30* (2014.11); *H04N 19/119* (2014.11); *H04N 19/14* (2014.11); *H04N 19/147* (2014.11); *H04N 19/17* (2014.11); *H04N 19/42* (2014.11)

(58) Field of Classification Search
CPC .............. H04N 19/105; H04N 19/117; H04N 19/119; H04N 19/14; H04N 19/147;
(Continued)

(56) References Cited

U.S. PATENT DOCUMENTS 8,411,735 B2 4/2013 Ono et al.
8,878,928 B2 11/2014 Kang et al.
(Continued)

FOREIGN PATENT DOCUMENTS

CN 109922339 A 6/2019
JP 2006140805 A 6/2006
(Continued)

*Primary Examiner* — Shahan Ur Rahaman
(74) *Attorney, Agent, or Firm* — Sughrue Mion, PLLC

(57) ABSTRACT

Disclosed herein are a video-decoding method and apparatus and a video encoding method and apparatus, and more particularly a method and an apparatus which perform region-differential image encoding/decoding using a recovered image. In accordance with an encoding method according to an embodiment, a recovered low-quality image is generated by performing encoding on an original image and a recovered high-quality image is generated using the recov- (Continued)

ered low-quality image. An image is segmented into multiple regions, and encoded reconstruction information for generating a reconstructed high-quality image is generated by performing encoding on the image.

15 Claims, 43 Drawing Sheets

(51) Int. Cl.

| | | |
|---|---|---|
| *H04N 19/14* | (2014.01) |
| *H04N 19/147* | (2014.01) |
| *H04N 19/17* | (2014.01) |
| *H04N 19/42* | (2014.01) |

(58) Field of Classification Search
CPC ........ H04N 19/17; H04N 19/30; H04N 19/42; H04N 19/82; H04N 19/85
See application file for complete search history.

(56) References Cited

U.S. PATENT DOCUMENTS

| | | | |
|---|---|---|---|
| 8,879,838 B2 | 11/2014 | Park et al. |
| 10,225,565 B2 | 3/2019 | Lee et al. |
| 10,992,962 B2 | 4/2021 | Xue et al. |
| 11,250,595 B2 | 2/2022 | Covell et al. |

| | | | | |
|---|---|---|---|---|
| 2011/0228859 | A1* | 9/2011 | Sugimoto | H04N 19/159 |
| | | | | 375/240.26 |
| 2013/0301702 | A1* | 11/2013 | Minoo | H04N 19/119 |
| | | | | 375/240.02 |
| 2016/0065962 | A1* | 3/2016 | Lei | H04N 19/105 |
| | | | | 375/240.03 |
| 2016/0065976 | A1* | 3/2016 | He | H04N 19/187 |
| | | | | 375/240.12 |
| 2016/0191929 | A1* | 6/2016 | Hwang | H04N 21/4622 |
| | | | | 725/110 |
| 2016/0212458 | A1 | 7/2016 | Kwon et al. |
| 2017/0332075 | A1* | 11/2017 | Karczewicz | H04N 19/70 |
| 2019/0273948 | A1* | 9/2019 | Yin | G06N 3/045 |
| 2020/0236349 | A1* | 7/2020 | Zhai | H04N 19/172 |
| 2020/0374552 | A1* | 11/2020 | Skupin | H04N 19/132 |

FOREIGN PATENT DOCUMENTS

| | | | |
|---|---|---|---|
| JP | 2007221495 A | 8/2007 |
| JP | 2012257120 A | 12/2012 |
| JP | 2013066092 A | 4/2013 |
| KR | 100929078 B1 | 11/2009 |
| KR | 1020130089461 A | 8/2013 |
| KR | 10-2017-0047489 A | 5/2017 |
| KR | 1020190033403 A | 3/2019 |
| KR | 1020190133044 A | 11/2019 |
| WO | 2013115560 A1 | 8/2013 |
| WO | 2018099772 A1 | 6/2018 |
| WO | 2019197674 A1 | 10/2019 |

* cited by examiner

510

DIAGONAL SCANNING

HORIZONTAL SCANNING

VERTICAL SCANNING

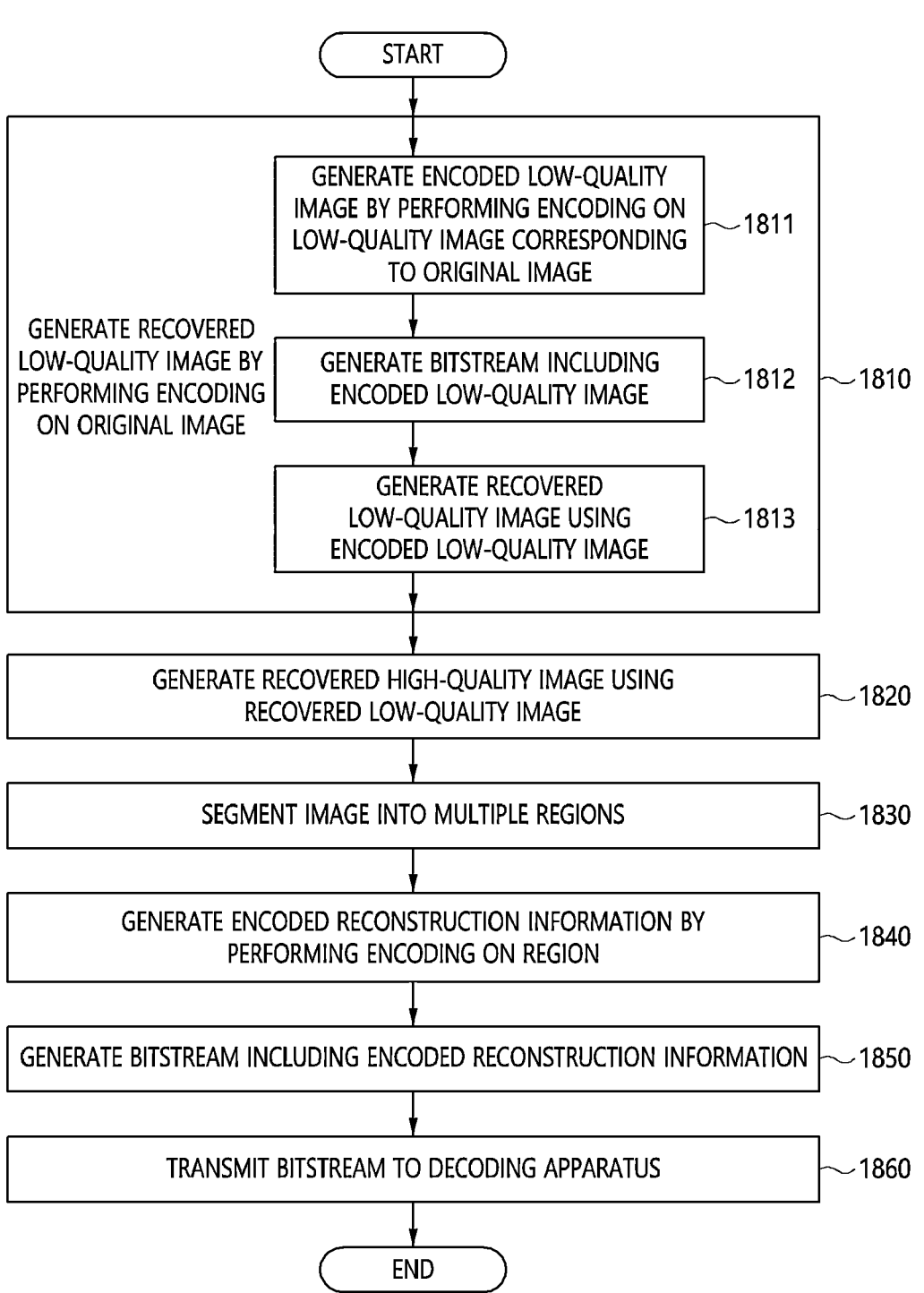

START

GENERATE RECOVERED LOW-QUALITY IMAGE BY PERFORMING ENCODING ON ORIGINAL IMAGE

GENERATE ENCODED LOW-QUALITY IMAGE BY PERFORMING ENCODING ON LOW-QUALITY IMAGE CORRESPONDING TO ORIGINAL IMAGE — 1811

GENERATE BITSTREAM INCLUDING ENCODED LOW-QUALITY IMAGE — 1812

GENERATE RECOVERED LOW-QUALITY IMAGE USING ENCODED LOW-QUALITY IMAGE — 1813

1810

GENERATE RECOVERED HIGH-QUALITY IMAGE USING RECOVERED LOW-QUALITY IMAGE — 1820

SEGMENT IMAGE INTO MULTIPLE REGIONS — 1830

GENERATE ENCODED RECONSTRUCTION INFORMATION BY PERFORMING ENCODING ON REGION — 1840

GENERATE BITSTREAM INCLUDING ENCODED RECONSTRUCTION INFORMATION — 1850

TRANSMIT BITSTREAM TO DECODING APPARATUS — 1860

END

FIG. 18

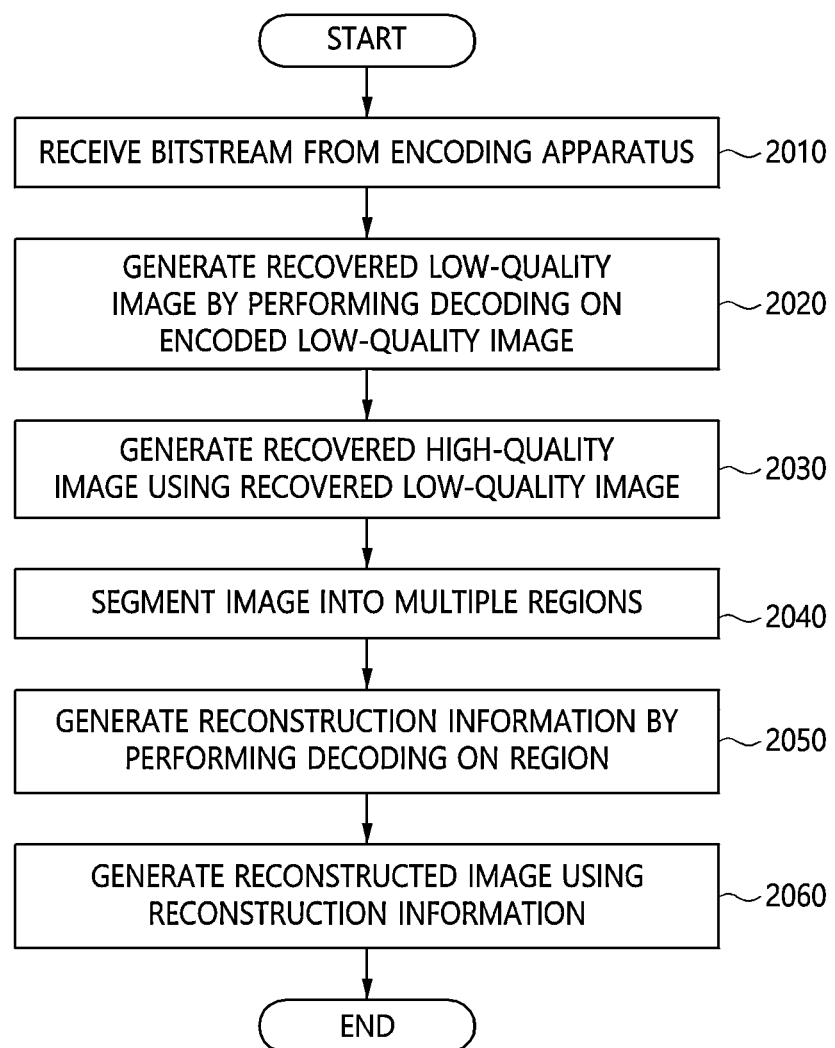

START

RECEIVE BITSTREAM FROM ENCODING APPARATUS ~2010

GENERATE RECOVERED LOW-QUALITY
IMAGE BY PERFORMING DECODING ON
ENCODED LOW-QUALITY IMAGE ~2020

GENERATE RECOVERED HIGH-QUALITY
IMAGE USING RECOVERED LOW-QUALITY IMAGE ~2030

SEGMENT IMAGE INTO MULTIPLE REGIONS ~2040

GENERATE RECONSTRUCTION INFORMATION BY
PERFORMING DECODING ON REGION ~2050

GENERATE RECONSTRUCTED IMAGE USING
RECONSTRUCTION INFORMATION ~2060

END

FIG. 20

| seq_parameter_set_rbsp( ) { | DESCRIPTOR |
|---|---|
| ... | |
| base_bitstream_type | u(1) |
| ... | |
| } | |

FIG. 38

| coding_unit(x0, y0, log2CbSize{ | DESCRIPTOR |
|---|---|
| ... | |
| if( CuPredMode[x0][y0] == MODE_INTRA) { | |
| SRARcopy_flag[x0][y0] | ae(v) |
| if( !SRARcopy_flag[x0][y0]) { | |
| intra_chroma_pred_mode[x0][y0] | ae(v) |
| rqt_root_cbf | ae(v) |
| } | |
| if(rqt_root_cbf){ | |
| MaxTrafoDepth = max_transform_hierachy_depth_intra+IntraSplitFlag | |
| transform_tree(x0, y0, x0, y0, log2CbSize,0,0) | |
| } | |
| ... | |
| } | |

FIG. 39

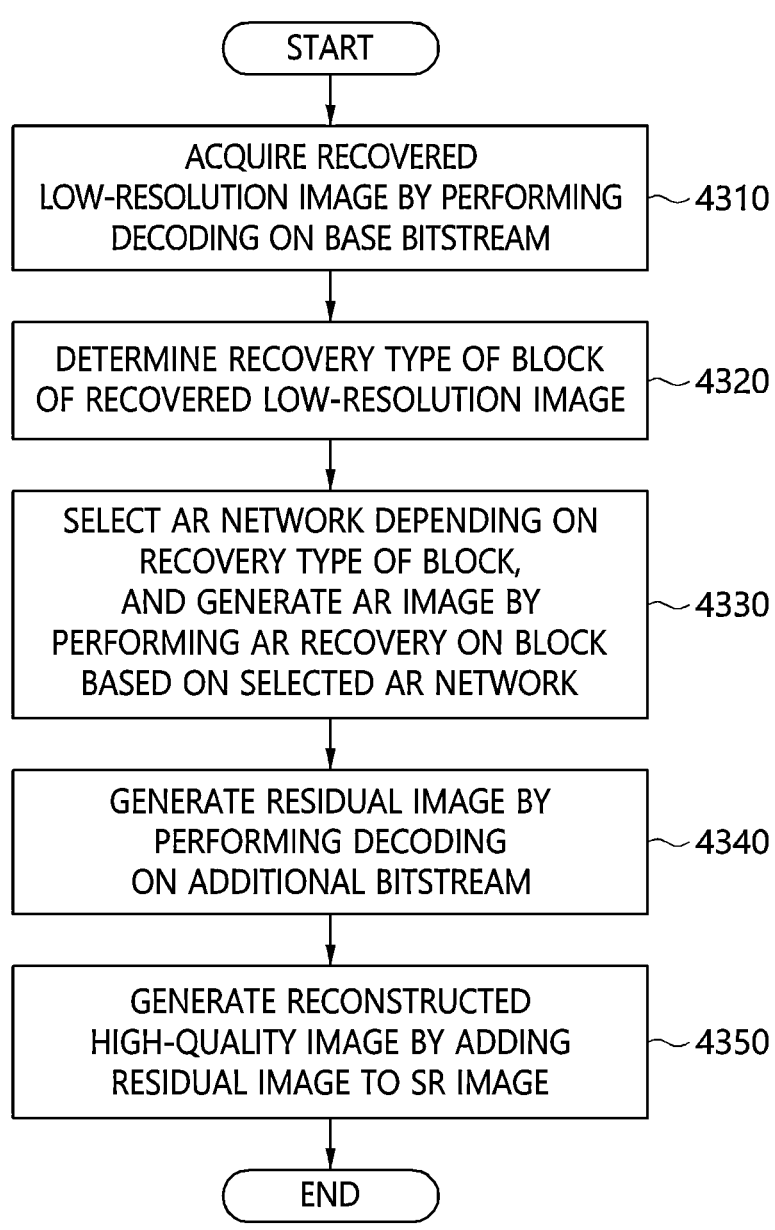

START

ACQUIRE RECOVERED
LOW-RESOLUTION IMAGE BY PERFORMING
DECODING ON BASE BITSTREAM — 4310

DETERMINE RECOVERY TYPE OF BLOCK
OF RECOVERED LOW-RESOLUTION IMAGE — 4320

SELECT AR NETWORK DEPENDING ON
RECOVERY TYPE OF BLOCK,
AND GENERATE AR IMAGE BY
PERFORMING AR RECOVERY ON BLOCK
BASED ON SELECTED AR NETWORK — 4330

GENERATE RESIDUAL IMAGE BY
PERFORMING DECODING
ON ADDITIONAL BITSTREAM — 4340

GENERATE RECONSTRUCTED
HIGH-QUALITY IMAGE BY ADDING
RESIDUAL IMAGE TO SR IMAGE — 4350

END

FIG. 43

METHOD, APPARATUS, AND RECORDING MEDIUM FOR REGION-BASED DIFFERENTIAL IMAGE ENCODING/DECODING

TECHNICAL FIELD

The present disclosure relates generally to a method, an apparatus and a storage medium for image encoding/decoding. More particularly, the present disclosure relates to a method, an apparatus and a storage medium for providing a region-differential image encoding/decoding using a recovered image.

This application claims the benefit of Korean Patent Application No. 10-2019-0161042, filed Dec. 5, 2019, and 10-2020-0169643, filed Dec. 7, 2020, which are hereby incorporated by reference in their entireties into this application.

BACKGROUND ART

With the continuous development of the information and communication industries, broadcasting services supporting High-Definition (HD) resolution have been popularized all over the world. Through this popularization, a large number of users have become accustomed to high-resolution and high-definition images and/or video.

To satisfy users' demand for high definition, many institutions have accelerated the development of next-generation imaging devices. Users' interest in UHD TVs, having resolution that is more than four times as high as that of Full HD (FHD) TVs, as well as High-Definition TVs (HDTV) and FHD TVs, has increased. As interest therein has increased, image encoding/decoding technology for images having higher resolution and higher definition is currently required.

As image compression technology, there are various technologies, such as inter prediction technology, intra prediction technology, transform, quantization technology, and entropy coding technology.

Inter prediction technology is technology for predicting the value of a pixel included in a current picture using a picture previous to and/or a picture subsequent to the current picture. Intra prediction technology is technology for predicting the value of a pixel included in a current picture using information about pixels in the current picture. Transform and quantization technology may be technology for compressing the energy of a residual image. The entropy coding technology is technology for assigning a short codeword to a frequently occurring value and assigning a long codeword to a less frequently occurring value.

By utilizing this image compression technology, data about images may be effectively compressed, transmitted, and stored.

Technology for recovering a super-resolution image is technology for recovering a high-quality image using a low-quality image. A machine-learning method may be applied to recovery of a super-resolution image.

DISCLOSURE

Technical Problem

An embodiment is intended to provide a method and an apparatus for performing encoding and decoding using the content of an image.

An embodiment is intended to provide a method and an apparatus for segmenting an image into multiple regions based on image features and semantic analysis for images and thereafter performing region-differential encoding and decoding on respective multiple regions.

An embodiment is intended to provide a method and an apparatus for segmenting an image into regions and performing encoding and decoding on the regions using a method suitable for the features of respective regions.

An embodiment is intended to provide a method and an apparatus for selecting a super-resolution recovered image as a prediction image through various methods so as to improve coding efficiency for regions of an image.

An embodiment is intended to provide a method and an apparatus for performing processing of reducing distortion on a low-bitrate image having high coding distortion so as to improve coding efficiency for regions of an image, and for utilizing a distortion-reduced image as a prediction image.

An embodiment is intended to provide a method and an apparatus for encoding and decoding a prediction image on a block basis.

Technical Solution

In accordance with an aspect, there is provided an encoding method, including generating a recovered low-quality image by performing encoding on an original image; generating a recovered high-quality image using the recovered low-quality image; segmenting an image into multiple regions; generating encoded reconstruction information by performing encoding on a region; and generating a bitstream including the encoded reconstruction information, wherein the region is at least one of the multiple regions and the image is the original image, the recovered low-quality image or the recovered high-quality image.

The bitstream may include an encoded low-quality image.

The encoded low-quality image may be an encoded low-resolution image or an encoded low-bitrate image.

The bitstream may include type information indicating which one of the encoded low-resolution image and the encoded low-bitrate image is included in the bitstream.

When the encoded low-quality image is the encoded low-resolution image, the recovered high-quality image may be a recovered high-resolution image.

When the encoded low-quality image is the encoded low-bitrate image, the recovered high-quality image may be a coding-distortion-corrected image.

A map for the image may be generated by performing segmentation on the image.

The map may indicate multiple regions.

Different encoding methods may be used for respective multiple regions.

Edge power of the image may be calculated and the map is changed based on the edge power.

The map may be changed based on semantic segmentation in the image.

When the encoded low-quality image is an encoded low-resolution image, differential recovery from low resolution to high resolution may be performed on the image based on the map.

When the encoded low-quality image is an encoded low-bitrate image, differential correction may be performed on coding distortion occurring in the image based on the map.

Encoding may be performed on respective multiple regions using different neural networks.

In accordance with another aspect, there is provided a storage medium storing a bitstream generated by the encoding method.

In accordance with a further aspect, there is provided a decoding method, including receiving a bitstream including an encoded low-quality image; generating a recovered low-quality image by performing decoding on the encoded low-quality image; generating a recovered high-quality image using the recovered low-quality image; segmenting an image into multiple regions; generating reconstruction information by performing decoding on a region; and generating a reconstructed image using the reconstruction information, wherein the region is at least one of the multiple regions and the image is the recovered low-quality image or the recovered high-quality image.

The encoded low-quality image may be an encoded low-resolution image or an encoded low-bitrate image.

The bitstream may include type information indicating which one of the encoded low-resolution image and the encoded low-bitrate image is included in the bitstream.

When the encoded low-quality image is the encoded low-resolution image, the recovered high-quality image may be a recovered high-resolution image.

When the encoded low-quality image is the encoded low-bitrate image, the recovered high-quality image may be a coding-distortion-corrected image.

A map for the image may be generated by performing segmentation on the image.

The map may indicate multiple regions.

Different decoding methods may be used for respective multiple regions.

Edge power of the image may be calculated and the map is changed based on the edge power.

The map may be changed based on semantic segmentation in the image.

When the encoded low-quality image is an encoded low-resolution image, differential recovery from low resolution to high resolution may be performed on the image based on the map.

When the encoded low-quality image is an encoded low-bitrate image, differential correction may be performed on coding distortion occurring in the image based on the map.

Decoding may be performed on respective multiple regions using different neural networks.

In accordance with yet another aspect, there is provided a computer-readable storage medium storing a bitstream, wherein the bitstream includes an encoded low-quality image, a recovered low-quality image is generated by performing decoding on the encoded low-quality image, a recovered high-quality image is generated using the recovered low-quality image, an image is segmented into multiple regions, reconstruction information is generated by performing decoding on a region, a reconstructed image is generated using the reconstruction information, the region is at least one of the multiple regions, and the image is the recovered low-quality image or the recovered high-quality image.

Advantageous Effects

There are provided a method and an apparatus for performing encoding and decoding using the content of an image.

There are provided a method and an apparatus for segmenting an image into multiple regions based on image features and semantic analysis for images and thereafter performing region-differential encoding and decoding on respective multiple regions.

There are provided a method and an apparatus for segmenting an image into regions and performing encoding and decoding on the regions using a method suitable for the features of respective regions.

There are provided a method and an apparatus for selecting a super-resolution recovered image as a prediction image through various methods so as to improve coding efficiency for regions of an image.

There are provided a method and an apparatus for performing processing of reducing distortion on a low-bitrate image having high coding distortion so as to improve coding efficiency for regions of an image, and for utilizing a distortion-reduced image as a prediction image.

There are provided a method and an apparatus for encoding and decoding a prediction image on a block basis.

DESCRIPTION OF DRAWINGS

FIG. 18 is a flowchart of an encoding method according to an embodiment;

FIG. 20 is a flowchart of a decoding method according to an embodiment;

FIG. 30 illustrates a reconstructed image for quantization parameter (qp) 37 in HEVC according to an example;

FIG. 31 illustrates a reconstructed high-quality image for qp 37 in low-resolution HEVC according to an example:

FIG. 33 illustrates an original image according to an example;

FIG. 34 illustrates a recovered high-resolution image obtained using SR recovery according to an example:

FIG. 35 illustrates edge power of a recovered high-resolution image according to an example:

FIG. 36 illustrates the results of segmenting a recovered high-resolution image into regions according to an example;

FIG. 38 illustrates the syntax for signaling the type of a base bitstream according to an example:

FIG. 39 illustrates signaling information for coding of SR copying and SR prediction according to an example;

FIG. 43 is a flowchart of a decoding method for a low-bitrate bitstream according to an example.

MODE FOR INVENTION

Figure 1:
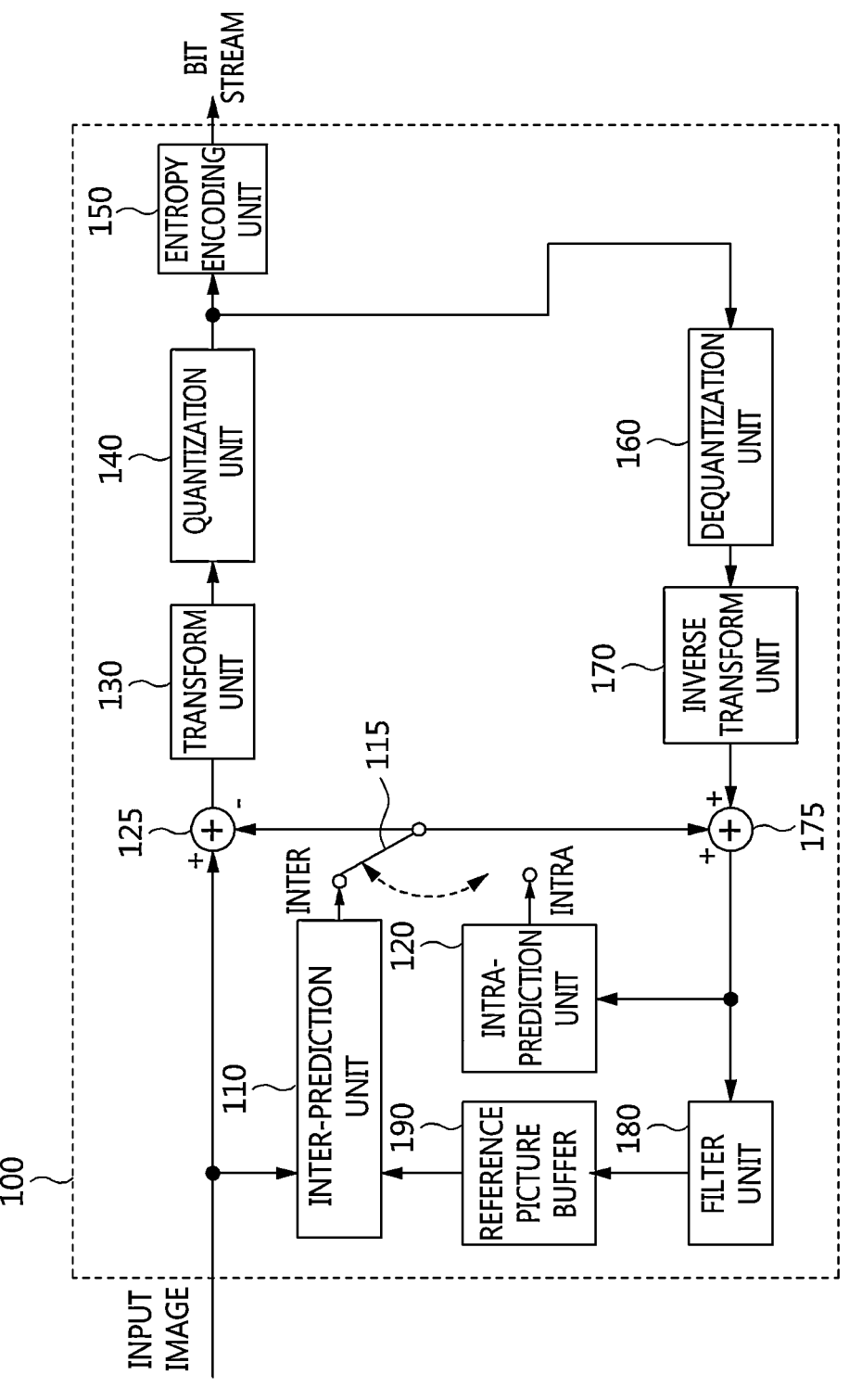
FIG. 1 is a block diagram illustrating the configuration of an embodiment of an encoding apparatus to which the present disclosure is applied.

The present invention may be variously changed, and may have various embodiments, and specific embodiments will be described in detail below with reference to the attached drawings. However, it should be understood that those embodiments are not intended to limit the present invention to specific disclosure forms, and that they include all changes, equivalents or modifications included in the spirit and scope of the present invention.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but do not need to be mutually exclusive of each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

Terms such as "first" and "second" may be used to describe various components, but the components are not restricted by the terms. The terms are used only to distinguish one component from another component. For example, a first component may be named a second component without departing from the scope of the present specification. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. On the other hand, it will be understood that when a component is referred to as being "directly connected or coupled", no intervening components are present between the two components.

Components described in the embodiments are independently shown in order to indicate different characteristic functions, but this does not mean that each of the components is formed of a separate piece of hardware or software. That is, the components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

Further, in the exemplary embodiments, an expression describing that a component "comprises" a specific component means that additional components may be included within the scope of the practice or the technical spirit of exemplary embodiments, but does not preclude the presence of components other than the specific component.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. That is, in the present invention, an expression describing that a component "comprises" a specific component means that additional components may be included within the scope of the practice of the present invention or the technical spirit of the present invention, but does not preclude the presence of components other than the specific component.

Some components of the present invention are not essential components for performing essential functions, but may be optional components for improving only performance. The embodiments may be implemented using only essential components for implementing the essence of the embodiments. For example, a structure including only essential components, excluding optional components used only to improve performance, is also included in the scope of the embodiments.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted. Further, the same reference numerals are used to designate the same components throughout the drawings, and repeated descriptions of the same components will be omitted.

Hereinafter, "image" may mean a single picture constituting a video, or may mean the video itself. For example, "encoding and/or decoding of an image" may mean "encoding and/or decoding of a video", and may also mean "encoding and/or decoding of any one of images constituting the video".

Hereinafter, the terms "video" and "motion picture" may be used to have the same meaning, and may be used interchangeably with each other.

Hereinafter, a target image may be an encoding target image, which is the target to be encoded, and/or a decoding target image, which is the target to be decoded. Further, the target image may be an input image that is input to an encoding apparatus or an input image that is input to a decoding apparatus. And, a target image may be a current image, that is, the target to be currently encoded and/or decoded. For example, the terms "target image" and "current image" may be used to have the same meaning, and may be used interchangeably with each other.

Hereinafter, the terms "image", "picture", "frame", and "screen" may be used to have the same meaning and may be used interchangeably with each other.

Hereinafter, a target block may be an encoding target block, i.e. the target to be encoded and/or a decoding target block, i.e. the target to be decoded. Further, the target block may be a current block, i.e. the target to be currently encoded and/or decoded. Here, the terms "target block" and "current block" may be used to have the same meaning, and may be used interchangeably with each other. A current block may denote an encoding target block, which is the target of encoding, during encoding and/or a decoding target block, which is the target of decoding, during decoding. Also, the current block may be at least one of a coding block, a prediction block, a residual block, and a transform block.

Hereinafter, the terms "block" and "unit" may be used to have the same meaning, and may be used interchangeably with each other. Alternatively, "block" may denote a specific unit.

Hereinafter, the terms "region" and "segment" may be used interchangeably with each other.

In the following embodiments, specific information, data, a flag, an index, an element, and an attribute may have their respective values. A value of "0" corresponding to each of the information, data, flag, index, element, and attribute may indicate a false, a logical false or a first predefined value. In other words, the value of "0", false, logical false, and a first predefined value may be used interchangeably with each other. A value of "1" corresponding to each of the information, data, flag, index, element, and attribute may indicate a true, a logical true or a second predefined value. In other words, the value of "1", true, logical true, and a second predefined value may be used interchangeably with each other.

When a variable such as i or j is used to indicate a row, a column, or an index, the value of i may be an integer of 0 or more or an integer of 1 or more. In other words, in the embodiments, each of a row, a column, and an index may be counted from 0 or may be counted from 1.

In embodiments, the term "one or more" or the term "at least one" may mean the term "plural". The term "one or more" or the term "at least one" may be used interchangeably with "plural".

Below, the terms to be used in embodiments will be described.

Encoder. An encoder denotes a device for performing encoding. That is, an encoder may mean an encoding apparatus.

Decoder: A decoder denotes a device for performing decoding. That is, a decoder may mean a decoding apparatus.

Unit: A unit may denote the unit of image encoding and decoding. The terms "unit" and "block" may be used to have the same meaning, and may be used interchangeably with each other.

A unit may be an M×N array of samples. Each of M and N may be a positive integer. A unit may typically mean an array of samples in the form of two-dimensions.

In the encoding and decoding of an image, "unit" may be an area generated by the partitioning of one image. In other words, "unit" may be a region specified in one image. A single image may be partitioned into multiple units. Alternatively, one image may be partitioned into sub-parts, and the unit may denote each partitioned sub-part when encoding or decoding is performed on the partitioned sub-part.

In the encoding and decoding of an image, predefined processing may be performed on each unit depending on the type of the unit.

Depending on functions, the unit types may be classified into a macro unit, a Coding Unit (CU), a Prediction Unit (PU), a residual unit, a Transform Unit (TU), etc. Alternatively, depending on functions, the unit may denote a block, a macroblock, a coding tree unit, a coding tree block, a coding unit, a coding block, a prediction unit, a prediction block, a residual unit, a residual block, a transform unit, a transform block, etc. For example, a target unit, which is the target of encoding and/or decoding, may be at least one of a CU, a PU, a residual unit, and a TU.

The term "unit" may mean information including a luminance (luma) component block, a chrominance (chroma) component block corresponding thereto, and syntax elements for respective blocks so that the unit is designated to be distinguished from a block.

The size and shape of a unit may be variously implemented. Further, a unit may have any of various sizes and shapes. In particular, the shapes of the unit may include not only a square, but also a geometric figure that can be represented in two dimensions (2D), such as a rectangle, a trapezoid, a triangle, and a pentagon.

Further, unit information may include one or more of the type of a unit, the size of a unit, the depth of a unit, the order of encoding of a unit and the order of decoding of a unit, etc. For example, the type of a unit may indicate one of a CU, a PU, a residual unit and a TU.

One unit may be partitioned into sub-units, each having a smaller size than that of the relevant unit.

Depth: A depth may mean an extent to which the unit is partitioned. Further, the depth of the unit may indicate the level at which the corresponding unit is present when unit(s) are represented by a tree structure.

Unit partition information may include a depth indicating the depth of a unit. A depth may indicate the number of times the unit is partitioned and/or the degree to which the unit is partitioned.

In a tree structure, it may be considered that the depth of a root node is the smallest, and the depth of a leaf node is the largest. The root node may be the highest (top) node. The leaf node may be a lowest node.

A single unit may be hierarchically partitioned into multiple sub-units while having depth information based on a tree structure. In other words, the unit and sub-units, generated by partitioning the unit, may correspond to a node and child nodes of the node, respectively. Each of the partitioned sub-units may have a unit depth. Since the depth indicates the number of times the unit is partitioned and/or the degree to which the unit is partitioned, the partition information of the sub-units may include information about the sizes of the sub-units.

In a tree structure, the top node may correspond to the initial node before partitioning. The top node may be referred to as a "root node". Further, the root node may have a minimum depth value. Here, the top node may have a depth of level '0'.

A node having a depth of level '1' may denote a unit generated when the initial unit is partitioned once. A node having a depth of level '2' may denote a unit generated when the initial unit is partitioned twice.

A leaf node having a depth of level 'n' may denote a unit generated when the initial unit has been partitioned n times.

The leaf node may be a bottom node, which cannot be partitioned any further. The depth of the leaf node may be the maximum level. For example, a predefined value for the maximum level may be 3.

A QT depth may denote a depth for a quad-partitioning. A BT depth may denote a depth for a binary-partitioning. A TT depth may denote a depth for a ternary-partitioning.

Sample: A sample may be a base unit constituting a block. A sample may be represented by values from 0 to $2^{Bd}$-1 depending on the bit depth (Bd).

A sample may be a pixel or a pixel value.

Hereinafter, the terms "pixel" and "sample" may be used to have the same meaning, and may be used interchangeably with each other.

A Coding Tree Unit (CTU): A CTU may be composed of a single luma component (Y) coding tree block and two chroma component (Cb, Cr) coding tree blocks related to the luma component coding tree block. Further, a CTU may mean information including the above blocks and a syntax element for each of the blocks.

Each coding tree unit (CTU) may be partitioned using one or more partitioning methods, such as a quad tree (QT), a binary tree (BT), and a ternary tree (TT) so as to configure sub-units, such as a coding unit, a prediction unit, and a transform unit. A quad tree may mean a quarternary tree. Further, each coding tree unit may be partitioned using a multitype tree (MIT) using one or more partitioning methods.

"CTU" may be used as a term designating a pixel block, which is a processing unit in an image-decoding and encoding process, as in the case of partitioning of an input image.

Coding Tree Block (CTB): "CTB" may be used as a term designating any one of a Y coding tree block, a Cb coding tree block, and a Cr coding tree block.

Neighbor block: A neighbor block (or neighboring block) may mean a block adjacent to a target block. A neighbor block may mean a reconstructed neighbor block.

Hereinafter, the terms "neighbor block" and "adjacent block" may be used to have the same meaning and may be used interchangeably with each other.

A neighbor block may mean a reconstructed neighbor block.

Spatial neighbor block; A spatial neighbor block may a block spatially adjacent to a target block. A neighbor block may include a spatial neighbor block.

The target block and the spatial neighbor block may be included in a target picture.

The spatial neighbor block may mean a block, the boundary of which is in contact with the target block, or a block located within a predetermined distance from the target block.

The spatial neighbor block may mean a block adjacent to the vertex of the target block. Here, the block adjacent to the vertex of the target block may mean a block vertically adjacent to a neighbor block which is horizontally adjacent to the target block or a block horizontally adjacent to a neighbor block which is vertically adjacent to the target block.

Temporal neighbor block: A temporal neighbor block may be a block temporally adjacent to a target block. A neighbor block may include a temporal neighbor block.

The temporal neighbor block may include a co-located block (col block).

The col block may be a block in a previously reconstructed co-located picture (col picture). The location of the col block in the col-picture may correspond to the location of the target block in a target picture. Alternatively, the location of the col block in the col-picture may be equal to the location of the target block in the target picture. The col picture may be a picture included in a reference picture list.

The temporal neighbor block may be a block temporally adjacent to a spatial neighbor block of a target block.

Prediction mode: The prediction mode may be information indicating the mode in which encoding and/or decoding are performed for intra prediction, or the mode in which encoding and/or decoding are performed for inter prediction.

Prediction unit: A prediction unit may be a base unit for prediction, such as inter prediction, intra prediction, inter compensation, intra compensation, and motion compensation.

A single prediction unit may be divided into multiple partitions having smaller sizes or sub-prediction units. The multiple partitions may also be base units in the performance of prediction or compensation. The partitions generated by dividing the prediction unit may also be prediction units.

Prediction unit partition: A prediction unit partition may be the shape into which a prediction unit is divided.

Reconstructed neighbor unit: A reconstructed neighbor unit may be a unit which has already been decoded and reconstructed neighboring a target unit.

A reconstructed neighbor unit may be a unit that is spatially adjacent to the target unit or that is temporally adjacent to the target unit.

A reconstructed spatial neighbor unit may be a unit which is included in a target picture and which has already been reconstructed through encoding and/or decoding.

A reconstructed temporal neighbor unit may be a unit which is included in a reference image and which has already been reconstructed through encoding and/or decoding. The location of the reconstructed temporal neighbor unit in the reference image may be identical to that of the target unit in the target picture, or may correspond to the location of the target unit in the target picture. Also, a reconstructed temporal neighbor unit may be a block neighboring the corresponding block in a reference image. Here, the location of the corresponding block in the reference image may correspond to the location of the target block in the target image. Here, the fact that the locations of blocks correspond to each other may mean that the locations of the blocks are identical to each other, may mean that one block is included in another block, or may mean that one block occupies a specific location in another block.

Sub-picture: a picture may be divided into one or more sub-pictures. A sub-picture may be composed of one or more tile rows and one or more tile columns.

A sub-picture may be a region having a square or rectangular (i.e., a non-square rectangular) shape in a picture. Further, a sub-picture may include one or more CTUs.

A single sub-picture may include one or more tiles, one or more bricks, and/or one or more slices.

Tile: A tile may be a region having a square or rectangular (i.e., a non-square rectangular) shape in a picture.

A tile may include one or more CTUs.

A tile may be partitioned into one or more bricks.

Brick: A brick may denote one or more CTU rows in a tile.

A tile may be partitioned into one or more bricks. Each brick may include one or more CTU rows.

A tile that is not partitioned into two parts may also denote a brick.

Slice: A slice may include one or more tiles in a picture. Alternatively, a slice may include one or more bricks in a tile.

Parameter set: A parameter set may correspond to header information in the internal structure of a bitstream.

A parameter set may include at least one of a video parameter set (VPS), a sequence parameter set (SPS), a picture parameter set (PPS), an adaptation parameter set (APS), a decoding parameter set (DPS), etc.

Information signaled through each parameter set may be applied to pictures which refer to the corresponding parameter set. For example, information in a VPS may be applied to pictures which refer to the VPS. Information in an SPS may be applied to pictures which refer to the SPS. Information in a PPS may be applied to pictures which refer to the PPS.

Each parameter set may refer to a higher parameter set. For example, a PPS may refer to an SPS. An SPS may refer to a VPS.

Further, a parameter set may include a tile group, slice header information, and tile header information. The tile group may be a group including multiple tiles. Also, the meaning of "tile group" may be identical to that of "slice".

Rate-distortion optimization: An encoding apparatus may use rate-distortion optimization so as to provide high coding efficiency by utilizing combinations of the size of a coding unit (CU), a prediction mode, the size of a prediction unit (PU), motion information, and the size of a transform unit (TU).

A rate-distortion optimization scheme may calculate rate-distortion costs of respective combinations so as to select an optimal combination from among the combinations. The rate-distortion costs may be calculated using the equation "$D+\lambda*R$". Generally, a combination enabling the rate-distortion cost to be minimized may be selected as the optimal combination in the rate-distortion optimization scheme.

D may denote distortion. D may be the mean of squares of differences (i.e. mean square error) between original transform coefficients and reconstructed transform coefficients in a transform unit.

R may denote the rate, which may denote a bit rate using related-context information.

$\lambda$ denotes a Lagrangian multiplier. R may include not only coding parameter information, such as a prediction mode, motion information, and a coded block flag, but also bits generated due to the encoding of transform coefficients.

An encoding apparatus may perform procedures, such as inter prediction and/or intra prediction, transform, quantization, entropy encoding, inverse quantization (dequantization), and/or inverse transform so as to calculate precise D and R. These procedures may greatly increase the complexity of the encoding apparatus.

Bitstream: A bitstream may denote a stream of bits including encoded image information.

Parsing; Parsing may be the decision on the value of a syntax element, made by performing entropy decoding on a bitstream. Alternatively, the term "parsing" may mean such entropy decoding itself.

Symbol: A symbol may be at least one of the syntax element, the coding parameter, and the transform coefficient of an encoding target unit and/or a decoding target unit. Further, a symbol may be the target of entropy encoding or the result of entropy decoding.

Reference picture: A reference picture may be an image referred to by a unit so as to perform inter prediction or motion compensation. Alternatively, a reference picture may be an image including a reference unit referred to by a target unit so as to perform inter prediction or motion compensation.

Hereinafter, the terms "reference picture" and "reference image" may be used to have the same meaning, and may be used interchangeably with each other.

Reference picture list; A reference picture list may be a list including one or more reference images used for inter prediction or motion compensation.

The types of a reference picture list may include List Combined (LC), List 0 (L0), List 1 (L1), List 2 (L2), List 3 (L3), etc.

For inter prediction, one or more reference picture lists may be used.

Inter prediction indicator: An inter prediction indicator may indicate the inter prediction direction for a target unit. Inter prediction may be one of unidirectional prediction and bidirectional prediction. Alternatively, the inter prediction indicator may denote the number of reference pictures used to generate a prediction unit of a target unit. Alternatively, the inter prediction indicator may denote the number of prediction blocks used for inter prediction or motion compensation of a target unit.

Prediction list utilization flag: A prediction list utilization flag may indicate whether a prediction unit is generated using at least one reference picture in a specific reference picture list.

An inter prediction indicator may be derived using the prediction list utilization flag. In contrast, the prediction list utilization flag may be derived using the inter prediction indicator. For example, the case where the prediction list utilization flag indicates "0", which is a first value, may indicate that, for a target unit, a prediction block is not generated using a reference picture in a reference picture list. The case where the prediction list utilization flag indicates "1", which is a second value, may indicate that, for a target unit, a prediction unit is generated using the reference picture list.

Reference picture index: A reference picture index may be an index indicating a specific reference picture in a reference picture list.

Picture Order Count (POC): A POC value for a picture may denote an order in which the corresponding picture is displayed.

Motion vector (MV): A motion vector may be a 2D vector used for inter prediction or motion compensation. A motion vector may mean an offset between a target image and a reference image.

For example, a MV may be represented in a form such as $(mv_x, mv_y)$. $mv_x$ may indicate a horizontal component, and $mv_y$ may indicate a vertical component.

Search range: A search range may be a 2D area in which a search for a MV is performed during inter prediction. For example, the size of the search range may be M×N. M and N may be respective positive integers.

Motion vector candidate: A motion vector candidate may be a block that is a prediction candidate or the motion vector of the block that is a prediction candidate when a motion vector is predicted.

A motion vector candidate may be included in a motion vector candidate list.

Motion vector candidate list: A motion vector candidate list may be a list configured using one or more motion vector candidates.

Motion vector candidate index: A motion vector candidate index may be an indicator for indicating a motion vector candidate in the motion vector candidate list. Alternatively, a motion vector candidate index may be the index of a motion vector predictor.

Motion information: Motion information may be information including at least one of a reference picture list, a reference picture, a motion vector candidate, a motion vector candidate index, a merge candidate, and a merge index, as well as a motion vector, a reference picture index, and an inter prediction indicator.

Merge candidate list: A merge candidate list may be a list configured using one or more merge candidates.

Merge candidate: A merge candidate may be a spatial merge candidate, a temporal merge candidate, a combined merge candidate, a combined bi-prediction merge candidate, a candidate based on a history, a candidate based on an average of two candidates, a zero-merge candidate, etc. A merge candidate may include an inter prediction indicator, and may include motion information such as prediction type information, a reference picture index for each list, a motion vector, a prediction list utilization flag, and an inter prediction indicator.

Merge index: A merge index may be an indicator for indicating a merge candidate in a merge candidate list.

A merge index may indicate a reconstructed unit used to derive a merge candidate between a reconstructed unit spatially adjacent to a target unit and a reconstructed unit temporally adjacent to the target unit.

A merge index may indicate at least one of pieces of motion information of a merge candidate.

Transform unit: A transform unit may be the base unit of residual signal encoding and/or residual signal decoding, such as transform, inverse transform, quantization, dequantization, transform coefficient encoding, and transform coefficient decoding. A single transform unit may be partitioned into multiple sub-transform units having a smaller size. Here, a transform may include one or more of a primary transform and a secondary transform, and an inverse transform may include one or more of a primary inverse transform and a secondary inverse transform.

Scaling: Scaling may denote a procedure for multiplying a factor by a transform coefficient level.

As a result of scaling of the transform coefficient level, a transform coefficient may be generated. Scaling may also be referred to as "dequantization".

Quantization Parameter (QP): A quantization parameter may be a value used to generate a transform coefficient level for a transform coefficient in quantization. Alternatively, a quantization parameter may also be a value used to generate a transform coefficient by scaling the transform coefficient level in dequantization. Alternatively, a quantization parameter may be a value mapped to a quantization step size.

Delta quantization parameter: A delta quantization parameter may mean a difference value between a predicted quantization parameter and the quantization parameter of a target unit.

Scan: Scan may denote a method for aligning the order of coefficients in a unit, a block or a matrix. For example, a method for aligning a 2D array in the form of a one-dimensional (1D) array may be referred to as a "scan". Alternatively, a method for aligning a 1D array in the form of a 2D array may also be referred to as a "scan" or an "inverse scan".

Transform coefficient: A transform coefficient may be a coefficient value generated as an encoding apparatus performs a transform. Alternatively, the transform coefficient may be a coefficient value generated as a decoding apparatus performs at least one of entropy decoding and dequantization.

A quantized level or a quantized transform coefficient level generated by applying quantization to a transform coefficient or a residual signal may also be included in the meaning of the term "transform coefficient".

Quantized level: A quantized level may be a value generated as the encoding apparatus performs quantization on a transform coefficient or a residual signal. Alternatively, the quantized level may be a value that is the target of dequantization as the decoding apparatus performs dequantization.

A quantized transform coefficient level, which is the result of transform and quantization, may also be included in the meaning of a quantized level.

Non-zero transform coefficient: A non-zero transform coefficient may be a transform coefficient having a value other than 0 or a transform coefficient level having a value other than 0. Alternatively, a non-zero transform coefficient may be a transform coefficient, the magnitude of the value of which is not 0, or a transform coefficient level, the magnitude of the value of which is not 0.

Quantization matrix; A quantization matrix may be a matrix used in a quantization procedure or a dequantization procedure so as to improve the subjective image quality or objective image quality of an image. A quantization matrix may also be referred to as a "scaling list".

Quantization matrix coefficient: A quantization matrix coefficient may be each element in a quantization matrix. A quantization matrix coefficient may also be referred to as a "matrix coefficient".

Default matrix: A default matrix may be a quantization matrix predefined by the encoding apparatus and the decoding apparatus.

Non-default matrix: A non-default matrix may be a quantization matrix that is not predefined by the encoding apparatus and the decoding apparatus. The non-default matrix may mean a quantization matrix to be signaled from the encoding apparatus to the decoding apparatus by a user.

Most Probable Mode (MPM): An MPM may denote an intra prediction mode having a high probability of being used for intra prediction for a target block.

An encoding apparatus and a decoding apparatus may determine one or more MPMs based on coding parameters related to the target block and the attributes of entities related to the target block.

The encoding apparatus and the decoding apparatus may determine one or more MPMs based on the intra prediction mode of a reference block. The reference block may include multiple reference blocks. The multiple reference blocks may include spatial neighbor blocks adjacent to the left of the target block and spatial neighbor blocks adjacent to the top of the target block. In other words, depending on which intra prediction modes have been used for the reference blocks, one or more different MPMs may be determined.

The one or more MPMs may be determined in the same manner both in the encoding apparatus and in the decoding apparatus. That is, the encoding apparatus and the decoding apparatus may share the same MPM list including one or more MPMs.

MPM list: An MPM list may be a list including one or more MPMs. The number of the one or more MPMs in the MPM list may be defined in advance.

MPM indicator: An MPM indicator may indicate an MPM to be used for intra prediction for a target block among one or more MPMs in the MPM list. For example, the MPM indicator may be an index for the MPM list.

Since the MPM list is determined in the same manner both in the encoding apparatus and in the decoding apparatus, there may be no need to transmit the MPM list itself from the encoding apparatus to the decoding apparatus.

The MPM indicator may be signaled from the encoding apparatus to the decoding apparatus. As the MPM indicator is signaled, the decoding apparatus may determine the MPM to be used for intra prediction for the target block among the MPMs in the MPM list.

MPM use indicator: An MPM use indicator may indicate whether an MPM usage mode is to be used for prediction for a target block. The MPM usage mode may be a mode in which the MPM to be used for intra prediction for the target block is determined using the MPM list.

The MPM use indicator may be signaled from the encoding apparatus to the decoding apparatus.

Signaling: "signaling" may denote that information is transferred from an encoding apparatus to a decoding apparatus. Alternatively, "signaling" may mean information is included in in a bitstream or a recoding medium. Information signaled by an encoding apparatus may be used by a decoding apparatus.

The encoding apparatus may generate encoded information by performing encoding on information to be signaled. The encoded information may be transmitted from the encoding apparatus to the decoding apparatus. The decoding apparatus may obtain information by decoding the transmitted encoded information. Here, the encoding may be entropy encoding, and the decoding may be entropy decoding.

Statistic value: A variable, a coding parameter, a constant, etc. may have values that can be calculated. The statistic value may be a value generated by performing calculations (operations) on the values of specified targets. For example, the statistic value may indicate one or more of the average, weighted average, weighted sum, minimum value, maximum value, mode, median value, and interpolated value of the values of a specific variable, a specific coding parameter, a specific constant, or the like.

FIG. 1 is a block diagram illustrating the configuration of an embodiment of an encoding apparatus to which the present disclosure is applied.

An encoding apparatus 100 may be an encoder, a video encoding apparatus or an image encoding apparatus. A video may include one or more images (pictures). The encoding apparatus 100 may sequentially encode one or more images of the video.

Referring to FIG. 1, the encoding apparatus 100 includes an inter prediction unit 110, an intra prediction unit 120, a switch 115, a subtractor 125, a transform unit 130, a quantization unit 140, an entropy encoding unit 150, a dequantization (inverse quantization) unit 160, an inverse transform unit 170, an adder 175, a filter unit 180, and a reference picture buffer 190.

The encoding apparatus 100 may perform encoding on a target image using an intra mode and/or an inter mode. In other words, a prediction mode for a target block may be one of an intra mode and an inter mode.

Hereinafter, the terms "intra mode", "intra prediction mode", "intra-picture mode" and "intra-picture prediction mode" may be used to have the same meaning, and may be used interchangeably with each other.

Hereinafter, the terms "inter mode", "inter prediction mode", "inter picture mode" and "inter picture prediction mode" may be used to have the same meaning, and may be used interchangeably with each other.

Hereinafter, the term "image" may indicate only part of an image, or may indicate a block. Also, the processing of an "image" may indicate sequential processing of multiple blocks.

Further, the encoding apparatus 100 may generate a bitstream, including encoded information, via encoding on the target image, and may output and store the generated bitstream. The generated bitstream may be stored in a computer-readable storage medium and may be streamed through a wired and/or wireless transmission medium.

When the intra mode is used as a prediction mode, the switch 115 may switch to the intra mode. When the inter mode is used as a prediction mode, the switch 115 may switch to the inter mode.

The encoding apparatus 100 may generate a prediction block of a target block. Further, after the prediction block has been generated, the encoding apparatus 100 may encode a residual block for the target block using a residual between the target block and the prediction block.

When the prediction mode is the intra mode, the intra prediction unit 120 may use pixels of previously encoded/decoded neighbor blocks adjacent to the target block as reference samples. The intra prediction unit 120 may perform spatial prediction on the target block using the reference samples, and may generate prediction samples for the target block via spatial prediction, the prediction samples may mean samples in the prediction block.

The inter prediction unit 110 may include a motion prediction unit and a motion compensation unit.

When the prediction mode is an inter mode, the motion prediction unit may search a reference image for the area most closely matching the target block in a motion prediction procedure, and may derive a motion vector for the target block and the found area based on the found area. Here, the motion-prediction unit may use a search range as a target area for searching.

The reference image may be stored in the reference picture buffer 190. More specifically, an encoded and/or decoded reference image may be stored in the reference picture buffer 190 when the encoding and/or decoding of the reference image have been processed.

Since a decoded picture is stored, the reference picture buffer 190 may be a Decoded Picture Buffer (DPB).

The motion compensation unit may generate a prediction block for the target block by performing motion compensation using a motion vector. Here, the motion vector may be a two-dimensional (2D) vector used for inter prediction. Further, the motion vector may indicate an offset between the target image and the reference image.

The motion prediction unit and the motion compensation unit may generate a prediction block by applying an interpolation filter to a partial area of a reference image when the motion vector has a value other than an integer. In order to perform inter prediction or motion compensation, it may be determined which one of a skip mode, a merge mode, an advanced motion vector prediction (AMVP) mode, and a current picture reference mode corresponds to a method for predicting the motion of a PU included in a CU, based on the CU, and compensating for the motion, and inter prediction or motion compensation may be performed depending on the mode.

The subtractor 125 may generate a residual block, which is the differential between the target block and the prediction block. A residual block may also be referred to as a "residual signal".

The residual signal may be the difference between an original signal and a prediction signal. Alternatively, the residual signal may be a signal generated by transforming or quantizing the difference between an original signal and a prediction signal or by transforming and quantizing the difference. A residual block may be a residual signal for a block unit.

The transform unit 130 may generate a transform coefficient by transforming the residual block, and may output the generated transform coefficient. Here, the transform coefficient may be a coefficient value generated by transforming the residual block.

The transform unit 130 may use one of multiple predefined transform methods when performing a transform.

The multiple predefined transform methods may include a Discrete Cosine Transform (DCT), a Discrete Sine Transform (DST), a Karhunen-Loeve Transform (KLT), etc.

The transform method used to transform a residual block may be determined depending on at least one of coding parameters for a target block and/or a neighbor block. For example, the transform method may be determined based on at least one of an inter prediction mode for a PU, an intra prediction mode for a PU, the size of a TU, and the shape of a TU. Alternatively, transformation information indicating the transform method may be signaled from the encoding apparatus 100 to the decoding apparatus 200.

When a transform skip mode is used, the transform unit 130 may omit transforming the residual block.

By applying quantization to the transform coefficient, a quantized transform coefficient level or a quantized level may be generated. Hereinafter, in the embodiments, each of the quantized transform coefficient level and the quantized level may also be referred to as a 'transform coefficient'.

The quantization unit 140 may generate a quantized transform coefficient level (i.e., a quantized level or a quantized coefficient) by quantizing the transform coefficient depending on quantization parameters. The quantization unit 140 may output the quantized transform coefficient level that is generated. In this case, the quantization unit 140 may quantize the transform coefficient using a quantization matrix.

The entropy encoding unit 150 may generate a bitstream by performing probability distribution-based entropy encoding based on values, calculated by the quantization unit 140, and/or coding parameter values, calculated in the encoding procedure. The entropy encoding unit 150 may output the generated bitstream.

The entropy encoding unit 150 may perform entropy encoding on information about the pixels of the image and information required to decode the image. For example, the information required to decode the image may include syntax elements or the like.

When entropy encoding is applied, fewer bits may be assigned to more frequently occurring symbols, and more bits may be assigned to rarely occurring symbols. As symbols are represented by means of this assignment, the size of a bit string for target symbols to be encoded may be reduced. Therefore, the compression performance of video encoding may be improved through entropy encoding.

Further, for entropy encoding, the entropy encoding unit 150 may use a coding method such as exponential Golomb, Context-Adaptive Variable Length Coding (CAVLC), or Context-Adaptive Binary Arithmetic Coding (CABAC). For example, the entropy encoding unit 150 may perform entropy encoding using a Variable Length Coding/Code (VLC) table. For example, the entropy encoding unit 150 may derive a binarization method for a target symbol. Further, the entropy encoding unit 150 may derive a probability model for a target symbol/bin. The entropy encoding unit 150 may perform arithmetic coding using the derived binarization method, a probability model, and a context model.

The entropy encoding unit 150 may transform the coefficient of the form of a 2D block into the form of a 1D vector through a transform coefficient scanning method so as to encode a quantized transform coefficient level.

The coding parameters may be information required for encoding and/or decoding. The coding parameters may include information encoded by the encoding apparatus 100 and transferred from the encoding apparatus 100 to a decoding apparatus, and may also include information that may be derived in the encoding or decoding procedure. For example, information transferred to the decoding apparatus may include syntax elements.

The coding parameters may include not only information (or a flag or an index), such as a syntax element, which is encoded by the encoding apparatus and is signaled by the encoding apparatus to the decoding apparatus, but also information derived in an encoding or decoding process. Further, the coding parameters may include information required so as to encode or decode images. For example, the coding parameters may include at least one value, combinations or statistics of a size of a unit/block, a shape/form of a unit/block, a depth of a unit/block, partition information of a unit/block, a partition structure of a unit/block, information indicating whether a unit/block is partitioned in a quad-tree structure, information indicating whether a unit/block is partitioned in a binary tree structure, a partitioning direction of a binary tree structure (horizontal direction or vertical direction), a partitioning form of a binary tree structure (symmetrical partitioning or asymmetrical partitioning), information indicating whether a unit/block is partitioned in a ternary tree structure, a partitioning direction of a ternary tree structure (horizontal direction or vertical direction), a partitioning form of a ternary tree structure (symmetrical partitioning or asymmetrical partitioning, etc.), information indicating whether a unit/block is partitioned in a multi-type tree structure, a combination and a direction (horizontal direction or vertical direction, etc.) of a partitioning of the multi-type tree structure, a partitioning form of a partitioning of a multi-type tree structure (symmetrical partitioning or asymmetrical partitioning, etc.), a partitioning tree (a binary tree or a ternary tree) of the multi-type tree form, a type of a prediction (intra prediction or inter prediction), an intra prediction mode/direction, an intra luma prediction mode/direction, an intra chroma prediction mode/direction, an intra partitioning information, an inter partitioning information, a coding block partitioning flag, a prediction block partitioning flag, a transform block partitioning flag, a reference sample filtering method, a reference sample filter tap, a reference sample filter coefficient, a prediction block filtering method, a prediction block filter tap, a prediction block filter coefficient, a prediction block boundary filtering method, a prediction block boundary filter tap, a prediction block boundary filter coefficient, an inter prediction mode, motion information, a motion vector, a motion vector difference, a reference picture index, an inter prediction direction, an inter prediction indicator, a prediction list utilization flag, a reference picture list, a reference image, a POC, a motion vector predictor, a motion vector prediction index, a motion vector prediction candidate, a motion vector candidate list, information indicating whether a merge mode is used, a merge index, a merge candidate, a merge candidate list, information indicating whether a skip mode is used, a type of an interpolation filter, a tap of an interpolation filter, a filter coefficient of an interpolation filter, a magnitude of a motion vector, accuracy of motion vector representation, a transform type, a transform size, information indicating whether a first transform is used, information indicating whether an additional (secondary) transform is used, first transform selection information (or a first transform index), secondary transform selection information (or a secondary transform index), information indicating a presence or absence of a residual signal, a coded block pattern, a coded block flag, a quantization parameter, a residual quantization parameter, a quantization matrix, information about an intra-loop filter, information indicating whether an intra-loop filter is applied, a coefficient of an intra-loop filter, a tap of an intra-loop filter, a shape/form of an intra-loop filter, information indicating whether a deblocking filter is applied, a coefficient of a deblocking filter, a tap of a deblocking filter, deblocking filter strength, a shape/form of a deblocking filter, information indicating whether an adaptive sample offset is applied, a value of an adaptive sample offset, a category of an adaptive sample offset, a type of an adaptive sample offset, information indicating whether an adaptive in-loop filter is applied, a coefficient of an adaptive in-loop filter, a tap of an adaptive in-loop filter, a shape/form of an adaptive in-loop filter, a binarization/inverse binarization method, a context model, a context model decision method, a context model update method, information indicating whether a regular mode is performed, information whether a bypass mode is performed, a significant coefficient flag, a last significant coefficient flag, a coding flag for a coefficient group, a position of a last significant coefficient, information indicating whether a value of a coefficient is greater than 1, information indicating whether a value of a coefficient is greater than 2, information indicating whether a value of a coefficient is greater than 3, a remaining coefficient value information, a sign information, a reconstructed luma sample, a reconstructed chroma sample, a context bin, a bypass bin, a residual luma sample, a residual chroma sample, a transform coefficient, a luma transform coefficient, a chroma transform coefficient, a quantized level, a luma quantized level, a chroma quantized level, a transform coefficient level, a transform coefficient level scanning method, a size of a motion vector search region on a side of a decoding apparatus, a shape/form of a motion vector search region on a side of a decoding apparatus, the number of a motion vector search on a side of a decoding apparatus, a size of a CTU, a minimum block size, a maximum block size, a maximum block depth, a minimum block depth, an image display/output order, slice identification information, a slice type, slice partition information, tile group identification information, a tile group type, a tile group partitioning information, tile identification information, a tile type, tile partitioning information, a picture type, bit depth, input sample bit depth, reconstructed sample bit depth, residual sample bit depth, transform coefficient bit depth, quantized level bit depth, information about a luma signal, information about a chroma signal, a color space of a target block, and a color space of a residual block. Further, the above-described coding parameter-related information may also be included in the coding parameter. Information used to calculate and/or derive the above-described coding parameter may also be included in the coding parameter. Information calculated or derived using the above-described coding parameter may also be included in the coding parameter.

The prediction scheme may denote one prediction mode of an intra prediction mode and an inter prediction mode.

The first transform selection information may indicate a first transform which is applied to a target block.

The second transform selection information may indicate a second transform which is applied to a target block.

The residual signal may denote the difference between the original signal and a prediction signal. Alternatively, the residual signal may be a signal generated by transforming the difference between the original signal and the prediction signal. Alternatively, the residual signal may be a signal generated by transforming and quantizing the difference between the original signal and the prediction signal. A residual block may be the residual signal for a block.

Here, signaling information may mean that the encoding apparatus 100 includes an entropy-encoded information, generated by performing entropy encoding on a flag or an index, in a bitstream, and that the decoding apparatus 200 acquires information by performing entropy decoding on the entropy-encoded information, extracted from the bitstream. Here, the information may comprise a flag, an index, etc.

A signal may denote information to be signaled. Hereinafter, information about an image and a block may be referred to as a "signal". Further, hereinafter, the terms "information" and "signal" may be used to have the same meaning, and may be used interchangeably with each other. For example, a specific signal may be a signal denoting a specific block, an original signal may be a signal denoting a target block. A prediction signal may be a signal denoting a prediction block, a residual signal may be a signal denoting a residual block.

A bitstream may include information based on a specific syntax. The encoding apparatus 100 may generate a bitstream including information depending on a specific syntax. The decoding apparatus 200 may acquire information from the bitstream depending on a specific syntax.

Since the encoding apparatus 100 performs encoding via inter prediction, the encoded target image may be used as a reference image for additional image(s) to be subsequently processed. Therefore, the encoding apparatus 100 may reconstruct or decode the encoded target image and store the reconstructed or decoded image as a reference image in the reference picture buffer 190. For decoding, dequantization and inverse transform on the encoded target image may be processed.

The quantized level may be inversely quantized by the dequantization unit 160, and may be inversely transformed by the inverse transform unit 170. The dequantization unit 160 may generate an inversely quantized coefficient by performing inverse transform for the quantized level. The inverse transform unit 170 may generate a inversely quantized and inversely transformed coefficient by performing inverse transform for the inversely quantized coefficient.

The inversely quantized and inversely transformed coefficient may be added to the prediction block by the adder 175. The inversely quantized and inversely transformed coefficient and the prediction block are added, and then a reconstructed block may be generated. Here, the inversely quantized and/or inversely transformed coefficient may denote a coefficient on which one or more of dequantization and inverse transform are performed, and may also denote a reconstructed residual block. Here, the reconstructed block may mean a recovered block or a decoded block.

The reconstructed block may be subjected to filtering through the filter unit 180. The filter unit 180 may apply one or more of a deblocking filter, a Sample Adaptive Offset (SAO) filter, an Adaptive Loop Filter (ALF), and a Non Local Filter (NLF) to a reconstructed sample, the reconstructed block or a reconstructed picture. The filter unit 180 may also be referred to as an "in-loop filter".

The deblocking filter may eliminate block distortion occurring at the boundaries between blocks in a reconstructed picture. In order to determine whether to apply the deblocking filter, the number of columns or rows which are included in a block and which include pixel(s) based on which it is determined whether to apply the deblocking filter to a target block may be decided on.

When the deblocking filter is applied to the target block, the applied filter may differ depending on the strength of the required deblocking filtering. In other words, among different filters, a filter decided on in consideration of the strength of deblocking filtering may be applied to the target block. When a deblocking filter is applied to a target block, a filter corresponding to any one of a long-tap filter, a strong filter, a weak filter and a Gaussian filter may be applied to the target block depending on the strength of required deblocking filtering.

Also, when vertical filtering and horizontal filtering are performed on the target block, the horizontal filtering and the vertical filtering may be processed in parallel.

The SAO may add a suitable offset to the values of pixels to compensate for coding error. The SAO may perform, for the image to which deblocking is applied, correction that uses an offset in the difference between an original image and the image to which deblocking is applied, on a pixel basis. To perform an offset correction for an image, a method for dividing the pixels included in the image into a certain number of regions, determining a region to which an offset is to be applied, among the divided regions, and applying an offset to the determined region may be used, and a method for applying an offset in consideration of edge information of each pixel may also be used.

The ALF may perform filtering based on a value obtained by comparing a reconstructed image with an original image. After pixels included in an image have been divided into a predetermined number of groups, filters to be applied to each group may be determined, and filtering may be differentially performed for respective groups. information related to whether to apply an adaptive loop filter may be signaled for each CU. Such information may be signaled for a luma signal. The shapes and filter coefficients of ALFs to be applied to respective blocks may differ for respective blocks. Alternatively, regardless of the features of a block, an ALF having a fixed form may be applied to the block.

A non-local filter may perform filtering based on reconstructed blocks, similar to a target block. A region similar to the target block may be selected from a reconstructed picture, and filtering of the target block may be performed using the statistical properties of the selected similar region. Information about whether to apply a non-local filter may be signaled for a Coding Unit (CU). Also, the shapes and filter coefficients of the non-local filter to be applied to blocks may differ depending on the blocks.

The reconstructed block or the reconstructed image subjected to filtering through the filter unit 180 may be stored in the reference picture buffer 190 as a reference picture. The reconstructed block subjected to filtering through the filter unit 180 may be a part of a reference picture. In other words, the reference picture may be a reconstructed picture composed of reconstructed blocks subjected to filtering through the filter unit 180. The stored reference picture may be subsequently used for inter prediction or a motion compensation.

Figure 2:
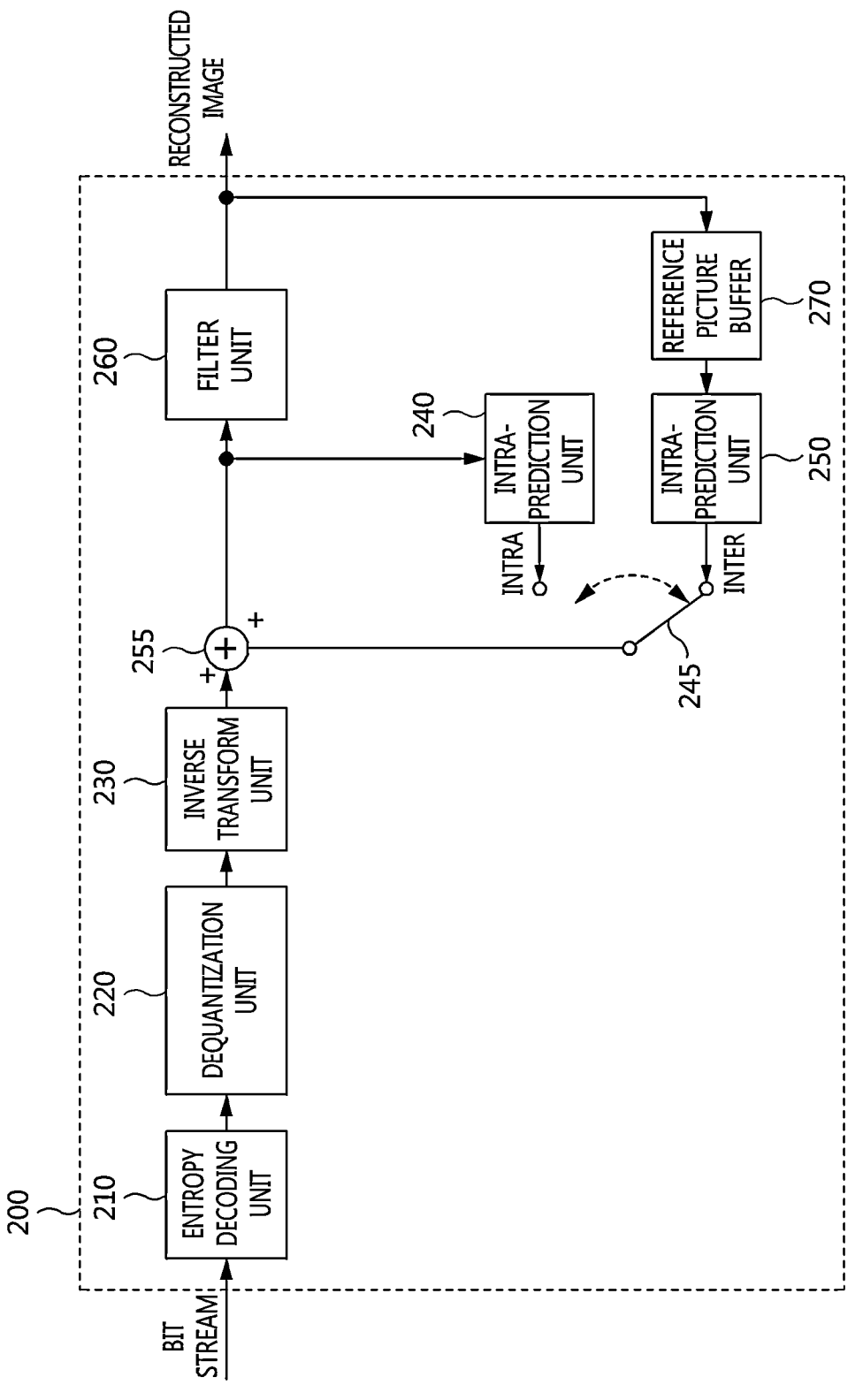
FIG. 2 is a block diagram illustrating the configuration of an embodiment of a decoding apparatus to which the present disclosure is applied.

FIG. 2 is a block diagram illustrating the configuration of an embodiment of a decoding apparatus to which the present disclosure is applied.

A decoding apparatus 200 may be a decoder, a video decoding apparatus or an image decoding apparatus.

Referring to FIG. 2, the decoding apparatus 200 may include an entropy decoding unit 210, a dequantization (inverse quantization) unit 220, an inverse transform unit 230, an intra prediction unit 240, an inter prediction unit 250, a switch 245 an adder 255, a filter unit 260, and a reference picture buffer 270.

The decoding apparatus 200 may receive a bitstream output from the encoding apparatus 100. The decoding apparatus 200 may receive a bitstream stored in a computer-readable storage medium, and may receive a bitstream that is streamed through a wired/wireless transmission medium.

The decoding apparatus 200 may perform decoding on the bitstream in an intra mode and/or an inter mode. Further, the decoding apparatus 200 may generate a reconstructed image or a decoded image via decoding, and may output the reconstructed image or decoded image.

For example, switching to an intra mode or an inter mode based on the prediction mode used for decoding may be performed by the switch 245. When the prediction mode used for decoding is an intra mode, the switch 245 may be operated to switch to the intra mode. When the prediction mode used for decoding is an inter mode, the switch 245 may be operated to switch to the inter mode.

The decoding apparatus 200 may acquire a reconstructed residual block by decoding the input bitstream, and may generate a prediction block. When the reconstructed residual block and the prediction block are acquired, the decoding apparatus 200 may generate a reconstructed block, which is the target to be decoded, by adding the reconstructed residual block and the prediction block.

The entropy decoding unit 210 may generate symbols by performing entropy decoding on the bitstream based on the probability distribution of a bitstream. The generated symbols may include symbols in a form of a quantized transform coefficient level (i.e., a quantized level or a quantized coefficient). Here, the entropy decoding method may be similar to the above-described entropy encoding method. That is, the entropy decoding method may be the reverse procedure of the above-described entropy encoding method.

The entropy decoding unit 210 may change a coefficient having a one-dimensional (1D) vector form to a 2D block shape through a transform coefficient scanning method in order to decode a quantized transform coefficient level.

For example, the coefficients of the block may be changed to 2D block shapes by scanning the block coefficients using up-right diagonal scanning. Alternatively, which one of up-right diagonal scanning, vertical scanning, and horizontal scanning is to be used may be determined depending on the size and/or the intra prediction mode of the corresponding block.

The quantized coefficient may be inversely quantized by the dequantization unit 220. The dequantization unit 220 may generate an inversely quantized coefficient by performing dequantization on the quantized coefficient. Further, the inversely quantized coefficient may be inversely transformed by the inverse transform unit 230. The inverse transform unit 230 may generate a reconstructed residual block by performing an inverse transform on the inversely quantized coefficient. As a result of performing dequantization and the inverse transform on the quantized coefficient, the reconstructed residual block may be generated. Here, the dequantization unit 220 may apply a quantization matrix to the quantized coefficient w % ben generating the reconstructed residual block.

When the intra mode is used, the intra prediction unit 240 may generate a prediction block by performing spatial prediction that uses the pixel values of previously decoded neighbor blocks adjacent to a target block for the target block.

The inter prediction unit 250 may include a motion compensation unit. Alternatively, the inter prediction unit 250 may be designated as a "motion compensation unit".

When the inter mode is used, the motion compensation unit may generate a prediction block by performing motion compensation that uses a motion vector and a reference image stored in the reference picture buffer 270 for the target block.

The motion compensation unit may apply an interpolation filter to a partial area of the reference image when the motion vector has a value other than an integer, and may generate a prediction block using the reference image to which the interpolation filter is applied. In order to perform motion compensation, the motion compensation unit may determine which one of a skip mode, a merge mode, an Advanced Motion Vector Prediction (AMVP) mode, and a current picture reference mode corresponds to the motion compensation method used for a PU included in a CU, based on the CU, and may perform motion compensation depending on the determined mode.

The reconstructed residual block and the prediction block may be added to each other by the adder 255. The adder 255 may generate a reconstructed block by adding the reconstructed residual block to the prediction block.

The reconstructed block may be subjected to filtering through the filter unit 260. The filter unit 260 may apply at least one of a deblocking filter, an SAO filter, an ALF, and a NLF to the reconstructed block or the reconstructed image. The reconstructed image may be a picture including the reconstructed block.

The filter unit may output the reconstructed image.

The reconstructed image and/or the reconstructed block subjected to filtering through the filter unit 260 may be stored as a reference picture in the reference picture buffer 270. The reconstructed block subjected to filtering through the filter unit 260 may be a part of the reference picture. In other words, the reference picture may be an image composed of reconstructed blocks subjected to filtering through the filter unit 260. The stored reference picture may be subsequently used for inter prediction or a motion compensation.

Figure 3:
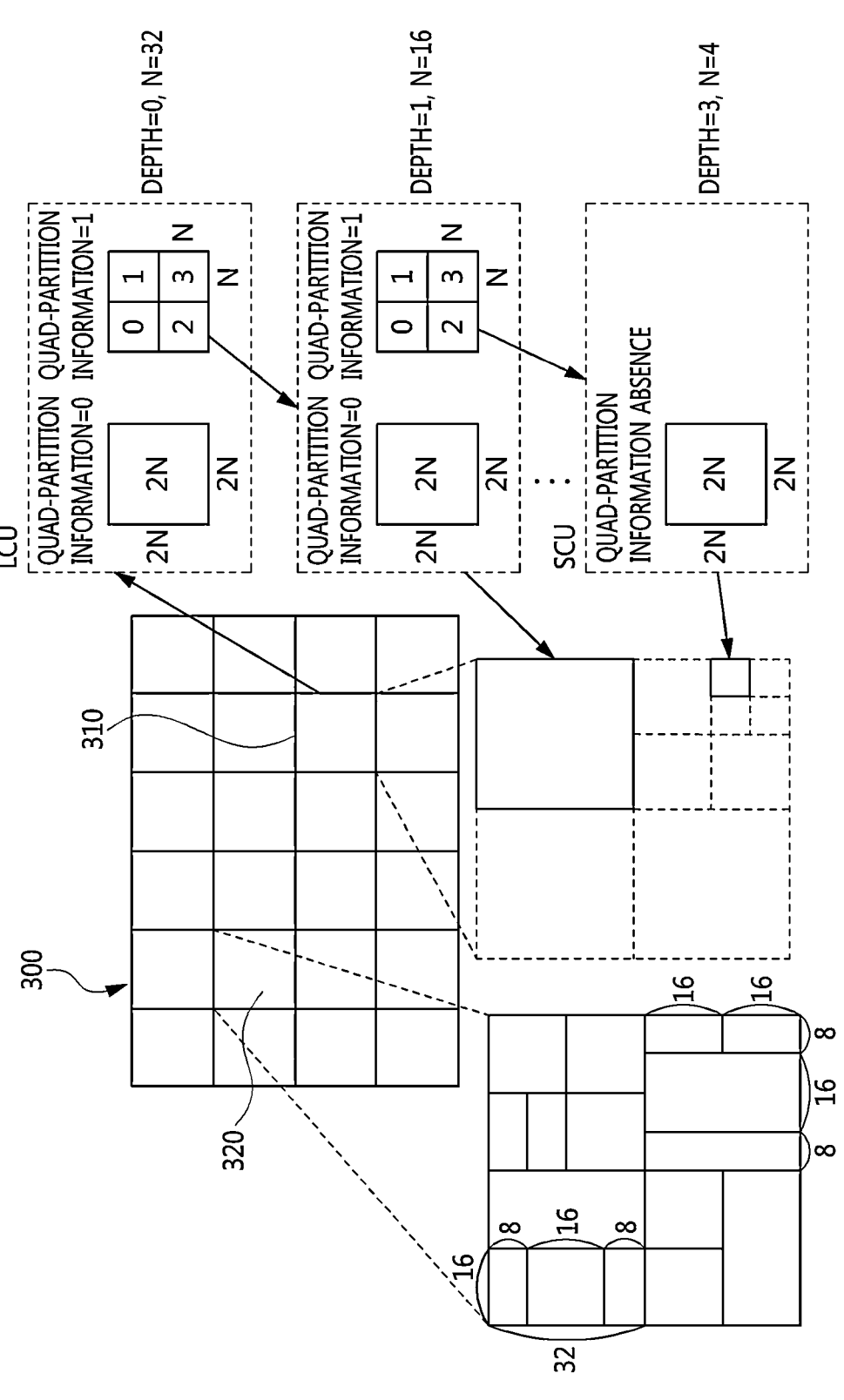
FIG. 3 is a diagram schematically illustrating the partition structure of an image when the image is encoded and decoded.

FIG. 3 is a diagram schematically illustrating the partition structure of an image when the image is encoded and decoded.

FIG. 3 may schematically illustrate an example in which a single unit is partitioned into multiple sub-units.

In order to efficiently partition the image, a Coding Unit (CU) may be used in encoding and decoding. The term "unit" may be used to collectively designate 1) a block including image samples and 2) a syntax element. For example, the "partitioning of a unit" may mean the "partitioning of a block corresponding to a unit".

A CU may be used as a base unit for image encoding/decoding. A CU may be used as a unit to which one mode selected from an intra mode and an inter mode in image encoding/decoding is applied. In other words, in image encoding/decoding, which one of an intra mode and an inter mode is to be applied to each CU may be determined.

Further, a CU may be a base unit in prediction, transform, quantization, inverse transform, dequantization, and encoding/decoding of transform coefficients.

Referring to FIG. 3, an image 200 may be sequentially partitioned into units corresponding to a Largest Coding Unit (LCU), and a partition structure may be determined for each LCU. Here, the LCU may be used to have the same meaning as a Coding Tree Unit (CTU).

The partitioning of a unit may mean the partitioning of a block corresponding to the unit. Block partition information may include depth information about the depth of a unit. The depth information may indicate the number of times the unit is partitioned and/or the degree to which the unit is partitioned. A single unit may be hierarchically partitioned into a plurality of sub-units while having depth information based on a tree structure.

Each of partitioned sub-units may have depth information. The depth information may be information indicating the size of a CU. The depth information may be stored for each CU.

Each CU may have depth information. When the CU is partitioned, CUs resulting from partitioning may have a depth increased from the depth of the partitioned CU by 1.

The partition structure may mean the distribution of Coding Units (CUs) to efficiently encode the image in an LCU 310. Such a distribution may be determined depending on whether a single CU is to be partitioned into multiple CUs. The number of CUs generated by partitioning may be a positive integer of 2 or more, including 2, 3, 4, 8, 16, etc.

The horizontal size and the vertical size of each of CUs generated by the partitioning may be less than the horizontal size and the vertical size of a CU before being partitioned, depending on the number of CUs generated by partitioning. For example, the horizontal size and the vertical size of each of CUs generated by the partitioning may be half of the horizontal size and the vertical size of a CU before being partitioned.

Each partitioned CU may be recursively partitioned into four CUs in the same way. Via the recursive partitioning, at least one of the horizontal size and the vertical size of each partitioned CU may be reduced compared to at least one of the horizontal size and the vertical size of the CU before being partitioned.

The partitioning of a CU may be recursively performed up to a predefined depth or a predefined size.

For example, the depth of a CU may have a value ranging from 0 to 3. The size of the CU may range from a size of 64×64 to a size of 8×8 depending on the depth of the CU.

For example, the depth of an LCU 310 may be 0, and the depth of a Smallest Coding Unit (SCU) may be a predefined maximum depth. Here, as described above, the LCU may be the CU having the maximum coding unit size, and the SCU may be the CU having the minimum coding unit size.

Partitioning may start at the LCU 310, and the depth of a CU may be increased by 1 whenever the horizontal and/or vertical sizes of the CU are reduced by partitioning.

For example, for respective depths, a CU that is not partitioned may have a size of 2N×2N. Further, in the case of a CU that is partitioned, a CU having a size of 2N×2N may be partitioned into four CUs, each having a size of N×N. The value of N may be halved whenever the depth is increased by 1.

Referring to FIG. 3, an LCU having a depth of 0 may have 64×64 pixels or 64×64 blocks. 0 may be a minimum depth. An SCU having a depth of 3 may have 8×8 pixels or 8×8 blocks. 3 may be a maximum depth. Here, a CU having 64×64 blocks, which is the LCU, may be represented by a depth of 0. A CU having 32×32 blocks may be represented by a depth of 1. A CU having 16×16 blocks may be represented by a depth of 2. A CU having 8×8 blocks, which is the SCU, may be represented by a depth of 3.

Information about whether the corresponding CU is partitioned may be represented by the partition information of the CU. The partition information may be 1-bit information. All CUs except the SCU may include partition information. For example, the value of the partition information of a CU that is not partitioned may be a first value. The value of the partition information of a CU that is partitioned may be a second value. When the partition information indicates whether a CU is partitioned or not, the first value may be "0" and the second value may be "1".

For example, when a single CU is partitioned into four CUs, the horizontal size and vertical size of each of four CUs generated by partitioning may be half the horizontal size and the vertical size of the CU before being partitioned. When a CU having a 32×32 size is partitioned into four CUs, the size of each of four partitioned CUs may be 16×16. When a single CU is partitioned into four CUs, it may be considered that the CU has been partitioned in a quad-tree structure. In other words, it may be considered that a quad-tree partition has been applied to a CU.

For example, when a single CU is partitioned into two CUs, the horizontal size or the vertical size of each of two CUs generated by partitioning may be half the horizontal size or the vertical size of the CU before being partitioned. When a CU having a 32×32 size is vertically partitioned into two CUs, the size of each of two partitioned CUs may be 16×32. When a CU having a 32×32 size is horizontally partitioned into two CUs, the size of each of two partitioned CUs may be 32×16. When a single CU is partitioned into two CUs, it may be considered that the CU has been partitioned in a binary-tree structure. In other words, it may be considered that a binary-tree partition has been applied to a CU.

For example, when a single CU is partitioned (or split) into three CUs, the original CU before being partitioned is partitioned so that the horizontal size or vertical size thereof is divided at a ratio of 1:2:1, thus enabling three sub-CUs to be generated. For example, when a CU having a 16×32 size is horizontally partitioned into three sub-CUs, the three sub-CUs resulting from the partitioning may have sizes of 16×8, 16×16, and 16×8, respectively, in a direction from the top to the bottom. For example, when a CU having a 32×32 size is vertically partitioned into three sub-CUs, the three sub-CUs resulting from the partitioning may have sizes of 8×32, 16×32, and 8×32, respectively, in a direction from the left to the right. When a single CU is partitioned into three CUs, it may be considered that the CU is partitioned in a ternary-tree form. In other words, it may be considered that a ternary-tree partition has been applied to the CU.

Both of quad-tree partitioning and binary-tree partitioning are applied to the LCU 310 of FIG. 3.

In the encoding apparatus 100, a Coding Tree Unit (CTU) having a size of 64×64 may be partitioned into multiple smaller CUs by a recursive quad-tree structure. A single CU may be partitioned into four CUs having the same size. Each CU may be recursively partitioned, and may have a quad-tree structure.

By the recursive partitioning of a CU, an optimal partitioning method that incurs a minimum rate-distortion cost may be selected.

The Coding Tree Unit (CTU) 320 in FIG. 3 is an example of a CTU to which all of a quad-tree partition, a binary-tree partition, and a ternary-tree partition are applied.

As described above, in order to partition a CTU, at least one of a quad-tree partition, a binary-tree partition, and a ternary-tree partition may be applied to the CTU. Partitions may be applied based on specific priority.

For example, a quad-tree partition may be preferentially applied to the CTU. A CU that cannot be partitioned in a quad-tree form any further may correspond to a leaf node of a quad-tree. A CU corresponding to the leaf node of the quad-tree may be a root node of a binary tree and/or a ternary tree. That is, the CU corresponding to the leaf node of the quad-tree may be partitioned in a binary-tree form or a ternary-tree form, or may not be partitioned any further. In this case, each CU, which is generated by applying a binary-tree partition or a ternary-tree partition to the CU corresponding to the leaf node of a quad-tree, is prevented from being subjected again to quad-tree partitioning, thus effectively performing partitioning of a block and/or signaling of block partition information.

The partition of a CU corresponding to each node of a quad-tree may be signaled using quad-partition information. Quad-partition information having a first value (e.g., "1") may indicate that the corresponding CU is partitioned in a quad-tree form. Quad-partition information having a second value (e.g., "0") may indicate that the corresponding CU is not partitioned in a quad-tree form. The quad-partition information may be a flag having a specific length (e.g., 1 bit).

Priority may not exist between a binary-tree partition and a ternary-tree partition. That is, a CU corresponding to the leaf node of a quad-tree may be partitioned in a binary-tree form or a ternary-tree form. Also, the CU generated through a binary-tree partition or a ternary-tree partition may be further partitioned in a binary-tree form or a ternary-tree form, or may not be partitioned any further.

Partitioning performed when priority does not exist between a binary-tree partition and a ternary-tree partition may be referred to as a "multi-type tree partition". That is, a CU corresponding to the leaf node of a quad-tree may be the root node of a multi-type tree. Partitioning of a CU corresponding to each node of the multi-type tree may be signaled using at least one of information indicating whether the CU is partitioned in a multi-type tree, partition direction information, and partition tree information. For partitioning of a CU corresponding to each node of a multi-type tree, information indicating whether partitioning in the multi-type tree is performed, partition direction information, and partition tree information may be sequentially signaled.

For example, information indicating whether a CU is partitioned in a multi-type tree and having a first value (e.g., "1") may indicate that the corresponding CU is partitioned in a multi-type tree form. Information indicating whether a CU is partitioned in a multi-type tree and having a second value (e.g., "0") may indicate that the corresponding CU is not partitioned in a multi-type tree form.

When a CU corresponding to each node of a multi-type tree is partitioned in a multi-type tree form, the corresponding CU may further include partition direction information.

The partition direction information may indicate the partition direction of the multi-type tree partition. Partition direction information having a first value (e.g., "1") may indicate that the corresponding CU is partitioned in a vertical direction. Partition direction information having a second value (e.g., "V") may indicate that the corresponding CU is partitioned in a horizontal direction.

When a CU corresponding to each node of a multi-type tree is partitioned in a multi-type tree form, the corresponding CU may further include partition-tree information. The partition-tree information may indicate the tree that is used for a multi-type tree partition.

For example, partition-tree information having a first value (e.g., "1") may indicate that the corresponding CU is partitioned in a binary-tree form. Partition-tree information having a second value (e.g., "0") may indicate that the corresponding CU is partitioned in a ternary-tree form.

Here, each of the above-described information indicating whether partitioning in the multi-type tree is performed, partition-tree information, and partition direction information may be a flag having a specific length (e.g., 1 bit).

At least one of the above-described quad-partition information, information indicating whether partitioning in the multi-type tree is performed, partition direction information, and partition-tree information may be entropy-encoded and/or entropy-decoded. In order to perform entropy encoding/decoding of such information, information of a neighbor CU adjacent to a target CU may be used.

For example, it may be considered that there is a high probability that the partition form of a left CU and/or an above CU (i.e., partitioning/non-partitioning, a partition tree and/or a partition direction) and the partition form of a target CU will be similar to each other. Therefore, based on the information of a neighbor CU, context information for entropy encoding and/or entropy decoding of the information of the target CU may be derived. Here, the information of the neighbor CU may include at least one of 1) quad-partition information of the neighbor CU, 2) information indicating whether the neighbor CU is partitioned in a multi-type tree, 3) partition direction information of the neighbor CU, and 4) partition-tree information of the neighbor CU.

In another embodiment, of a binary-tree partition and a ternary-tree partition, the binary-tree partition may be preferentially performed. That is, the binary-tree partition may be first applied, and then a CU corresponding to the leaf node of a binary tree may be set to the root node of a ternary tree. In this case, a quad-tree partition or a binary-tree partition may not be performed on the CU corresponding to the node of the ternary tree.

A CU, which is not partitioned any further through a quad-tree partition, a binary-tree partition, and/or a ternary-tree partition, may be the unit of encoding, prediction and/or transform. That is, the CU may not be partitioned any further for prediction and/or transform. Therefore, a partition structure for partitioning the CU into Prediction Units (PUs) and/or Transform Units (TUs), partition information thereof, etc. may not be present in a bitstream.

However, when the size of a CU, which is the unit of partitioning, is greater than the size of a maximum transform block, the CU may be recursively partitioned until the size of the CU becomes less than or equal to the size of the maximum transform block. For example, when the size of a CU is 64×64 and the size of the maximum transform block is 32×32, the CU may be partitioned into four 32×32 blocks so as to perform a transform. For example, when the size of a CU is 32×64 and the size of the maximum transform block is 32×32, the CU may be partitioned into two 32×32 blocks.

In this case, information indicating whether a CU is partitioned for a transform may not be separately signaled. Without signaling, whether a CU is partitioned may be determined via a comparison between the horizontal size (and/or vertical size) of the CU and the horizontal size (and/or vertical size) of the maximum transform block. For example, when the horizontal size of the CU is greater than the horizontal size of the maximum transform block, the CU may be vertically bisected. Further, when the vertical size of the CU is greater than the vertical size of the maximum transform block, the CU may be horizontally bisected.

Information about the maximum size and/or minimum size of a CU and information about the maximum size and/or minimum size of a transform block may be signaled or determined at a level higher than that of the CU. For example, the higher level may be a sequence level, a picture level, a tile level, a tile group level or a slice level. For example, the minimum size of the CU may be set to 4×4. For example, the maximum size of the transform block may be set to 64×64. For example, the maximum size of the transform block may be set to 4×4.

Information about the minimum size of a CU corresponding to the leaf node of a quad-tree (i.e., the minimum size of the quad-tree) and/or information about the maximum depth of a path from the root node to the leaf node of a multi-type tree (i.e., the maximum depth of a multi-type tree) may be signaled or determined at a level higher than that of the CU. For example, the higher level may be a sequence level, a picture level, a slice level, a tile group level or a tile level. Information about the minimum size of a quad-tree and/or information about the maximum depth of a multi-type tree may be separately signaled or determined at each of an intra-slice level and an inter slice level.

Information about the difference between the size of a CTU and the maximum size of a transform block may be signaled or determined at a level higher than that of a CU. For example, the higher level may be a sequence level, a picture level, a slice level, a tile group level or a tile level. Information about the maximum size of a CU corresponding to each node of a binary tree (i.e., the maximum size of the binary tree) may be determined based on the size and the difference information of a CTU. The maximum size of a CU corresponding to each node of a ternary tree (i.e., the maximum size of the ternary tree) may have different values depending on the type of slice. For example, the maximum size of the ternary tree at an intra-slice level may be 32×32. For example, the maximum size of the ternary tree at an inter slice level may be 128×128. For example, the minimum size of a CU corresponding to each node of a binary tree (i.e., the minimum size of the binary tree) and/or the minimum size of a CU corresponding to each node of a ternary tree (i.e., the minimum size of the ternary tree) may be set to the minimum size of a CU.

In a further example, the maximum size of a binary tree and/or the maximum size of a ternary tree may be signaled or determined at a slice level. Also, the minimum size of a binary tree and/or the minimum size of a ternary tree may be signaled or determined at a slice level.

Based on the above-described various block sizes and depths, quad-partition information, information indicating whether partitioning in a multi-type tree is performed, partition tree information and/or partition direction information may or may not be present in a bitstream.

For example, when the size of a CU is not greater than the minimum size of a quad-tree, the CU may not include quad-partition information, and quad-partition information of the CU may be inferred as a second value.

For example, when the size of a CU corresponding to each node of a multi-type tree (horizontal size and vertical size) is greater than the maximum size of a binary tree (horizontal size and vertical size) and/or the maximum size of a ternary tree (horizontal size and vertical size), the CU may not be partitioned in a binary-tree form and/or a ternary-tree form. By means of this determination manner, information indicating whether partitioning in a multi-type tree is performed may not be signaled, but may be inferred as a second value.

Alternatively, when the size of a CU corresponding to each node of a multi-type tree (horizontal size and vertical size) is equal to the minimum size of a binary tree (horizontal size and vertical size), or when the size of a CU (horizontal size and vertical size) is equal to twice the minimum size of a ternary tree (horizontal size and vertical size), the CU may not be partitioned in a binary tree form and/or a ternary tree form. By means of this determination manner, information indicating whether partitioning in a multi-type tree is performed may not be signaled, but may be inferred as a second value. The reason for this is that, when a CU is partitioned in a binary tree form and/or a ternary tree form, a CU smaller than the minimum size of the binary tree and/or the minimum size of the ternary tree is generated.

Alternatively, a binary-tree partition or a ternary-tree partition may be limited based on the size of a virtual pipeline data unit (i.e., the size of a pipeline buffer). For example, when a CU is partitioned into sub-CUs unsuitable for the size of a pipeline buffer through a binary-tree partition or a ternary-tree partition, a binary-tree partition or a ternary-tree partition may be limited. The size of the pipeline buffer may be equal to the maximum size of a transform block (e.g., 64×64).

For example, when the size of the pipeline buffer is 64×64, the following partitions may be limited.

Ternary-tree partition for N×M CU (where N and/or M are 128)

Horizontal binary-tree partition for 128×N CU (where N<=64)

Vertical binary-tree partition for N×128 CU (where N<=64)

Alternatively, when the depth of a CU corresponding to each node of a multi-type tree is equal to the maximum depth of the multi-type tree, the CU may not be partitioned in a binary-tree form and/or a ternary-tree form. By means of this determination manner, information indicating whether partitioning in a multi-type tree is performed may not be signaled, but may be inferred as a second value.

Alternatively, information indicating whether partitioning in a multi-type tree is performed may be signaled only when at least one of a vertical binary-tree partition, a horizontal binary-tree partition, a vertical ternary-tree partition, and a horizontal ternary-tree partition is possible for a CU corresponding to each node of a multi-type tree. Otherwise, the CU may not be partitioned in a binary-tree form and/or a ternary-tree form. By means of this determination manner, information indicating whether partitioning in a multi-type tree is performed may not be signaled, but may be inferred as a second value.

Alternatively, partition direction information may be signaled only when both a vertical binary-tree partition and a horizontal binary-tree partition are possible or only when both a vertical ternary-tree partition and a horizontal ternary-tree partition are possible, for a CU corresponding to each node of a multi-type tree. Otherwise, the partition direction information may not be signaled, but may be inferred as a value indicating the direction in which the CU can be partitioned.

Alternatively, partition tree information may be signaled only when both a vertical binary-tree partition and a vertical ternary-tree partition are possible or only when both a horizontal binary-tree partition and a horizontal ternary-tree partition are possible, for a CU corresponding to each node of a multi-type tree. Otherwise, the partition tree information may not be signaled, but may be inferred as a value indicating a tree that can be applied to the partition of the CU.

Figure 4:
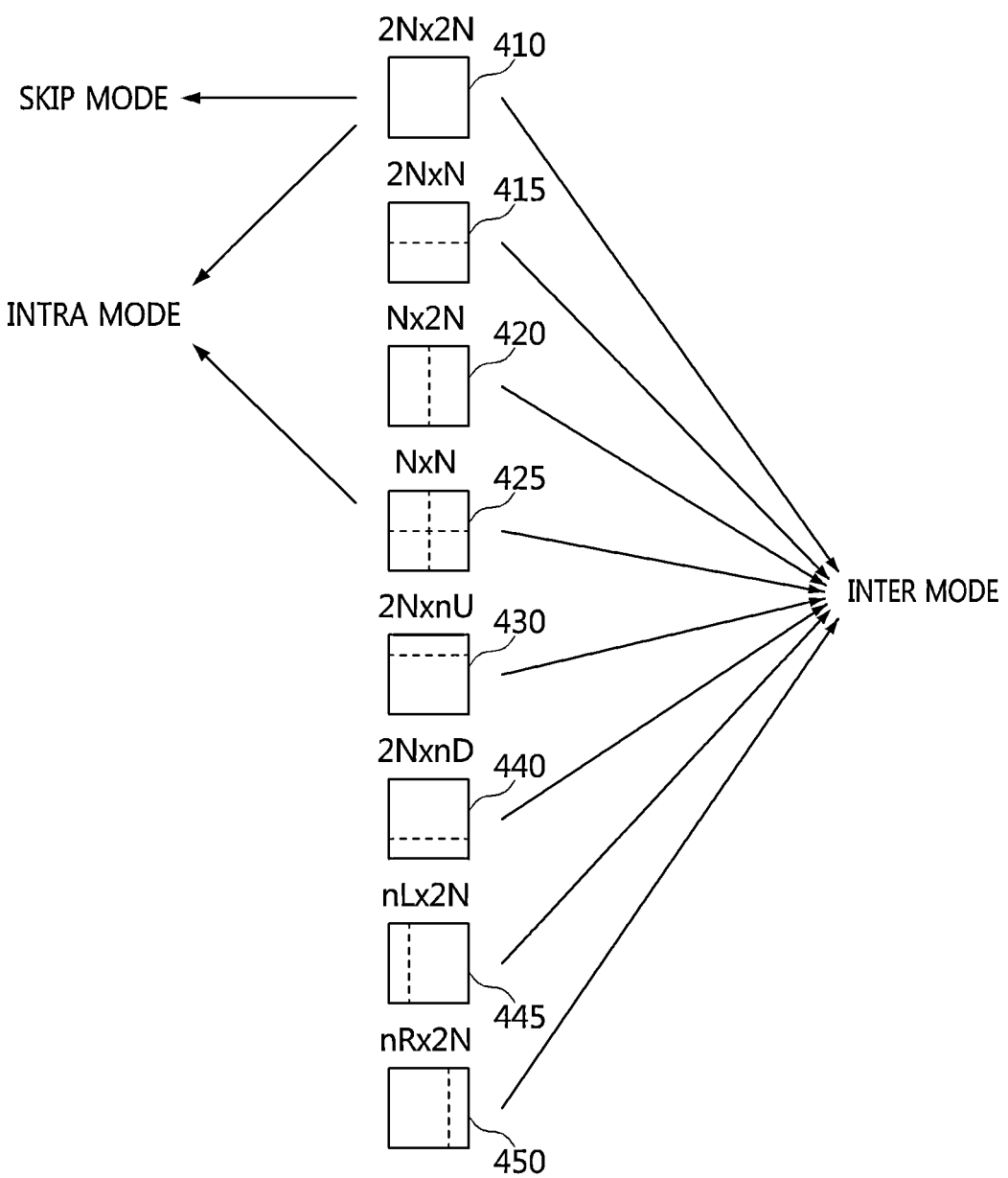
FIG. 4 is a diagram illustrating the form of a Prediction Unit that a Coding Unit can include.

FIG. 4 is a diagram illustrating the form of a prediction unit that a coding unit can include.

When, among CUs partitioned from an LCU, a CU, which is not partitioned any further, may be divided into one or more Prediction Units (PUs). Such division is also referred to as "partitioning".

A PU may be a base unit for prediction. A PU may be encoded and decoded in any one of a skip mode, an inter mode, and an intra mode. A PU may be partitioned into various shapes depending on respective modes. For example, the target block, described above with reference to FIG. 1, and the target block, described above with reference to FIG. 2, may each be a PU.

A CU may not be split into PUs. When the CU is not split into PUs, the size of the CU and the size of a PU may be equal to each other.

In a skip mode, partitioning may not be present in a CU. In the skip mode, a 2N×2N mode 410, in which the sizes of a PU and a CU are identical to each other, may be supported without partitioning.

In an inter mode, 8 types of partition shapes may be present in a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported.

In an intra mode, the 2N×2N mode 410 and the N×N mode 425 may be supported.

In the 2N×2N mode 410, a PU having a size of 2N×2N may be encoded. The PU having a size of 2N×2N may mean a PU having a size identical to that of the CU. For example, the PU having a size of 2N×2N may have a size of 64×64, 32×32, 16×16 or 8×8.

In the N×N mode 425, a PU having a size of N×N may be encoded.

For example, in intra prediction, when the size of a PU is 8×8, four partitioned PUs may be encoded. The size of each partitioned PU may be 4×4.

When a PU is encoded in an intra mode, the PU may be encoded using any one of multiple intra prediction modes. For example, High Efficiency Video Coding (HEVC) technology may provide 35 intra prediction modes, and the PU may be encoded in any one of the 35 intra prediction modes.

Which one of the 2N×2N mode 410 and the N×N mode 425 is to be used to encode the PU may be determined based on rate-distortion cost.

The encoding apparatus 100 may perform an encoding operation on a PU having a size of 2N×2N. Here, the encoding operation may be the operation of encoding the PU in each of multiple intra prediction modes that can be used by the encoding apparatus 100. Through the encoding operation, the optimal intra prediction mode for a PU having a size of 2N×2N may be derived. The optimal intra prediction mode may be an intra prediction mode in which a minimum rate-distortion cost occurs upon encoding the PU having a size of 2N×2N, among multiple intra prediction modes that can be used by the encoding apparatus 100.

Further, the encoding apparatus 100 may sequentially perform an encoding operation on respective PUs obtained from N×N partitioning. Here, the encoding operation may be the operation of encoding a PU in each of multiple intra prediction modes that can be used by the encoding apparatus 100. By means of the encoding operation, the optimal intra prediction mode for the PU having a size of N×N may be derived. The optimal intra prediction mode may be an intra prediction mode in which a minimum rate-distortion cost occurs upon encoding the PU having a size of N×N, among multiple intra prediction modes that can be used by the encoding apparatus 100.

The encoding apparatus 100 may determine which of a PU having a size of 2N×2N and PUs having sizes of N×N to be encoded based on a comparison of a rate-distortion cost of the PU having a size of 2N×2N and a rate-distortion costs of the PUs having sizes of N×N.

A single CU may be partitioned into one or more PUs, and a PU may be partitioned into multiple PUs.

For example, when a single PU is partitioned into four PUs, the horizontal size and vertical size of each of four PUs generated by partitioning may be half the horizontal size and the vertical size of the PU before being partitioned. When a PU having a 32×32 size is partitioned into four PUs, the size of each of four partitioned PUs may be 16×16. When a single PU is partitioned into four PUs, it may be considered that the PU has been partitioned in a quad-tree structure.

For example, when a single PU is partitioned into two PUs, the horizontal size or the vertical size of each of two PUs generated by partitioning may be half the horizontal size or the vertical size of the PU before being partitioned. When a PU having a 32×32 size is vertically partitioned into two PUs, the size of each of two partitioned PUs may be 16×32. When a PU having a 32×32 size is horizontally partitioned into two PUs, the size of each of two partitioned PUs may be 32×16. When a single PU is partitioned into two PUs, it may be considered that the PU has been partitioned in a binary-tree structure.

Figure 5:
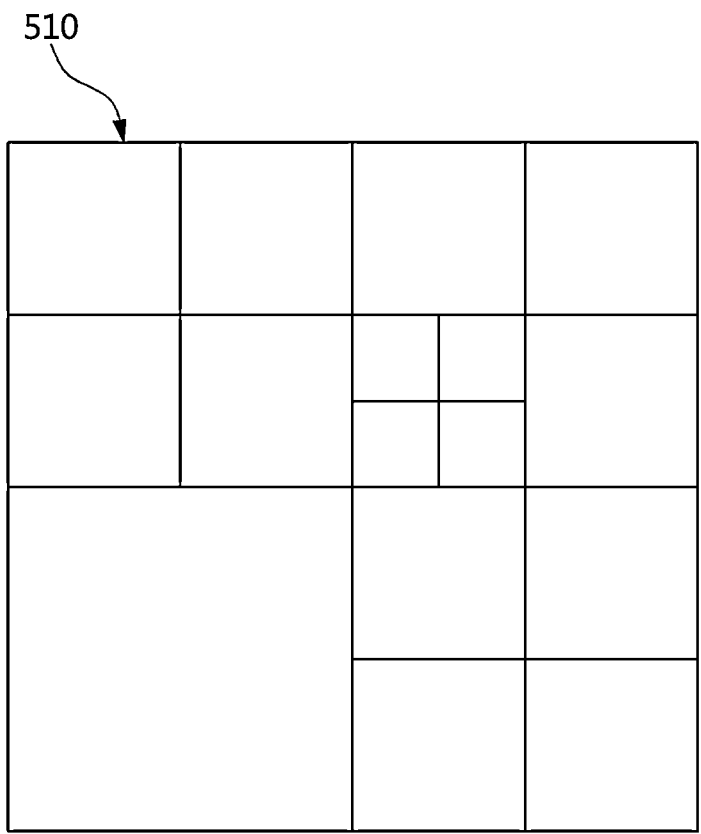
FIG. 5 is a diagram illustrating the form of a Transform Unit that can be included in a Coding Unit.

FIG. 5 is a diagram illustrating the form of a transform unit that can be included in a coding unit.

A Transform Unit (TU) may have a base unit that is used for a procedure, such as transform, quantization, inverse transform, dequantization, entropy encoding, and entropy decoding, in a CU.

A TU may have a square shape or a rectangular shape. A shape of a TU may be determined based on a size and/or a shape of a CU.

Among CUs partitioned from the LCU, a CU which is not partitioned into CUs any further may be partitioned into one or more TUs. Here, the partition structure of a TU may be a quad-tree structure. For example, as shown in FIG. 5, a single CU 510 may be partitioned one or more times depending on the quad-tree structure. By means of this partitioning, the single CU 510 may be composed of TUs having various sizes.

It can be considered that when a single CU is split two or more times, the CU is recursively split. Through splitting, a single CU may be composed of Transform Units (TUs) having various sizes.

Alternatively, a single CU may be split into one or more TUs based on the number of vertical lines and/or horizontal lines that split the CU.

A CU may be split into symmetric TUs or asymmetric TUs. For splitting into asymmetric TUs, information about the size and/or shape of each TU may be signaled from the encoding apparatus 100 to the decoding apparatus 200. Alternatively, the size and/or shape of each TU may be derived from information about the size and/or shape of the CU.

A CU may not be split into TUs. When the CU is not split into TUs, the size of the CU and the size of a TU may be equal to each other.

A single CU may be partitioned into one or more TUs, and a TU may be partitioned into multiple TUs.

For example, when a single TU is partitioned into four TUs, the horizontal size and vertical size of each of four TUs generated by partitioning may be half the horizontal size and the vertical size of the TU before being partitioned. When a TU having a 32×32 size is partitioned into four TUs, the size of each of four partitioned TUs may be 16×16. When a single TU is partitioned into four TUs, it may be considered that the TU has been partitioned in a quad-tree structure.

For example, when a single TU is partitioned into two TUs, the horizontal size or the vertical size of each of two TUs generated by partitioning may be half the horizontal size or the vertical size of the TU before being partitioned. When a TU having a 32×32 size is vertically partitioned into two TUs, the size of each of two partitioned TUs may be 16×32. When a TU having a 32×32 size is horizontally partitioned into two TUs, the size of each of two partitioned TUs may be 32×16. When a single TU is partitioned into two TUs, it may be considered that the TU has been partitioned in a binary-tree structure.

In a way differing from that illustrated in FIG. 5, a CU may be split.

For example, a single CU may be split into three CUs. The horizontal sizes or vertical sizes of the three CUs generated from splitting may be ¼, ½, and ¼, respectively, of the horizontal size or vertical size of the original CU before being split.

For example, when a CU having a 32×32 size is vertically split into three CUs, the sizes of the three CUs generated from the splitting may be 8×32, 16×32, and 8×32, respectively. In this way, when a single CU is split into three CUs, it may be considered that the CU is split in the form of a ternary tree.

One of exemplary splitting forms, that is, quad-tree splitting, binary tree splitting, and ternary tree splitting, may be applied to the splitting of a CU, and multiple splitting schemes may be combined and used together for splitting of a CU. Here, the case where multiple splitting schemes are combined and used together may be referred to as "complex tree-format splitting".

Figure 6:
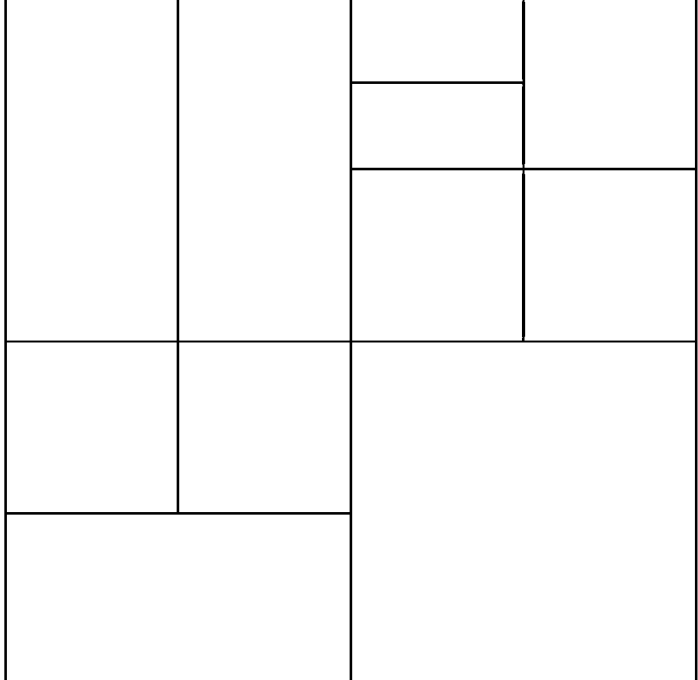
FIG. 6 illustrates splitting of a block according to an example.

FIG. 6 illustrates the splitting of a block according to an example.

In a video encoding and/or decoding process, a target block may be split, as illustrated in FIG. 6. For example, the target block may be a CU.

For splitting of the target block, an indicator indicating split information may be signaled from the encoding apparatus 100 to the decoding apparatus 200. The split information may be information indicating how the target block is split.

The split information may be one or more of a split flag (hereinafter referred to as "split_flag"), a quad-binary flag (hereinafter referred to as "QB_flag"), a quad-tree flag (hereinafter referred to as "quadtree_flag"), a binary tree flag (hereinafter referred to as "binarytree_flag"), and a binary type flag (hereinafter referred to as "Btype_flag").

"split_flag" may be a flag indicating whether a block is split. For example, a split_flag value of 1 may indicate that the corresponding block is split. A split_flag value of 0 may indicate that the corresponding block is not split.

"QB_flag" may be a flag indicating which one of a quad-tree form and a binary tree form corresponds to the shape in which the block is split. For example, a QB_flag value of 0 may indicate that the block is split in a quad-tree form. A QB_flag value of 1 may indicate that the block is split in a binary tree form. Alternatively, a QB_flag value of 0 may indicate that the block is split in a binary tree form. A QB_flag value of 1 may indicate that the block is split in a quad-tree form.

"quadtree_flag" may be a flag indicating whether a block is split in a quad-tree form. For example, a quadtree_flag value of 1 may indicate that the block is split in a quad-tree form. A quadtree_flag value of 0 may indicate that the block is not split in a quad-tree form.

"binarytree_flag" may be a flag indicating whether a block is split in a binary tree form. For example, a binarytree_flag value of 1 may indicate that the block is split in a binary tree form. A binarytree_flag value of 0 may indicate that the block is not split in a binary tree form.

"Btype_flag" may be a flag indicating which one of a vertical split and a horizontal split corresponds to a split direction when a block is split in a binary tree form. For example, a Btype_flag value of 0 may indicate that the block is split in a horizontal direction. A Btype_flag value of 1 may indicate that a block is split in a vertical direction. Alternatively, a Btype_flag value of 0 may indicate that the block is split in a vertical direction. A Btype_flag value of 1 may indicate that a block is split in a horizontal direction.

For example, the split information of the block in FIG. 6 may be derived by signaling at least one of quadtree_flag, binarytree_flag, and Btype_flag, as shown in the following Table 1.

TABLE 1

| quadtree_flag | binarytree_flag | Btype_flag |
|---|---|---|
| 1 | | |
| 0 | | |
| | 1 | |
| | | 1 |
| | 0 | |
| | 0 | |
| 1 | | |
| 0 | | |
| | 1 | |
| | | 0 |
| | 0 | |
| | 0 | |
| 0 | | |
| | 0 | |
| 0 | | |
| | 0 | |
| 0 | | |
| | 0 | |
| 0 | | |
| | 1 | |
| | | 0 |
| | 1 | |
| | | 1 |
| | 0 | |
| | 0 | |
| | 0 | |
| 0 | | |
| | 0 | |

For example, the split information of the block in FIG. 6 may be derived by signaling at least one of split_flag, QB_flag and Btype_flag, as shown in the following Table 2.

TABLE 2

| split_flag | QB_flag | Btype_flag |
|---|---|---|
| 1 | | |
| | 0 | |
| 1 | | |
| | 1 | |
| | | 1 |
| 0 | | |
| 0 | | |
| 1 | | |
| | 0 | |
| 1 | | |
| | 1 | |
| | | 0 |
| 0 | | |
| 0 | | |
| 0 | | |
| 0 | | |
| 0 | | |
| 1 | | |
| | 1 | |
| | | 0 |

TABLE 2-continued

| split_flag | QB_flag | Btype_flag |
|---|---|---|
| 1 | | |
| | | 1 |
| 0 | | |
| 0 | | |
| 0 | | |
| 0 | | |

The splitting method may be limited only to a quad-tree or to a binary tree depending on the size and/or shape of the block. When this limitation is applied, split_flag may be a flag indicating whether a block is split in a quad-tree form or a flag indicating whether a block is split in a binary tree form. The size and shape of a block may be derived depending on the depth information of the block, and the depth information may be signaled from the encoding apparatus 100 to the decoding apparatus 200.

When the size of a block falls within a specific range, only splitting in a quad-tree form may be possible. For example, the specific range may be defined by at least one of a maximum block size and a minimum block size at which only splitting in a quad-tree form is possible.

Information indicating the maximum block size and the minimum block size at which only splitting in a quad-tree form is possible may be signaled from the encoding apparatus 100 to the decoding apparatus 200 through a bitstream. Further, this information may be signaled for at least one of units such as a video, a sequence, a picture, a parameter, a tile group, and a slice (or a segment).

Alternatively, the maximum block size and/or the minimum block size may be fixed sizes predefined by the encoding apparatus 100 and the decoding apparatus 200. For example, when the size of a block is above 64×64 and below 256×256, only splitting in a quad-tree form may be possible. In this case, split_flag may be a flag indicating whether splitting in a quad-tree form is performed.

When the size of a block is greater than the maximum size of a transform block, only partitioning in a quad-tree form may be possible. Here, a sub-block resulting from partitioning may be at least one of a CU and a TU.

In this case, split_flag may be a flag indicating whether a partitioning of a quad-tree form is performed or not.

When the size of a block falls within the specific range, only splitting in a binary tree form or a ternary tree form may be possible. For example, the specific range may be defined by at least one of a maximum block size and a minimum block size at which only splitting in a binary tree form or a ternary tree form is possible.

Information indicating the maximum block size and/or the minimum block size at which only splitting in a binary tree form or splitting in a ternary tree form is possible may be signaled from the encoding apparatus 100 to the decoding apparatus 200 through a bitstream. Further, this information may be signaled for at least one of units such as a sequence, a picture, and a slice (or a segment).

Alternatively, the maximum block size and/or the minimum block size may be fixed sizes predefined by the encoding apparatus 100 and the decoding apparatus 200. For example, when the size of a block is above 8×8 and below 16×16, only splitting in a binary tree form may be possible. In this case, split_flag may be a flag indicating whether splitting in a binary tree form or a ternary tree form is performed.

The above description of partitioning in a quad-tree form may be equally applied to a binary-tree form and/or a ternary-tree form.

The partition of a block may be limited by a previous partition. For example, when a block is partitioned in a specific binary-tree form and then multiple sub-blocks are generated from the partitioning, each sub-block may be additionally partitioned only in a specific tree form. Here, the specific tree form may be at least one of a binary-tree form, a ternary-tree form, and a quad-tree form.

When the horizontal size or vertical size of a partition block is a size that cannot be split further, the above-described indicator may not be signaled.

Figure 7:
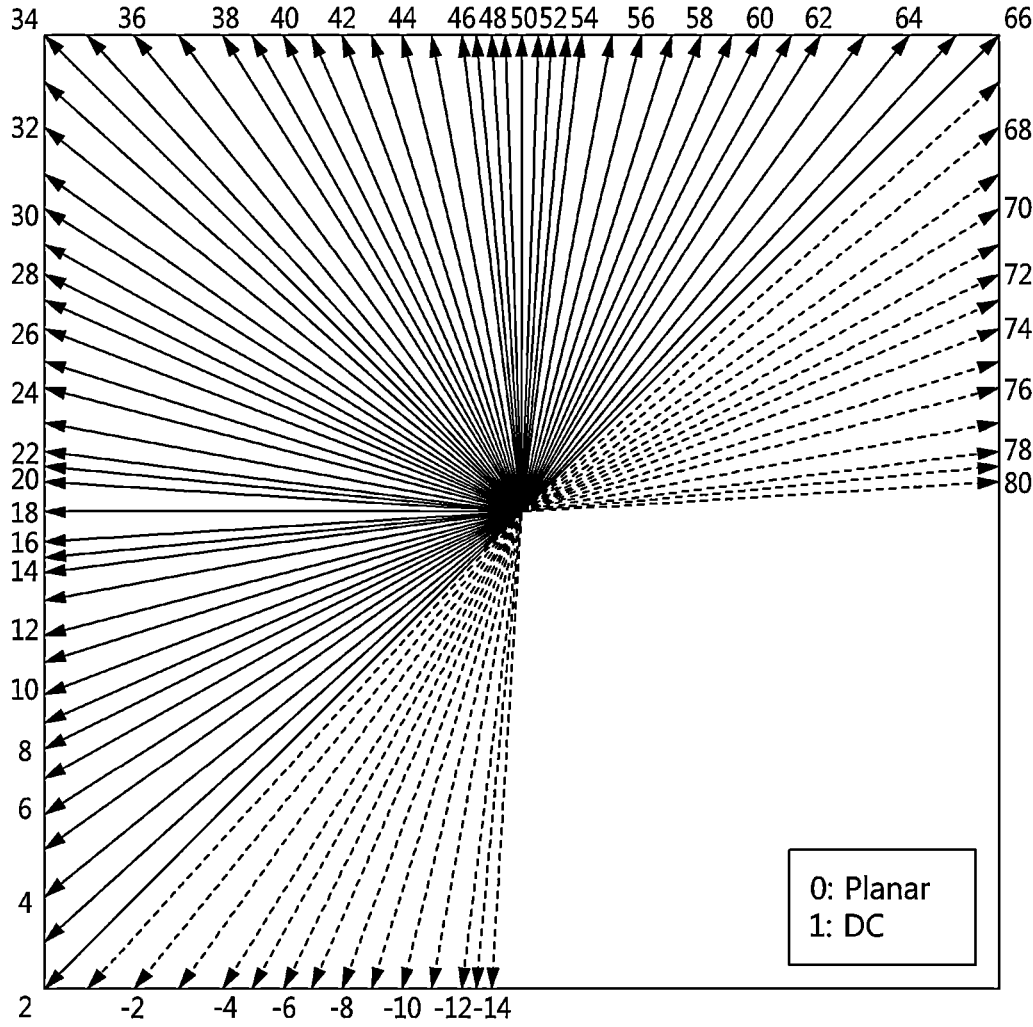
FIG. 7 is a diagram for explaining an embodiment of an intra prediction procedure.

FIG. 7 is a diagram for explaining an embodiment of an intra prediction procedure.

Arrows radially extending from the center of the graph in FIG. 7 indicate the prediction directions of directional intra prediction modes. Further, numbers appearing near the arrows indicate examples of mode values assigned to intra prediction modes or to the prediction directions of the intra prediction modes.

In FIG. 7, A number "0" may represent a Planar mode which is a non-directional intra prediction mode. A number "1" may represent a DC mode which is a non-directional intra prediction mode.

Intra encoding and/or decoding may be performed using a reference sample of a neighbor unit of a target block. The neighbor block may be a reconstructed neighbor block. The reference sample may mean a neighbor sample.

For example, intra encoding and/or decoding may be performed using the value of a reference sample which are included in a reconstructed neighbor block or the coding parameters of the reconstructed neighbor block.

The encoding apparatus 100 and/or the decoding apparatus 200 may generate a prediction block by performing intra prediction on a target block based on information about samples in a target image. When intra prediction is performed, the encoding apparatus 100 and/or the decoding apparatus 200 may generate a prediction block for the target block by performing intra prediction based on information about samples in the target image. When intra prediction is performed, the encoding apparatus 100 and/or the decoding apparatus 200 may perform directional prediction and/or non-directional prediction based on at least one reconstructed reference sample.

A prediction block may be a block generated as a result of performing intra prediction. A prediction block may correspond to at least one of a CU, a PU, and a TU.

The unit of a prediction block may have a size corresponding to at least one of a CU, a PU, and a TU. The prediction block may have a square shape having a size of 2N×2N or N×N. The size of N×N may include sizes of 4×4, 8×8, 16×16, 32×32, 64×64, or the like.

Alternatively, a prediction block may a square block having a size of 2×2, 4×4, 8×8, 16×16, 32×32, 64×64 or the like or a rectangular block having a size of 2×8, 4×8, 2×16, 4×16, 8×16, or the like.

Intra prediction may be performed in consideration of the intra prediction mode for the target block. The number of intra prediction modes that the target block can have may be a predefined fixed value, and may be a value determined differently depending on the attributes of a prediction block. For example, the attributes of the prediction block may include the size of the prediction block, the type of prediction block, etc. Further, the attribute of a prediction block may indicate a coding parameter for the prediction block.

For example, the number of intra prediction modes may be fixed at N regardless of the size of a prediction block. Alternatively, the number of intra prediction modes may be, for example, 3, 5, 9, 17, 34, 35, 36, 65, 67 or 95.

The intra prediction modes may be non-directional modes or directional modes.

For example, the intra prediction modes may include two non-directional modes and 65 directional modes corresponding to numbers 0 to 66 illustrated in FIG. 7.

For example, the intra prediction modes may include two non-directional modes and 93 directional modes corresponding to numbers −14 to 80 illustrated in FIG. 7 in a case that a specific intra prediction method is used.

The two non-directional modes may include a DC mode and a planar mode.

A directional mode may be a prediction mode having a specific direction or a specific angle. The directional mode may also be referred to as an "angular mode".

An intra prediction mode may be represented by at least one of a mode number, a mode value, a mode angle, and a mode direction. In other words, the terms "(mode) number of the intra prediction mode", "(mode) value of the intra prediction mode", "(mode) angle of the intra prediction mode", and "(mode) direction of the intra prediction mode" may be used to have the same meaning, and may be used interchangeably with each other.

The number of intra prediction modes may be M. The value of M may be 1 or more. In other words, the number of intra prediction modes may be M, which includes the number of non-directional modes and the number of directional modes.

The number of intra prediction modes may be fixed to M regardless of the size and/or the color component of a block. For example, the number of intra prediction modes may be fixed at any one of 35 and 67 regardless of the size of a block.

Alternatively, the number of intra prediction modes may differ depending on the shape, the size and/or the type of the color component of a block.

For example, in FIG. 7, directional prediction modes illustrated as dashed lines may be applied only for a prediction for a non-square block.

For example, the larger the size of the block, the greater the number of intra prediction modes. Alternatively, the larger the size of the block, the smaller the number of intra prediction modes. When the size of the block is 4×4 or 8×8, the number of intra prediction modes may be 67. When the size of the block is 16×16, the number of intra prediction modes may be 35. When the size of the block is 32×32, the number of intra prediction modes may be 19. When the size of a block is 64×64, the number of intra prediction modes may be 7.

For example, the number of intra prediction modes may differ depending on whether a color component is a luma signal or a chroma signal. Alternatively, the number of intra prediction modes corresponding to a luma component block may be greater than the number of intra prediction modes corresponding to a chroma component block.

For example, in a vertical mode having a mode value of 50, prediction may be performed in a vertical direction based on the pixel value of a reference sample. For example, in a horizontal mode having a mode value of 18, prediction may be performed in a horizontal direction based on the pixel value of a reference sample.

Even in directional modes other than the above-described mode, the encoding apparatus 100 and the decoding apparatus 200 may perform intra prediction on a target unit using reference samples depending on angles corresponding to the directional modes.

Intra prediction modes located on a right side with respect to the vertical mode may be referred to as 'vertical-right modes'. Intra prediction modes located below the horizontal mode may be referred to as 'horizontal-below modes'. For example, in FIG. 7, the intra prediction modes in which a mode value is one of 51, 52, 53, 54, 55, 56, 57, 58, 59, 60, 61, 62, 63, 64, 65, and 66 may be vertical-right modes. Intra prediction modes in which a mode value is one of 2, 3, 4, 5, 6, 7, 8, 9, 10, 11, 12, 13, 14, 15, 16, and 17 may be horizontal-below modes.

The non-directional mode may include a DC mode and a planar mode. For example, a value of the DC mode may be 1. A value of the planar mode may be 0.

The directional mode may include an angular mode. Among the plurality of the intra prediction modes, remaining modes except for the DC mode and the planar mode may be directional modes.

When the intra prediction mode is a DC mode, a prediction block may be generated based on the average of pixel values of a plurality of reference pixels. For example, a value of a pixel of a prediction block may be determined based on the average of pixel values of a plurality of reference pixels.

The number of above-described intra prediction modes and the mode values of respective intra prediction modes are merely exemplary. The number of above-described intra prediction modes and the mode values of respective intra prediction modes may be defined differently depending on the embodiments, implementation and/or requirements.

In order to perform intra prediction on a target block, the step of checking whether samples included in a reconstructed neighbor block can be used as reference samples of a target block may be performed. When a sample that cannot be used as a reference sample of the target block is present among samples in the neighbor block, a value generated via copying and/or interpolation that uses at least one sample value, among the samples included in the reconstructed neighbor block, may replace the sample value of the sample that cannot be used as the reference sample. When the value generated via copying and/or interpolation replaces the sample value of the existing sample, the sample may be used as the reference sample of the target block.

When intra prediction is used, a filter may be applied to at least one of a reference sample and a prediction sample based on at least one of the intra prediction mode and the size of the target block.

The type of filter to be applied to at least one of a reference sample and a prediction sample may differ depending on at least one of the intra prediction mode of a target block, the size of the target block, and the shape of the target block. The types of filters may be classified depending on one or more of the length of filter tap, the value of a filter coefficient, and filter strength. The length of filter tap may mean the number of filter taps. Also, the number of filter tap may mean the length of the filter.

When the intra prediction mode is a planar mode, a sample value of a prediction target block may be generated using a weighted sum of an above reference sample of the target block, a left reference sample of the target block, an above-right reference sample of the target block, and a below-left reference sample of the target block depending on the location of the prediction target sample in the prediction block when the prediction block of the target block is generated.

When the intra prediction mode is a DC mode, the average of reference samples above the target block and the reference samples to the left of the target block may be used when the prediction block of the target block is generated. Also, filtering using the values of reference samples may be performed on specific rows or specific columns in the target block. The specific rows may be one or more upper rows adjacent to the reference sample. The specific columns may be one or more left columns adjacent to the reference sample.

When the intra prediction mode is a directional mode, a prediction block may be generated using the above reference samples, left reference samples, above-right reference sample and/or below-left reference sample of the target block.

In order to generate the above-described prediction sample, real-number-based interpolation may be performed.

The intra prediction mode of the target block may be predicted from intra prediction mode of a neighbor block adjacent to the target block, and the information used for prediction may be entropy-encoded/decoded.

For example, when the intra prediction modes of the target block and the neighbor block are identical to each other, it may be signaled, using a predefined flag, that the intra prediction modes of the target block and the neighbor block are identical.

For example, an indicator for indicating an intra prediction mode identical to that of the target block, among intra prediction modes of multiple neighbor blocks, may be signaled.

When the intra prediction modes of the target block and a neighbor block are different from each other, information about the intra prediction mode of the target block may be encoded and/or decoded using entropy encoding and/or decoding.

Figure 8:
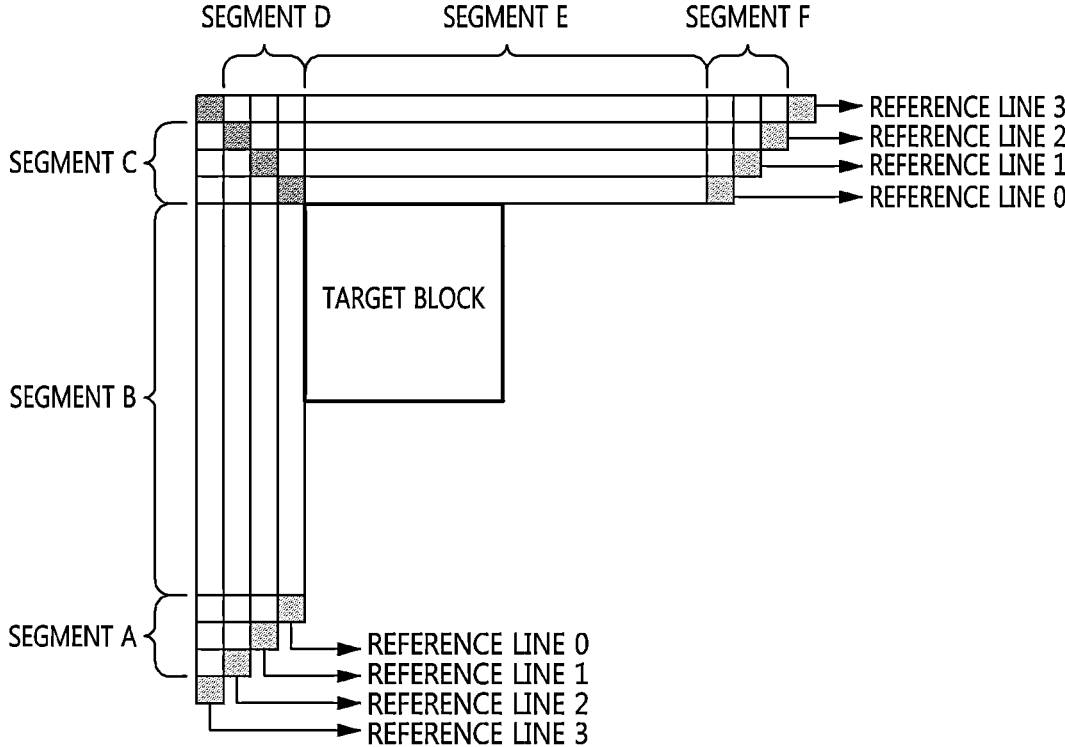
FIG. 8 is a diagram illustrating reference samples used in an intra prediction procedure.

FIG. 8 is a diagram illustrating reference samples used in an intra prediction procedure.

Reconstructed reference samples used for intra prediction of the target block may include below-left reference samples, left reference samples, an above-left corner reference sample, above reference samples, and above-right reference samples.

For example, the left reference samples may mean reconstructed reference pixels adjacent to the left side of the target block. The above reference samples may mean reconstructed reference pixels adjacent to the top of the target block. The above-left corner reference sample may mean a reconstructed reference pixel located at the above-left corner of the target block. The below-left reference samples may mean reference samples located below a left sample line composed of the left reference samples, among samples located on the same line as the left sample line. The above-right reference samples may mean reference samples located to the right of an above sample line composed of the above reference samples, among samples located on the same line as the above sample line.

When the size of a target block is N×N, the numbers of the below-left reference samples, the left reference samples, the above reference samples, and the above-right reference samples may each be N.

By performing intra prediction on the target block, a prediction block may be generated. The generation of the prediction block may include the determination of the values of pixels in the prediction block. The sizes of the target block and the prediction block may be equal.

The reference samples used for intra prediction of the target block may vary depending on the intra prediction mode of the target block. The direction of the intra prediction mode may represent a dependence relationship between the reference samples and the pixels of the prediction block. For example, the value of a specified reference sample may be used as the values of one or more specified pixels in the prediction block. In this case, the specified reference sample and the one or more specified pixels in the prediction block may be the sample and pixels which are positioned in a straight line in the direction of an intra prediction mode. In other words, the value of the specified reference sample may be copied as the value of a pixel located in a direction reverse to the direction of the intra prediction mode. Alternatively, the value of a pixel in the prediction block may be the value of a reference sample located in the direction of the intra prediction mode with respect to the location of the pixel.

In an example, when the intra prediction mode of a target block is a vertical mode, the above reference samples may be used for intra prediction. When the intra prediction mode is the vertical mode, the value of a pixel in the prediction block may be the value of a reference sample vertically located above the location of the pixel. Therefore, the above reference samples adjacent to the top of the target block may be used for intra prediction. Furthermore, the values of pixels in one row of the prediction block may be identical to those of the above reference samples.

In an example, when the intra prediction mode of a target block is a horizontal mode, the left reference samples may be used for intra prediction. When the intra prediction mode is the horizontal mode, the value of a pixel in the prediction block may be the value of a reference sample horizontally located left to the location of the pixel. Therefore, the left reference samples adjacent to the left of the target block may be used for intra prediction. Furthermore, the values of pixels in one column of the prediction block may be identical to those of the left reference samples.

In an example, when the mode value of the intra prediction mode of the current block is 34, at least some of the left reference samples, the above-left corner reference sample, and at least some of the above reference samples may be used for intra prediction. When the mode value of the intra prediction mode is 18, the value of a pixel in the prediction block may be the value of a reference sample diagonally located at the above-left corner of the pixel.

Further, At least a part of the above-right reference samples may be used for intra prediction in a case that an intra prediction mode of which a mode value is a value ranging from 52 to 66.

Further, At least a part of the below-left reference samples may be used for intra prediction in a case that an intra prediction mode of which a mode value is a value ranging from 2 to 17.

Further, the above-left corner reference sample may be used for intra prediction in a case that a intra prediction mode of which a mode value is a value ranging from 19 to 49.

The number of reference samples used to determine the pixel value of one pixel in the prediction block may be either 1, or 2 or more.

As described above, the pixel value of a pixel in the prediction block may be determined depending on the location of the pixel and the location of a reference sample indicated by the direction of the intra prediction mode. When the location of the pixel and the location of the reference sample indicated by the direction of the intra prediction mode are integer positions, the value of one reference sample indicated by an integer position may be used to determine the pixel value of the pixel in the prediction block.

When the location of the pixel and the location of the reference sample indicated by the direction of the intra prediction mode are not integer positions, an interpolated reference sample based on two reference samples closest to the location of the reference sample may be generated. The value of the interpolated reference sample may be used to determine the pixel value of the pixel in the prediction block. In other words, w % ben the location of the pixel in the prediction block and the location of the reference sample indicated by the direction of the intra prediction mode indicate the location between two reference samples, an interpolated value based on the values of the two samples may be generated.

The prediction block generated via prediction may not be identical to an original target block. In other words, there may be a prediction error which is the difference between the target block and the prediction block, and there may also be a prediction error between the pixel of the target block and the pixel of the prediction block.

Hereinafter, the terms "difference", "error", and "residual" may be used to have the same meaning, and may be used interchangeably with each other.

For example, in the case of directional intra prediction, the longer the distance between the pixel of the prediction block and the reference sample, the greater the prediction error that may occur. Such a prediction error may result in discontinuity between the generated prediction block and neighbor blocks.

In order to reduce the prediction error, filtering for the prediction block may be used. Filtering may be configured to adaptively apply a filter to an area, regarded as having a large prediction error, in the prediction block. For example, the area regarded as having a large prediction error may be the boundary of the prediction block. Further, an area regarded as having a large prediction error in the prediction block may differ depending on the intra prediction mode, and the characteristics of filters may also differ depending thereon.

As illustrated in FIG. 8, for intra prediction of a target block, at least one of reference line 0 to reference line 3 may be used. Each reference line may indicate a reference sample line. As the number of the reference line is lower, a line of reference samples closer to a target block may be indicated.

Samples in segment A and segment F may be acquired through padding that uses samples closest to the target block in segment B and segment E instead of being acquired from reconstructed neighbor blocks.

Index information indicating a reference sample line to be used for intra prediction of the target block may be signaled. The index information may indicate a reference sample line to be used for intra prediction of the target block, among multiple reference sample lines. For example, the index information may have a value corresponding to any one of 0 to 3.

When the top boundary of the target block is the boundary of a CTU, only reference sample line 0 may be available. Therefore, in this case, index information may not be signaled. When an additional reference sample line other than reference sample line 0 is used, filtering of a prediction block, which will be described later, may not be performed.

In the case of inter-color intra prediction, a prediction block for a target block of a second color component may be generated based on the corresponding reconstructed block of a first color component.

For example, the first color component may be a luma component, and the second color component may be a chroma component.

In order to perform inter-color intra prediction, parameters for a linear model between the first color component and the second color component may be derived based on a template.

The template may include reference samples above the target block (above reference samples) and/or reference samples to the left of the target block (left reference samples), and may include above reference samples and/or left reference samples of a reconstructed block of the first color component, which correspond to the reference samples.

For example, parameters for a linear model may be derived using 1) the value of the sample of a first color component having the maximum value, among the samples in the template, 2) the value of the sample of a second color component corresponding to the sample of the first color component, 3) the value of the sample of a first color component having the minimum value, among the samples in the template, and 4) the value of the sample of a second color component corresponding to the sample of the first color component.

When the parameters for the linear model are derived, a prediction block for the target block may be generated by applying the corresponding reconstructed block to the linear model.

Depending on the image format, sub-sampling may be performed on samples neighbor the reconstructed block of the first color component and the corresponding reconstructed block of the first color component. For example, when one sample of the second color component corresponds to four samples of the first color component, one corresponding sample may be calculated by performing sub-sampling on the four samples of the first color component. When sub-sampling is performed, derivation of the parameters for the linear model and inter-color intra prediction may be performed based on the sub-sampled corresponding sample.

Information about whether inter-color intra prediction is performed and/or the range of the template may be signaled in an intra prediction mode.

The target block may be partitioned into two or four sub-blocks in a horizontal direction and/or a vertical direction.

The sub-blocks resulting from the partitioning may be sequentially reconstructed. That is, as intra prediction is performed on each sub-block, a sub-prediction block for the sub-block may be generated. Also, as dequantization (inverse quantization) and/or an inverse transform are performed on each sub-block, a sub-residual block for the corresponding sub-block may be generated. A reconstructed sub-block may be generated by adding the sub-prediction block to the sub-residual block. The reconstructed sub-block may be used as a reference sample for intra prediction of the sub-block having the next priority.

A sub-block may be a block including a specific number (e.g., 16) of samples or more. For example, when the target block is an 8×4 block or a 4×8 block, the target block may be partitioned into two sub-blocks. Also, when the target block is a 4×4 block, the target block cannot be partitioned into sub-blocks. When the target block has another size, the target block may be partitioned into four sub-blocks.

Information about whether intra prediction based on such sub-blocks is performed and/or information about a partition direction (horizontal direction or vertical direction) may be signaled.

Such sub-block-based intra prediction may be limited such that it is performed only when reference sample line 0 is used. When sub-block-based intra prediction is performed, filtering of a prediction block, which will be described below, may not be performed.

A final prediction block may be generated by performing filtering on the prediction block generated via intra prediction.

Filtering may be performed by applying specific weights to a filtering target sample, which is the target to be filtered, a left reference sample, an above reference sample, and/or an above-left reference sample.

The weights and/or reference samples (e.g., the range of reference samples, the locations of the reference samples, etc.) used for filtering may be determined based on at least one of a block size, an intra prediction mode, and the location of the filtering target sample in a prediction block.

For example, filtering may be performed only in a specific intra prediction mode (e.g., DC mode, planar mode, vertical mode, horizontal mode, diagonal mode and/or adjacent diagonal mode).

The adjacent diagonal mode may be a mode having a number obtained by adding k to the number of the diagonal mode, and may be a mode having a number obtained by subtracting k from the number of the diagonal mode. In other words, the number of the adjacent diagonal mode may be the sum of the number of the diagonal mode and k, or may be the difference between the number of the diagonal mode and k. For example, k may be a positive integer of 8 or less.

The intra prediction mode of the target block may be derived using the intra prediction mode of a neighbor block present near the target block, and such a derived intra prediction mode may be entropy-encoded and/or entropy-decoded.

For example, when the intra prediction mode of the target block is identical to the intra prediction mode of the neighbor block, information indicating that the intra prediction mode of the target block is identical to the intra prediction mode of the neighbor block may be signaled using specific flag information.

Further, for example, indicator information for a neighbor block having an intra prediction mode identical to the intra prediction mode of the target block, among intra prediction modes of multiple neighbor blocks, may be signaled.

For example, when the intra prediction mode of the target block is different from the intra prediction mode of the neighbor block, entropy encoding and/or entropy decoding may be performed on information about the intra prediction mode of the target block by performing entropy encoding and/or entropy decoding based on the intra prediction mode of the neighbor block.

Figure 9:
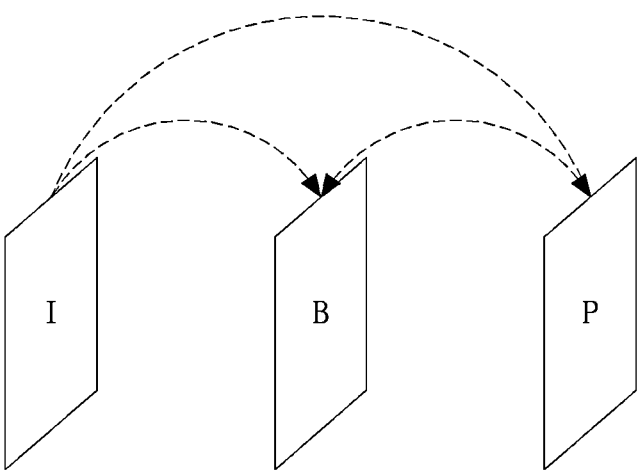
FIG. 9 is a diagram for explaining an embodiment of an inter prediction procedure.

FIG. 9 is a diagram for explaining an embodiment of an inter prediction procedure.

The rectangles shown in FIG. 9 may represent images (or pictures). Further, in FIG. 9, arrows may represent prediction directions. An arrow pointing from a first picture to a second picture means that the second picture refers to the first picture. That is, each image may be encoded and/or decoded depending on the prediction direction.

Images may be classified into an Intra Picture (I picture), a Uni-prediction Picture or Predictive Coded Picture (P picture), and a Bi-prediction Picture or Bi-predictive Coded Picture (B picture) depending on the encoding type. Each picture may be encoded and/or decoded depending on the encoding type thereof.

When a target image that is the target to be encoded is an I picture, the target image may be encoded using data contained in the image itself without inter prediction that refers to other images. For example, an I picture may be encoded only via intra prediction.

When a target image is a P picture, the target image may be encoded via inter prediction, which uses reference pictures existing in one direction. Here, the one direction may be a forward direction or a backward direction.

When a target image is a B picture, the image may be encoded via inter prediction that uses reference pictures existing in two directions, or may be encoded via inter prediction that uses reference pictures existing in one of a forward direction and a backward direction. Here, the two directions may be the forward direction and the backward direction.

A P picture and a B picture that are encoded and/or decoded using reference pictures may be regarded as images in which inter prediction is used.

Below, inter prediction in an inter mode according to an embodiment will be described in detail.

Inter prediction or a motion compensation may be performed using a reference image and motion information.

In an inter mode, the encoding apparatus 100 may perform inter prediction and/or motion compensation on a target block. The decoding apparatus 200 may perform inter prediction and/or motion compensation, corresponding to inter prediction and/or motion compensation performed by the encoding apparatus 100, on a target block.

Motion information of the target block may be individually derived by the encoding apparatus 100 and the decoding apparatus 200 during the inter prediction. The motion information may be derived using motion information of a reconstructed neighbor block, motion information of a col block, and/or motion information of a block adjacent to the col block.

For example, the encoding apparatus 100 or the decoding apparatus 200 may perform prediction and/or motion compensation by using motion information of a spatial candidate and/or a temporal candidate as motion information of the target block. The target block may mean a PU and/or a PU partition.

A spatial candidate may be a reconstructed block which is spatially adjacent to the target block.

A temporal candidate may be a reconstructed block corresponding to the target block in a previously reconstructed co-located picture (col picture).

In inter prediction, the encoding apparatus 100 and the decoding apparatus 200 may improve encoding efficiency and decoding efficiency by utilizing the motion information of a spatial candidate and/or a temporal candidate. The motion information of a spatial candidate may be referred to as 'spatial motion information'. The motion information of a temporal candidate may be referred to as 'temporal motion information'.

Below, the motion information of a spatial candidate may be the motion information of a PU including the spatial candidate. The motion information of a temporal candidate may be the motion information of a PU including the temporal candidate. The motion information of a candidate block may be the motion information of a PU including the candidate block.

Inter prediction may be performed using a reference picture.

The reference picture may be at least one of a picture previous to a target picture and a picture subsequent to the target picture. The reference picture may be an image used for the prediction of the target block.

In inter prediction, a region in the reference picture may be specified by utilizing a reference picture index (or refIdx) for indicating a reference picture, a motion vector, which will be described later, etc. Here, the region specified in the reference picture may indicate a reference block.

Inter prediction may select a reference picture, and may also select a reference block corresponding to the target block from the reference picture. Further, inter prediction may generate a prediction block for the target block using the selected reference block.

The motion information may be derived during inter prediction by each of the encoding apparatus 100 and the decoding apparatus 200.

A spatial candidate may be a block 1) which is present in a target picture, 2) which has been previously reconstructed via encoding and/or decoding, and 3) which is adjacent to the target block or is located at the corner of the target block. Here, the "block located at the corner of the target block" may be either a block vertically adjacent to a neighbor block that is horizontally adjacent to the target block, or a block horizontally adjacent to a neighbor block that is vertically adjacent to the target block. Further, "block located at the corner of the target block" may have the same meaning as "block adjacent to the corner of the target block". The meaning of "block located at the corner of the target block" may be included in the meaning of "block adjacent to the target block".

For example, a spatial candidate may be a reconstructed block located to the left of the target block, a reconstructed block located above the target block, a reconstructed block located at the below-left corner of the target block, a reconstructed block located at the above-right corner of the target block, or a reconstructed block located at the above-left corner of the target block.

Each of the encoding apparatus 100 and the decoding apparatus 200 may identify a block present at the location spatially corresponding to the target block in a col picture. The location of the target block in the target picture and the location of the identified block in the col picture may correspond to each other.

Each of the encoding apparatus 100 and the decoding apparatus 200 may determine a col block present at the predefined relative location for the identified block to be a temporal candidate. The predefined relative location may be a location present inside and/or outside the identified block.

For example, the col block may include a first col block and a second col block. When the coordinates of the identified block are (xP, yP) and the size of the identified block is represented by (nPSW, nPSH), the first col block may be a block located at coordinates (xP+nPSW, yP+nPSH). The second col block may be a block located at coordinates (xP+(nPSW>>1), yP+(nPSH>>1)). The second col block may be selectively used when the first col block is unavailable.

The motion vector of the target block may be determined based on the motion vector of the col block. Each of the encoding apparatus 100 and the decoding apparatus 200 may scale the motion vector of the col block. The scaled motion vector of the col block may be used as the motion vector of the target block. Further, a motion vector for the motion information of a temporal candidate stored in a list may be a scaled motion vector.

The ratio of the motion vector of the target block to the motion vector of the col block may be identical to the ratio of a first temporal distance to a second temporal distance. The first temporal distance may be the distance between the reference picture and the target picture of the target block. The second temporal distance may be the distance between the reference picture and the col picture of the col block.

The scheme for deriving motion information may change depending on the inter prediction mode of a target block. For example, as inter prediction modes applied for inter prediction, an Advanced Motion Vector Predictor (AMVP) mode, a merge mode, a skip mode, a merge mode with a motion vector difference, a sub block merge mode, a triangle partition mode, an inter-intra combined prediction mode, an affine inter mode, a current picture reference mode, etc. may be present. The merge mode may also be referred to as a "motion merge mode". Individual modes will be described in detail below.

1) AMVP Mode

When an AMVP mode is used, the encoding apparatus 100 may search a neighbor region of a target block for a similar block. The encoding apparatus 100 may acquire a prediction block by performing prediction on the target block using motion information of the found similar block. The encoding apparatus 100 may encode a residual block, which is the difference between the target block and the prediction block.

1-1) Creation of List of Prediction Motion Vector Candidates

When an AMVP mode is used as the prediction mode, each of the encoding apparatus 100 and the decoding apparatus 200 may create a list of prediction motion vector candidates using the motion vector of a spatial candidate, the motion vector of a temporal candidate, and a zero vector. The prediction motion vector candidate list may include one or more prediction motion vector candidates. At least one of the motion vector of a spatial candidate, the motion vector of a temporal candidate, and a zero vector may be determined and used as a prediction motion vector candidate.

Hereinafter, the terms "prediction motion vector (candidate)" and "motion vector (candidate)" may be used to have the same meaning, and may be used interchangeably with each other.

Hereinafter, the terms "prediction motion vector candidate" and "AMVP candidate" may be used to have the same meaning, and may be used interchangeably with each other.

Hereinafter, the terms "prediction motion vector candidate list" and "AMVP candidate list" may be used to have the same meaning, and may be used interchangeably with each other.

Spatial candidates may include a reconstructed spatial neighbor block. In other words, the motion vector of the reconstructed neighbor block may be referred to as a "spatial prediction motion vector candidate".

Temporal candidates may include a col block and a block adjacent to the col block. In other words, the motion vector of the col block or the motion vector of the block adjacent to the col block may be referred to as a "temporal prediction motion vector candidate".

The zero vector may be a (0, 0) motion vector.

The prediction motion vector candidates may be motion vector predictors for predicting a motion vector. Also, in the encoding apparatus 100, each prediction motion vector candidate may be an initial search location for a motion vector.

1-2) Search for Motion Vectors that Use List of Prediction Motion Vector Candidates The encoding apparatus 100 may determine the motion vector to be used to encode a target block within a search range using a list of prediction motion vector candidates. Further, the encoding apparatus 100 may determine a prediction motion vector candidate to be used as the prediction motion vector of the target block, among prediction motion vector candidates present in the prediction motion vector candidate list.

The motion vector to be used to encode the target block may be a motion vector that can be encoded at minimum cost.

Further, the encoding apparatus 100 may determine whether to use the AMVP mode to encode the target block.

1-3) Transmission of Inter Prediction Information

The encoding apparatus 100 may generate a bitstream including inter prediction information required for inter prediction. The decoding apparatus 200 may perform inter prediction on the target block using the inter prediction information of the bitstream.

The inter prediction information may contain 1) mode information indicating whether an AMVP mode is used, 2) a prediction motion vector index, 3) a Motion Vector Difference (MVD), 4) a reference direction, and 5) a reference picture index.

Hereinafter, the terms "prediction motion vector index" and "AMVP index" may be used to have the same meaning, and may be used interchangeably with each other.

Further, the inter prediction information may contain a residual signal.

The decoding apparatus 200 may acquire a prediction motion vector index, an MVD, a reference direction, and a reference picture index from the bitstream through entropy decoding when mode information indicates that the AMVP mode is used.

The prediction motion vector index may indicate a prediction motion vector candidate to be used for the prediction of a target block, among prediction motion vector candidates included in the prediction motion vector candidate list.

1-4) Inter Prediction in AMVP Mode that Uses Inter Prediction Information

The decoding apparatus 200 may derive prediction motion vector candidates using a prediction motion vector candidate list, and may determine the motion information of a target block based on the derived prediction motion vector candidates.

The decoding apparatus 200 may determine a motion vector candidate for the target block, among the prediction motion vector candidates included in the prediction motion vector candidate list, using a prediction motion vector index. The decoding apparatus 200 may select a prediction motion vector candidate, indicated by the prediction motion vector index, from among prediction motion vector candidates included in the prediction motion vector candidate list, as the prediction motion vector of the target block.

The encoding apparatus 100 may generate an entropy-encoded prediction motion vector index by applying entropy encoding to a prediction motion vector index, and may generate a bitstream including the entropy-encoded prediction motion vector index. The entropy-encoded prediction motion vector index may be signaled from the encoding apparatus 100 to the decoding apparatus 200 through a bitstream. The decoding apparatus 200 may extract the entropy-encoded prediction motion vector index from the bitstream, and may acquire the prediction motion vector index by applying entropy decoding to the entropy-encoded prediction motion vector index.

The motion vector to be actually used for inter prediction of the target block may not match the prediction motion vector. In order to indicate the difference between the motion vector to be actually used for inter prediction of the target block and the prediction motion vector, an MVD may be used. The encoding apparatus 100 may derive a prediction motion vector similar to the motion vector to be actually used for inter prediction of the target block so as to use an MVD that is as small as possible.

A MVD may be the difference between the motion vector of the target block and the prediction motion vector. The encoding apparatus 100 may calculate the MVD, and may generate an entropy-encoded MVD by applying entropy encoding to the MVD. The encoding apparatus 100 may generate a bitstream including the entropy-encoded MVD.

The MVD may be transmitted from the encoding apparatus 100 to the decoding apparatus 200 through the bitstream. The decoding apparatus 200 may extract the entropy-encoded MVD from the bitstream, and may acquire the MVD by applying entropy decoding to the entropy-encoded MVD.

The decoding apparatus 200 may derive the motion vector of the target block by summing the MVD and the prediction motion vector. In other words, the motion vector of the target block derived by the decoding apparatus 200 may be the sum of the MVD and the motion vector candidate.

Also, the encoding apparatus 100 may generate entropy-encoded MVD resolution information by applying entropy encoding to calculated MVD resolution information, and may generate a bitstream including the entropy-encoded MVD resolution information. The decoding apparatus 200 may extract the entropy-encoded MVD resolution information from the bitstream, and may acquire MVD resolution information by applying entropy decoding to the entropy-encoded MVD resolution information. The decoding apparatus 200 may adjust the resolution of the MVD using the MVD resolution information.

Meanwhile, the encoding apparatus 100 may calculate an MVD based on an affine model. The decoding apparatus 200 may derive the affine control motion vector of the target block through the sum of the MVD and an affine control motion vector candidate, and may derive the motion vector of a sub-block using the affine control motion vector.

The reference direction may indicate a list of reference pictures to be used for prediction of the target block. For example, the reference direction may indicate one of a reference picture list L0 and a reference picture list L1.

The reference direction merely indicates the reference picture list to be used for prediction of the target block, and may not mean that the directions of reference pictures are limited to a forward direction or a backward direction. In other words, each of the reference picture list L0 and the reference picture list L1 may include pictures in a forward direction and/or a backward direction.

That the reference direction is unidirectional may mean that a single reference picture list is used. That the reference direction is bidirectional may mean that two reference picture lists are used. In other words, the reference direction may indicate one of the case where only the reference picture list L0 is used, the case where only the reference picture list L1 is used, and the case where two reference picture lists are used.

The reference picture index may indicate a reference picture that is used for prediction of the target block, among reference pictures present in a reference picture list. The encoding apparatus 100 may generate an entropy-encoded reference picture index by applying entropy encoding to the reference picture index, and may generate a bitstream including the entropy-encoded reference picture index. The entropy-encoded reference picture index may be signaled from the encoding apparatus 100 to the decoding apparatus 200 through the bitstream. The decoding apparatus 200 may extract the entropy-encoded reference picture index from the bitstream, and may acquire the reference picture index by applying entropy decoding to the entropy-encoded reference picture index.

When two reference picture lists are used to predict the target block, a single reference picture index and a single motion vector may be used for each of the reference picture lists. Further, when two reference picture lists are used to predict the target block, two prediction blocks may be specified for the target block. For example, the (final) prediction block of the target block may be generated using the average or weighted sum of the two prediction blocks for the target block.

The motion vector of the target block may be derived by the prediction motion vector index, the MVD, the reference direction, and the reference picture index.

The decoding apparatus 200 may generate a prediction block for the target block based on the derived motion vector and the reference picture index. For example, the prediction block may be a reference block, indicated by the derived motion vector, in the reference picture indicated by the reference picture index.

Since the prediction motion vector index and the MVD are encoded without the motion vector itself of the target block being encoded, the number of bits transmitted from the encoding apparatus 100 to the decoding apparatus 200 may be decreased, and encoding efficiency may be improved.

For the target block, the motion information of reconstructed neighbor blocks may be used. In a specific inter prediction mode, the encoding apparatus 100 may not separately encode the actual motion information of the target block. The motion information of the target block is not encoded, and additional information that enables the motion information of the target block to be derived using the motion information of reconstructed neighbor blocks may be encoded instead. As the additional information is encoded, the number of bits transmitted to the decoding apparatus 200 may be decreased, and encoding efficiency may be improved.

For example, as inter prediction modes in which the motion information of the target block is not directly encoded, there may be a skip mode and/or a merge mode. Here, each of the encoding apparatus 100 and the decoding apparatus 200 may use an identifier and/or an index that indicates a unit, the motion information of which is to be used as the motion information of the target unit, among reconstructed neighbor units.

2) Merge Mode

As a scheme for deriving the motion information of a target block, there is merging. The term "merging" may mean the merging of the motion of multiple blocks. "Merging" may mean that the motion information of one block is also applied to other blocks. In other words, a merge mode may be a mode in which the motion information of the target block is derived from the motion information of a neighbor block.

When a merge mode is used, the encoding apparatus 100 may predict the motion information of a target block using the motion information of a spatial candidate and/or the motion information of a temporal candidate. The spatial candidate may include a reconstructed spatial neighbor block that is spatially adjacent to the target block. The spatial neighbor block may include a left neighbor block and an above neighbor block. The temporal candidate may include a col block. The terms "spatial candidate" and "spatial merge candidate" may be used to have the same meaning, and may be used interchangeably with each other. The terms "temporal candidate" and "temporal merge candidate" may be used to have the same meaning, and may be used interchangeably with each other.

The encoding apparatus 100 may acquire a prediction block via prediction. The encoding apparatus 100 may encode a residual block, which is the difference between the target block and the prediction block.

2-1) Creation of Merge Candidate List

When the merge mode is used, each of the encoding apparatus 100 and the decoding apparatus 200 may create a merge candidate list using the motion information of a spatial candidate and/or the motion information of a temporal candidate. The motion information may include 1) a motion vector, 2) a reference picture index, and 3) a reference direction. The reference direction may be unidirectional or bidirectional. The reference direction may mean a inter prediction indicator.

The merge candidate list may include merge candidates. The merge candidates may be motion information. In other words, the merge candidate list may be a list in which pieces of motion information are stored.

The merge candidates may be pieces of motion information of temporal candidates and/or spatial candidates. In other words, the merge candidates list may comprise motion information of a temporal candidates and/or spatial candidates, etc.

Further, the merge candidate list may include new merge candidates generated by a combination of merge candidates that are already present in the merge candidate list. In other words, the merge candidate list may include new motion information generated by a combination of pieces of motion information previously present in the merge candidate list.

Also, a merge candidate list may include history-based merge candidates. The history-based merge candidates may be the motion information of a block which is encoded and/or decoded prior to a target block.

Also, a merge candidate list may include a merge candidate based on an average of two merge candidates.

The merge candidates may be specific modes deriving inter prediction information. The merge candidate may be information indicating a specific mode deriving inter prediction information. Inter prediction information of a target block may be derived according to a specific mode which the merge candidate indicates. Furthermore, the specific mode may include a process of deriving a series of inter prediction information. This specific mode may be an inter prediction information derivation mode or a motion information derivation mode.

The inter prediction information of the target block may be derived according to the mode indicated by the merge candidate selected by the merge index among the merge candidates in the merge candidate list.

For example, the motion information derivation modes in the merge candidate list may be at least one of 1) motion information derivation mode for a sub-block unit and 2) an affine motion information derivation mode.

Furthermore, the merge candidate list may include motion information of a zero vector. The zero vector may also be referred to as a "zero-merge candidate".

In other words, pieces of motion information in the merge candidate list may be at least one of 1) motion information of a spatial candidate, 2) motion information of a temporal candidate, 3) motion information generated by a combination of pieces of motion information previously present in the merge candidate list, and 4) a zero vector.

Motion information may include 1) a motion vector, 2) a reference picture index, and 3) a reference direction. The reference direction may also be referred to as an "inter prediction indicator". The reference direction may be unidirectional or bidirectional. The unidirectional reference direction may indicate L0 prediction or L1 prediction.

The merge candidate list may be created before prediction in the merge mode is performed.

The number of merge candidates in the merge candidate list may be predefined. Each of the encoding apparatus 100 and the decoding apparatus 200 may add merge candidates to the merge candidate list depending on the predefined scheme and predefined priorities so that the merge candidate list has a predefined number of merge candidates. The merge candidate list of the encoding apparatus 100 and the merge candidate list of the decoding apparatus 200 may be made identical to each other using the predefined scheme and the predefined priorities.

Merging may be applied on a CU basis or a PU basis. When merging is performed on a CU basis or a PU basis, the encoding apparatus 100 may transmit a bitstream including predefined information to the decoding apparatus 200. For example, the predefined information may contain 1) information indicating whether to perform merging for individual block partitions, and 2) information about a block with which merging is to be performed, among blocks that are spatial candidates and/or temporal candidates for the target block.

2-2) Search for Motion Vector that Uses Merge Candidate List

The encoding apparatus 100 may determine merge candidates to be used to encode a target block. For example, the encoding apparatus 100 may perform prediction on the target block using merge candidates in the merge candidate list, and may generate residual blocks for the merge candidates. The encoding apparatus 100 may use a merge candidate that incurs the minimum cost in prediction and in the encoding of residual blocks to encode the target block.

Further, the encoding apparatus 100 may determine whether to use a merge mode to encode the target block.

2-3) Transmission of Inter Prediction Information

The encoding apparatus 100 may generate a bitstream that includes inter prediction information required for inter prediction. The encoding apparatus 100 may generate entropy-encoded inter prediction information by performing entropy encoding on inter prediction information, and may transmit a bitstream including the entropy-encoded inter prediction information to the decoding apparatus 200. Through the bitstream, the entropy-encoded inter prediction information may be signaled to the decoding apparatus 200 by the encoding apparatus 100. The decoding apparatus 200 may extract entropy-encoded inter prediction information from the bitstream, and may acquire inter prediction information by applying entropy decoding to the entropy-encoded inter prediction information.

The decoding apparatus 200 may perform inter prediction on the target block using the inter prediction information of the bitstream.

The inter prediction information may contain 1) mode information indicating whether a merge mode is used, 2) a merge index and 3) correction information.

Further, the inter prediction information may contain a residual signal.

The decoding apparatus 200 may acquire the merge index from the bitstream only when the mode information indicates that the merge mode is used.

The mode information may be a merge flag. The unit of the mode information may be a block. Information about the block may include mode information, and the mode information may indicate whether a merge mode is applied to the block.

The merge index may indicate a merge candidate to be used for the prediction of the target block, among merge candidates included in the merge candidate list. Alternatively, the merge index may indicate a block with which the target block is to be merged, among neighbor blocks spatially or temporally adjacent to the target block.

The encoding apparatus 100 may select a merge candidate having the highest encoding performance among the merge candidates included in the merge candidate list and set a value of the merge index to indicate the selected merge candidate.

Correction information may be information used to correct a motion vector. The encoding apparatus 100 may generate correction information. The decoding apparatus 200 may correct the motion vector of a merge candidate selected by a merge index based on the correction information.

The correction information may include at least one of information indicating whether correction is to be performed, correction direction information, and correction size information. A prediction mode in which the motion vector is corrected based on the signaled correction information may be referred to as a "merge mode having a motion vector difference".

2-4) Inter Prediction of Merge Mode that Uses Inter Prediction Information

The decoding apparatus 200 may perform prediction on the target block using the merge candidate indicated by the merge index, among merge candidates included in the merge candidate list.

The motion vector of the target block may be specified by the motion vector, reference picture index, and reference direction of the merge candidate indicated by the merge index.

3) Skip Mode

A skip mode may be a mode in which the motion information of a spatial candidate or the motion information of a temporal candidate is applied to the target block without change. Also, the skip mode may be a mode in which a residual signal is not used. In other words, when the skip mode is used, a reconstructed block may be the same as a prediction block.

The difference between the merge mode and the skip mode lies in whether or not a residual signal is transmitted or used. That is, the skip mode may be similar to the merge mode except that a residual signal is not transmitted or used.

When the skip mode is used, the encoding apparatus 100 may transmit information about a block, the motion information of which is to be used as the motion information of the target block, among blocks that are spatial candidates or temporal candidates, to the decoding apparatus 200 through a bitstream. The encoding apparatus 100 may generate entropy-encoded information by performing entropy encoding on the information, and may signal the entropy-encoded information to the decoding apparatus 200 through a bitstream. The decoding apparatus 200 may extract entropy-encoded information from the bitstream, and may acquire information by applying entropy decoding to the entropy-encoded information.

Further, when the skip mode is used, the encoding apparatus 100 may not transmit other syntax information, such as an MVD, to the decoding apparatus 200. For example, when the skip mode is used, the encoding apparatus 100 may not signal a syntax element related to at least one of an MVD, a coded block flag, and a transform coefficient level to the decoding apparatus 200.

3-1) Creation of Merge Candidate List

The skip mode may also use a merge candidate list. In other words, a merge candidate list may be used both in the merge mode and in the skip mode. In this aspect, the merge candidate list may also be referred to as a "skip candidate list" or a "merge/skip candidate list".

Alternatively, the skip mode may use an additional candidate list different from that of the merge mode. In this case, in the following description, a merge candidate list and a merge candidate may be replaced with a skip candidate list and a skip candidate, respectively.

The merge candidate list may be created before prediction in the skip mode is performed.

3-2) Search for Motion Vector that Uses Merge Candidate List

The encoding apparatus 100 may determine the merge candidates to be used to encode a target block. For example, the encoding apparatus 100 may perform prediction on the target block using the merge candidates in a merge candidate list. The encoding apparatus 100 may use a merge candidate that incurs the minimum cost in prediction to encode the target block.

Further, the encoding apparatus 100 may determine whether to use a skip mode to encode the target block.

3-3) Transmission of Inter Prediction Information

The encoding apparatus 100 may generate a bitstream that includes inter prediction information required for inter prediction. The decoding apparatus 200 may perform inter prediction on the target block using the inter prediction information of the bitstream.

The inter prediction information may include 1) mode information indicating whether a skip mode is used, and 2) a skip index.

The skip index may be identical to the above-described merge index.

When the skip mode is used, the target block may be encoded without using a residual signal. The inter prediction information may not contain a residual signal. Alternatively, the bitstream may not include a residual signal.

The decoding apparatus 200 may acquire a skip index from the bitstream only when the mode information indicates that the skip mode is used. As described above, a merge index and a skip index may be identical to each other. The decoding apparatus 200 may acquire the skip index from the bitstream only when the mode information indicates that the merge mode or the skip mode is used.

The skip index may indicate the merge candidate to be used for the prediction of the target block, among the merge candidates included in the merge candidate list.

3-4) Inter Prediction in Skin Mode that Uses Inter Prediction Information

The decoding apparatus 200 may perform prediction on the target block using a merge candidate indicated by a skip index, among the merge candidates included in a merge candidate list.

The motion vector of the target block may be specified by the motion vector, reference picture index, and reference direction of the merge candidate indicated by the skip index.

4) Current Picture Reference Mode

The current picture reference mode may denote a prediction mode that uses a previously reconstructed region in a target picture to which a target block belongs.

A motion vector for specifying the previously reconstructed region may be used. Whether the target block has been encoded in the current picture reference mode may be determined using the reference picture index of the target block.

A flag or index indicating whether the target block is a block encoded in the current picture reference mode may be signaled by the encoding apparatus 100 to the decoding apparatus 200. Alternatively, whether the target block is a block encoded in the current picture reference mode may be inferred through the reference picture index of the target block.

When the target block is encoded in the current picture reference mode, the target picture may exist at a fixed location or an arbitrary location in a reference picture list for the target block.

For example, the fixed location may be either a location where a value of the reference picture index is 0 or the last location.

When the target picture exists at an arbitrary location in the reference picture list, an additional reference picture index indicating such an arbitrary location may be signaled by the encoding apparatus 100 to the decoding apparatus 200.

5) Sub-Block Merge Mode

A sub-block merge mode may be a mode in which motion information is derived from the sub-block of a CU.

When the sub-block merge mode is applied, a sub-block merge candidate list may be generated using the motion information of a co-located sub-block (col-sub-block) of a target sub-block (i.e., a sub-block-based temporal merge candidate) in a reference image and/or an affine control point motion vector merge candidate.

6) Triangle Partition Mode

In a triangle partition mode, a target block may be partitioned in a diagonal direction, and sub-target blocks resulting from partitioning may be generated. For each sub-target block, motion information of the corresponding sub-target block may be derived, and a prediction sample for each sub-target block may be derived using the derived motion information. A prediction sample for the target block may be derived through a weighted sum of the prediction samples for the sub-target blocks resulting from the partitioning.

7) Combination Inter-Intra Prediction Mode

The combination inter-intra prediction mode may be a mode in which a prediction sample for a target block is derived using a weighted sum of a prediction sample generated via inter prediction and a prediction sample generated via intra prediction.

In the above-described modes, the decoding apparatus 200 may autonomously correct derived motion information. For example, the decoding apparatus 200 may search a specific area for motion information having the minimum sum of Absolute Differences (SAD) based on a reference block indicated by the derived motion information, and may derive the found motion information as corrected motion information.

In the above-described modes, the decoding apparatus 200 may compensate for the prediction sample derived via inter prediction using an optical flow.

In the above-described AMVP mode, merge mode, skip mode, etc., motion information to be used for prediction of the target block may be specified among pieces of motion information in a list using the index information of the list.

In order to improve encoding efficiency, the encoding apparatus 100 may signal only the index of an element that incurs the minimum cost in inter prediction of the target block, among elements in the list. The encoding apparatus 100 may encode the index, and may signal the encoded index.

Therefore, the above-described lists (i.e. the prediction motion vector candidate list and the merge candidate list) must be able to be derived by the encoding apparatus 100 and the decoding apparatus 200 using the same scheme based on the same data. Here, the same data may include a reconstructed picture and a reconstructed block. Further, in order to specify an element using an index, the order of the elements in the list must be fixed.

Figure 10:
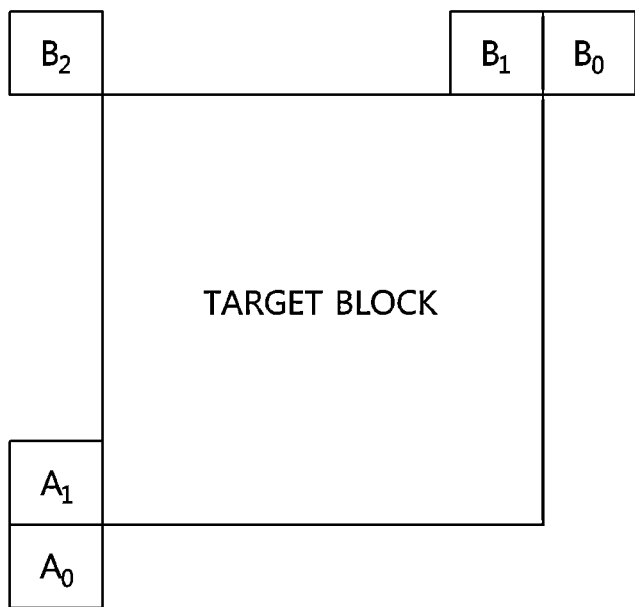
FIG. 10 illustrates spatial candidates according to an embodiment.

FIG. 10 illustrates spatial candidates according to an embodiment.

In FIG. 10, the locations of spatial candidates are illustrated.

The large block in the center of the drawing may denote a target block. Five small blocks may denote spatial candidates.

The coordinates of the target block may be (xP, yP), and the size of the target block may be represented by (nPSW, nPSH).

Spatial candidate $A_0$ may be a block adjacent to the below-left corner of the target block. $A_0$ may be a block that occupies pixels located at coordinates (xP−1, yP+nPSH+1).

Spatial candidate $A_1$ may be a block adjacent to the left of the target block. $A_1$ may be a lowermost block, among blocks adjacent to the left of the target block. Alternatively, $A_1$ may be a block adjacent to the top of $A_0$. $A_1$ may be a block that occupies pixels located at coordinates (xP−1, yP+nPSH).

Spatial candidate $B_0$ may be a block adjacent to the above-right corner of the target block. $B_0$ may be a block that occupies pixels located at coordinates (xP+nPSW+1, yP−1).

Spatial candidate $B_1$ may be a block adjacent to the top of the target block. $B_1$ may be a rightmost block, among blocks adjacent to the top of the target block. Alternatively. $B_1$ may be a block adjacent to the left of $B_0$. $B_1$ may be a block that occupies pixels located at coordinates (xP+nPSW, yP−1).

Spatial candidate $B_2$ may be a block adjacent to the above-left corner of the target block. $B_2$ may be a block that occupies pixels located at coordinates (xP−1, yP−1).

Determination of Availability of Spatial Candidate and Temporal Candidate

In order to include the motion information of a spatial candidate or the motion information of a temporal candidate in a list, it must be determined whether the motion information of the spatial candidate or the motion information of the temporal candidate is available.

Hereinafter, a candidate block may include a spatial candidate and a temporal candidate.

For example, the determination may be performed by sequentially applying the following steps 1) to 4).

Step 1) When a PU including a candidate block is out of the boundary of a picture, the availability of the candidate block may be set to "false". The expression "availability is set to false" may have the same meaning as "set to be unavailable".

Step 2) When a PU including a candidate block is out of the boundary of a slice, the availability of the candidate block may be set to "false". When the target block and the candidate block are located in different slices, the availability of the candidate block may be set to "false".

Step 3) When a PU including a candidate block is out of the boundary of a tile, the availability of the candidate block may be set to "false". When the target block and the candidate block are located in different tiles, the availability of the candidate block may be set to "false".

Step 4) When the prediction mode of a PU including a candidate block is an intra prediction mode, the availability of the candidate block may be set to "false". When a PU including a candidate block does not use inter prediction, the availability of the candidate block may be set to "false".

Figure 11:
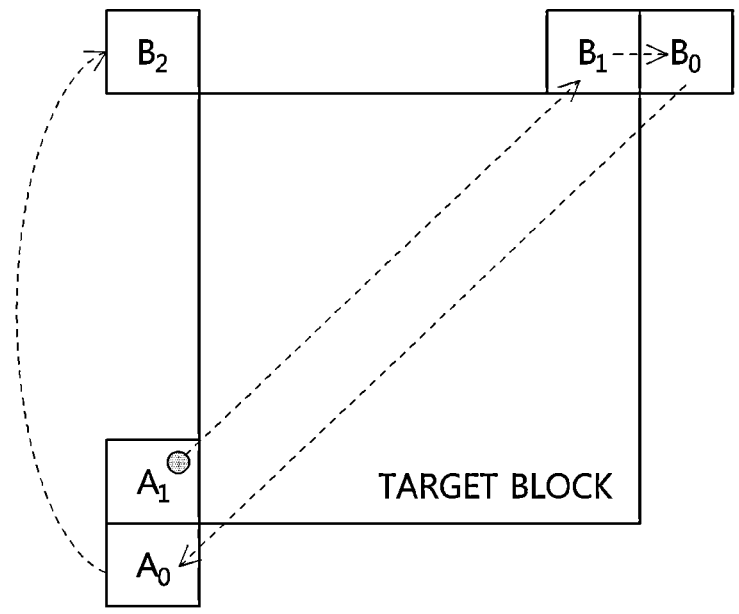
FIG. 11 illustrates the order of addition of motion information of spatial candidates to a merge list according to an embodiment.

FIG. 11 illustrates the order of addition of motion information of spatial candidates to a merge list according to an embodiment.

As shown in FIG. 11, when pieces of motion information of spatial candidates are added to a merge list, the order of $A_1, B_1, B_0, A_0$, and $B_2$ may be used. That is, pieces of motion information of available spatial candidates may be added to the merge list in the order of $A_1, B_1, B_0, A_0$, and $B_2$.

Method for Deriving Merge List in Merge Mode and Skip Mode

As described above, the maximum number of merge candidates in the merge list may be set. The set maximum number is indicated by "N". The set number may be transmitted from the encoding apparatus 100 to the decoding apparatus 200. The slice header of a slice may include N. In other words, the maximum number of merge candidates in the merge list for the target block of the slice may be set by the slice header. For example, the value of N may be basically 5.

Pieces of motion information (i.e., merge candidates) may be added to the merge list in the order of the following steps 1) to 4).

Step 1) Among spatial candidates, available spatial candidates may be added to the merge list. Pieces of motion information of the available spatial candidates may be added to the merge list in the order illustrated in FIG. 10. Here, when the motion information of an available spatial candidate overlaps other motion information already present in the merge list, the motion information may not be added to the merge list. The operation of checking whether the corresponding motion information overlaps other motion information present in the list may be referred to in brief as an "overlap check".

The maximum number of pieces of motion information that are added may be N.

Step 2) When the number of pieces of motion information in the merge list is less than N and a temporal candidate is available, the motion information of the temporal candidate may be added to the merge list. Here, when the motion information of the available temporal candidate overlaps other motion information already present in the merge list, the motion information may not be added to the merge list.

Step 3) When the number of pieces of motion information in the merge list is less than N and the type of a target slice is "B", combined motion information generated by combined bidirectional prediction (bi-prediction) may be added to the merge list.

The target slice may be a slice including a target block.

The combined motion information may be a combination of L0 motion information and L1 motion information. L0 motion information may be motion information that refers only to a reference picture list L0. L1 motion information may be motion information that refers only to a reference picture list L1.

In the merge list, one or more pieces of L0 motion information may be present. Further, in the merge list, one or more pieces of L1 motion information may be present.

The combined motion information may include one or more pieces of combined motion information. When the combined motion information is generated. L0 motion information and L1 motion information, which are to be used for generation, among the one or more pieces of L0 motion information and the one or more pieces of L1 motion information, may be predefined. One or more pieces of combined motion information may be generated in a predefined order via combined bidirectional prediction, which uses a pair of different pieces of motion information in the merge list. One of the pair of different pieces of motion information may be L0 motion information and the other of the pair may be L1 motion information.

For example, combined motion information that is added with the highest priority may be a combination of L0 motion information having a merge index of 0 and L1 motion information having a merge index of 1. When motion information having a merge index of 0 is not L0 motion information or when motion information having a merge index of 1 is not L1 motion information, the combined motion information may be neither generated nor added. Next, the combined motion information that is added with the next priority may be a combination of L0 motion information, having a merge index of 1, and L1 motion information, having a merge index of 0. Subsequent detailed combinations may conform to other combinations of video encoding/decoding fields.

Here, when the combined motion information overlaps other motion information already present in the merge list, the combined motion information may not be added to the merge list.

Step 4) When the number of pieces of motion information in the merge list is less than N, motion information of a zero vector may be added to the merge list.

The zero-vector motion information may be motion information for which the motion vector is a zero vector.

The number of pieces of zero-vector motion information may be one or more. The reference picture indices of one or more pieces of zero-vector motion information may be different from each other. For example, the value of the reference picture index of first zero-vector motion information may be 0. The value of the reference picture index of second zero-vector motion information may be 1.

The number of pieces of zero-vector motion information may be identical to the number of reference pictures in the reference picture list.

The reference direction of zero-vector motion information may be bidirectional. Both of the motion vectors may be zero vectors. The number of pieces of zero-vector motion information may be the smaller one of the number of reference pictures in the reference picture list L0 and the number of reference pictures in the reference picture list L1. Alternatively, when the number of reference pictures in the reference picture list L0 and the number of reference pictures in the reference picture list L are different from each other, a reference direction that is unidirectional may be used for a reference picture index that may be applied only to a single reference picture list.

The encoding apparatus 100 and/or the decoding apparatus 200 may sequentially add the zero-vector motion information to the merge list while changing the reference picture index.

When zero-vector motion information overlaps other motion information already present in the merge list, the zero-vector motion information may not be added to the merge list.

The order of the above-described steps 1) to 4) is merely exemplary, and may be changed. Further, some of the above steps may be omitted depending on predefined conditions.
Method for Deriving Prediction Motion Vector Candidate List in AMVP Mode The maximum number of prediction motion vector candidates in a prediction motion vector candidate list may be predefined. The predefined maximum number is indicated by N. For example, the predefined maximum number may be 2.

Pieces of motion information (i.e. prediction motion vector candidates) may be added to the prediction motion vector candidate list in the order of the following steps 1) to 3).

Step 1 Available spatial candidates, among spatial candidates, may be added to the prediction motion vector candidate list. The spatial candidates may include a first spatial candidate and a second spatial candidate.

The first spatial candidate may be one of $A_0$, $A_1$, scaled $A_0$, and scaled $A_1$. The second spatial candidate may be one of $B_0$, $B_1$, $B_2$, scaled $B_0$, scaled $B_1$, and scaled $B_2$.

Pieces of motion information of available spatial candidates may be added to the prediction motion vector candidate list in the order of the first spatial candidate and the second spatial candidate. In this case, when the motion information of an available spatial candidate overlaps other motion information already present in the prediction motion vector candidate list, the motion information may not be added to the prediction motion vector candidate list. In other words, when the value of N is 2, if the motion information of a second spatial candidate is identical to the motion information of a first spatial candidate, the motion information of the second spatial candidate may not be added to the prediction motion vector candidate list.

The maximum number of pieces of motion information that are added may be N.

Step 2) When the number of pieces of motion information in the prediction motion vector candidate list is less than N and a temporal candidate is available, the motion information of the temporal candidate may be added to the prediction motion vector candidate list. In this case, when the motion information of the available temporal candidate overlaps other motion information already present in the prediction motion vector candidate list, the motion information may not be added to the prediction motion vector candidate list.

Step 3) When the number of pieces of motion information in the prediction motion vector candidate list is less than N, zero-vector motion information may be added to the prediction motion vector candidate list.

The zero-vector motion information may include one or more pieces of zero-vector motion information. The reference picture indices of the one or more pieces of zero-vector motion information may be different from each other.

The encoding apparatus 100 and/or the decoding apparatus 200 may sequentially add pieces of zero-vector motion information to the prediction motion vector candidate list while changing the reference picture index.

When zero-vector motion information overlaps other motion information already present in the prediction motion vector candidate list, the zero-vector motion information may not be added to the prediction motion vector candidate list.

The description of the zero-vector motion information, made above in connection with the merge list, may also be applied to zero-vector motion information. A repeated description thereof will be omitted.

The order of the above-described steps 1) to 3) is merely exemplary, and may be changed. Further, some of the steps may be omitted depending on predefined conditions.

Figure 12:
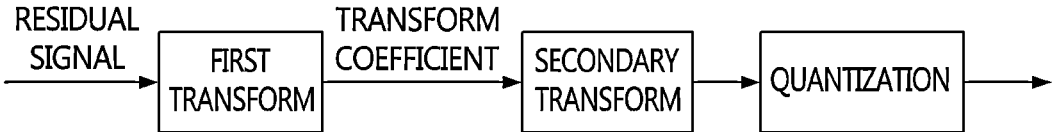
FIG. 12 illustrates a transform and quantization process according to an example.

FIG. 12 illustrates a transform and quantization process according to an example.

As illustrated in FIG. 12, quantized levels may be generated by performing a transform and/or quantization process on a residual signal.

A residual signal may be generated as the difference between an original block and a prediction block. Here, the prediction block may be a block generated via intra prediction or inter prediction.

The residual signal may be transformed into a signal in a frequency domain through a transform procedure that is a part of a quantization procedure.

A transform kernel used for a transform may include various DCT kernels, such as Discrete Cosine Transform (DCT) type 2 (DCT-II) and Discrete Sine Transform (DST) kernels.

These transform kernels may perform a separable transform or a two-dimensional (2D) non-separable transform on DST-I, and DST-VII in addition to DCT-II, as shown in each of the following Table 3 and the following table 4.

TABLE 3

| Transform set | Transform candidates |
|---|---|
| 0 | DST-VII, DCT-VIII |
| 1 | DST-VII, DST-I |
| 2 | DST-VII, DCT-V |

TABLE 4

| Transform set | Transform candidates |
|---|---|
| 0 | DST-VII, DCT-VIII, DST-I |
| 1 | DST-VII, DST-I, DCT-VIII |
| 2 | DST-VII, DCT-V, DST-I |

As shown in Table 3 and Table 4, when a DCT type or a DST type to be used for a transform is derived, transform sets may be used. Each transform set may include multiple transform candidates. Each transform candidate may be a DCT type or a DST type.

The following Table 5 shows examples of a transform set to be applied to a horizontal direction and a transform set to be applied to a vertical direction depending on intra prediction modes.

TABLE 5

| Intra prediction mode | 0 | 1 | 2 | 3 | 4 | 5 | 6 | 7 | 8 | 9 |
|---|---|---|---|---|---|---|---|---|---|---|
| Vertical direction transform set | 2 | 1 | 0 | 1 | 0 | 1 | 0 | 1 | 0 | 1 |
| Horizontal direction transform set | 2 | 1 | 0 | 1 | 0 | 1 | 0 | 1 | 0 | 1 |

| Intra prediction mode | 10 | 11 | 12 | 13 | 14 | 15 | 16 | 17 | 18 | 19 |
|---|---|---|---|---|---|---|---|---|---|---|
| Vertical direction transform set | 0 | 1 | 0 | 1 | 0 | 0 | 0 | 0 | 0 | 0 |
| Horizontal direction transform set | 0 | 1 | 0 | 1 | 2 | 2 | 2 | 2 | 2 | 2 |

| Intra prediction mode | 20 | 21 | 22 | 23 | 24 | 25 | 26 | 27 | 28 | 29 |
|---|---|---|---|---|---|---|---|---|---|---|
| Vertical direction transform set | 0 | 0 | 0 | 1 | 0 | 1 | 0 | 1 | 0 | 1 |
| Horizontal direction transform set | 2 | 2 | 2 | 1 | 0 | 1 | 0 | 1 | 0 | 1 |

| Intra prediction mode | 30 | 31 | 32 | 33 | 34 | 35 | 36 | 37 | 38 | 39 |
|---|---|---|---|---|---|---|---|---|---|---|
| Vertical direction transform set | 0 | 1 | 0 | 1 | 0 | 1 | 0 | 1 | 0 | 1 |
| Horizontal direction transform set | 0 | 1 | 0 | 1 | 0 | 1 | 0 | 1 | 0 | 1 |

| Intra prediction mode | 40 | 41 | 42 | 43 | 44 | 45 | 46 | 47 | 48 | 49 |
|---|---|---|---|---|---|---|---|---|---|---|
| Vertical direction transform set | 0 | 1 | 0 | 1 | 0 | 1 | 2 | 2 | 2 | 2 |
| Horizontal direction transform set | 0 | 1 | 0 | 1 | 0 | 1 | 0 | 0 | 0 | 0 |

| Intra prediction mode | 50 | 51 | 52 | 53 | 54 | 55 | 56 | 57 | 58 | 59 |
|---|---|---|---|---|---|---|---|---|---|---|
| Vertical direction transform set | 2 | 2 | 2 | 2 | 2 | 1 | 0 | 1 | 0 | 1 |
| Horizontal direction transform set | 0 | 0 | 0 | 0 | 0 | 1 | 0 | 1 | 0 | 1 |

| Intra prediction mode | 60 | 61 | 62 | 63 | 64 | 65 | 66 |
|---|---|---|---|---|---|---|---|
| Vertical direction transform set | 0 | 1 | 0 | 1 | 0 | 1 | 0 |
| Horizontal direction transform set | 0 | 1 | 0 | 1 | 0 | 1 | 0 | the residual signal. The separable transform may be a transform indicating that a one-dimensional (1D) transform is performed on the residual signal in each of a horizontal direction and a vertical direction.

The DCT type and the DST type, which are adaptively used for a 1D transform, may include DCT-V, DCT-VIII, In Table 5, numbers of vertical transform sets and horizontal transform sets that are to be applied to the horizontal direction of a residual signal depending on the intra prediction modes of the target block are indicated.

As exemplified in Table 5, transform sets to be applied to the horizontal direction and the vertical direction may be predefined depending on the intra prediction mode of the target block. The encoding apparatus 100 may perform a transform and an inverse transform on the residual signal using a transform included in the transform set corresponding to the intra prediction mode of the target block. Further, the decoding apparatus 200 may perform an inverse transform on the residual signal using a transform included in the transform set corresponding to the intra prediction mode of the target block.

In the transform and inverse transform, transform sets to be applied to the residual signal may be determined, as exemplified in Tables 3, 4, and 5, and may not be signaled. Transform indication information may be signaled from the encoding apparatus 100 to the decoding apparatus 200. The transform indication information may be information indicating which one of multiple transform candidates included in the transform set to be applied to the residual signal is used.

For example, when the size of the target block is 64×64 or less, transform sets, each having three transforms, may be configured depending on the intra prediction modes. An optimal transform method may be selected from among a total of nine multiple transform methods resulting from combinations of three transforms in a horizontal direction and three transforms in a vertical direction. Through such an optimal transform method, the residual signal may be encoded and/or decoded, and thus coding efficiency may be improved.

Here, information indicating which one of transforms belonging to each transform set has been used for at least one of a vertical transform and a horizontal transform may be entropy-encoded and/or -decoded. Here, truncated unary binarization may be used to encode and/or decode such information.

As described above, methods using various transforms may be applied to a residual signal generated via intra prediction or inter prediction.

forms are applied to respective 1D directions (i.e. a vertical direction and a horizontal direction).

A secondary transform may be a transform for improving energy concentration on a transform coefficient generated by the first transform. Similar to the first transform, the secondary transform may be a separable transform or a non-separable transform. Such a non-separable transform may be a Non-Separable Secondary Transform (NSST).

The first transform may be performed using at least one of predefined multiple transform methods. For example, the predefined multiple transform methods may include a Discrete Cosine Transform (DCT), a Discrete Sine Transform (DST), a Karhunen-Loeve Transform (KLT), etc.

Further, a first transform may be a transform having various transform types depending on a kernel function that defines a Discrete Cosine Transform (DCT) or a Discrete Sine Transform (DST).

For example, a transform type may be determined based on at least one of 1) a prediction mode of a target block (for example, one of intra prediction and inter prediction), 2) a size of a target block, 3) a shape of a target block, 4) an intra prediction mode of a target block, 5) a component of a target block (for example, one of a luma component and a chroma component), 6) a partitioning type applied to a target block (for example, one of a Quad Tree (QT), a Binary Tree (BT) and a Ternary Tree: TT)).

For example, the first transform may include transforms, such as DCT-2, DCT-5, DCT-7, DST-7, DST-1, DST-8, and DCT-8 depending on the transform kernel presented in the following Table 6. In the following Table 6, various transform types and transform kernel functions for Multiple Transform Selection (MTS) are exemplified.

MTS may refer to the selection of combinations of one or more DCT and/or DST kernels so as to transform a residual signal in a horizontal and/or vertical direction.

TABLE 6

| Transform type | Transform kernel function $T_i(j)$ |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \sqrt{\dfrac{2}{N}}$ $(i = 0)$ or 1(otherwise) |
| DST-7 | $T_i(j) = \sqrt{\dfrac{4}{2N+1}} \cdot \sin\left(\dfrac{\pi \cdot (2j+1) \cdot (j+1)}{2N+1}\right)$ |
| DCT-5 | $T_i(j) = \omega_0 \cdot \omega_1 \cdot \sqrt{\dfrac{2}{2N-1}} \cdot \cos\left(\dfrac{2\pi \cdot i \cdot j}{2N+1}\right)$ where $\omega_{0/1} = \sqrt{\dfrac{2}{N}}$ $(i$ or $j = 0)$ or 1(otherwise) |
| DCT-8 | $T_i(j) = \sqrt{\dfrac{4}{2N+1}} \cdot \cos\left(\dfrac{\pi \cdot (2j+1) \cdot (2j+1)}{4N+2}\right)$ |
| DST-1 | $T_i(j) = \sqrt{\dfrac{2}{N+1}} \cdot \sin\left(\dfrac{\pi \cdot (i+1) \cdot (j+1)}{N+1}\right)$ |

The transform may include at least one of a first transform and a secondary transform. A transform coefficient may be generated by performing the first transform on the residual signal, and a secondary transform coefficient may be generated by performing the secondary transform on the transform coefficient.

The first transform may be referred to as a "primary transform". Further, the first transform may also be referred to as an "Adaptive Multiple Transform (AMT) scheme". AMT may mean that, as described above, different trans- In Table 6, i and j may be integer values that are equal to or greater than 0 and are less than or equal to N−1.

The secondary transform may be performed on the transform coefficient generated by performing the first transform.

As in the first transform, transform sets may also be defined in a secondary transform. The methods for deriving and/or determining the above-described transform sets may be applied not only to the first transform but also to the secondary transform.

The first transform and the secondary transform may be determined for a specific target.

For example, a first transform and a secondary transform may be applied to signal components corresponding to one or more of a luminance (luma) component and a chrominance (chroma) component. Whether to apply the first transform and/or the secondary transform may be determined depending on at least one of coding parameters for a target block and/or a neighbor block. For example, whether to apply the first transform and/or the secondary transform may be determined depending on the size and/or shape of the target block.

In the encoding apparatus 100 and the decoding apparatus 200, transform information indicating the transform method to be used for the target may be derived by utilizing specified information.

For example, the transform information may include a transform index to be used for a primary transform and/or a secondary transform. Alternatively, the transform information may indicate that a primary transform and/or a secondary transform are not used.

For example, when the target of a primary transform and a secondary transform is a target block, the transform method(s) to be applied to the primary transform and/or the secondary transform indicated by the transform information may be determined depending on at least one of coding parameters for the target block and/or blocks neighbor the target block.

Alternatively, transform information indicating a transform method for a specific target may be signaled from the encoding apparatus 100 to the decoding apparatus 200.

For example, for a single CU, whether to use a primary transform, an index indicating the primary transform, whether to use a secondary transform, and an index indicating the secondary transform may be derived as the transform information by the decoding apparatus 200. Alternatively, for a single CU, the transform information, which indicates whether to use a primary transform, an index indicating the primary transform, whether to use a secondary transform, and an index indicating the secondary transform, may be signaled.

The quantized transform coefficient (i.e. the quantized levels) may be generated by performing quantization on the result, generated by performing the first transform and/or the secondary transform, or on the residual signal.

Figure 13:
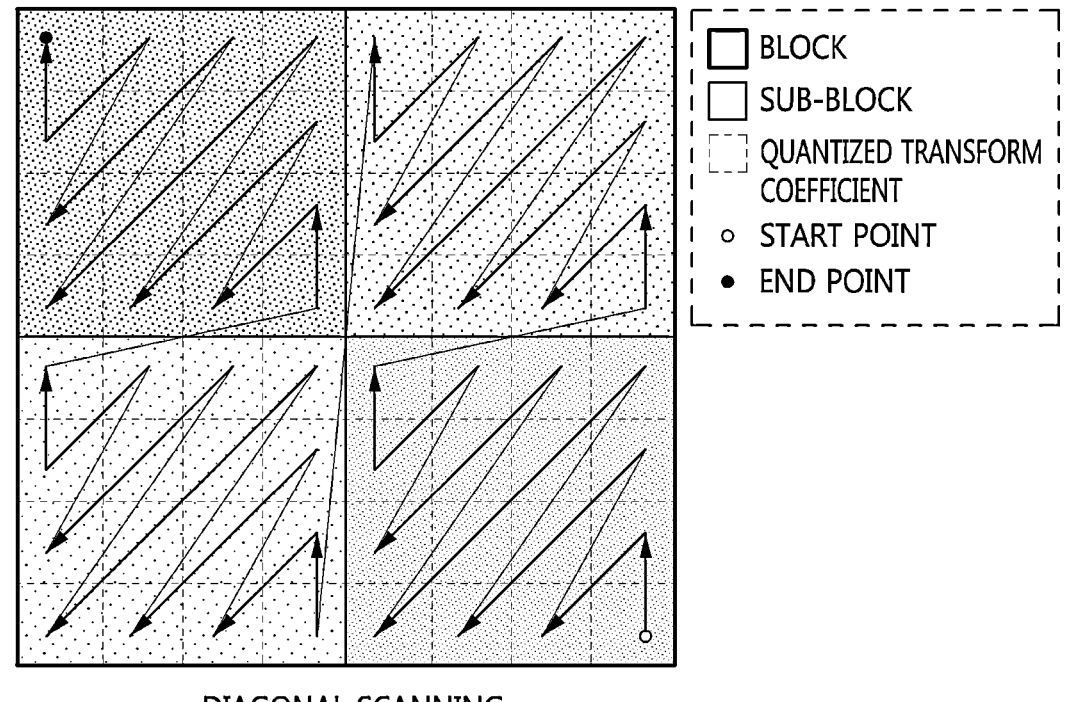
FIG. 13 illustrates diagonal scanning according to an example.

FIG. 13 illustrates diagonal scanning according to an example.

Figure 14:
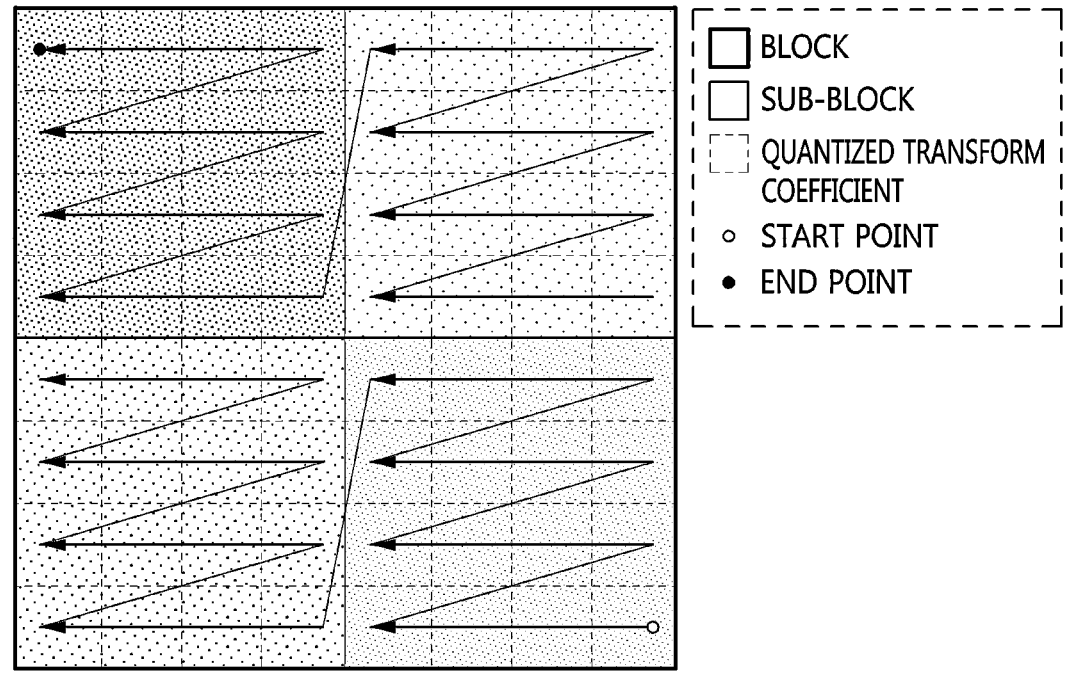
FIG. 14 illustrates horizontal scanning according to an example.

FIG. 14 illustrates horizontal scanning according to an example.

Figure 15:
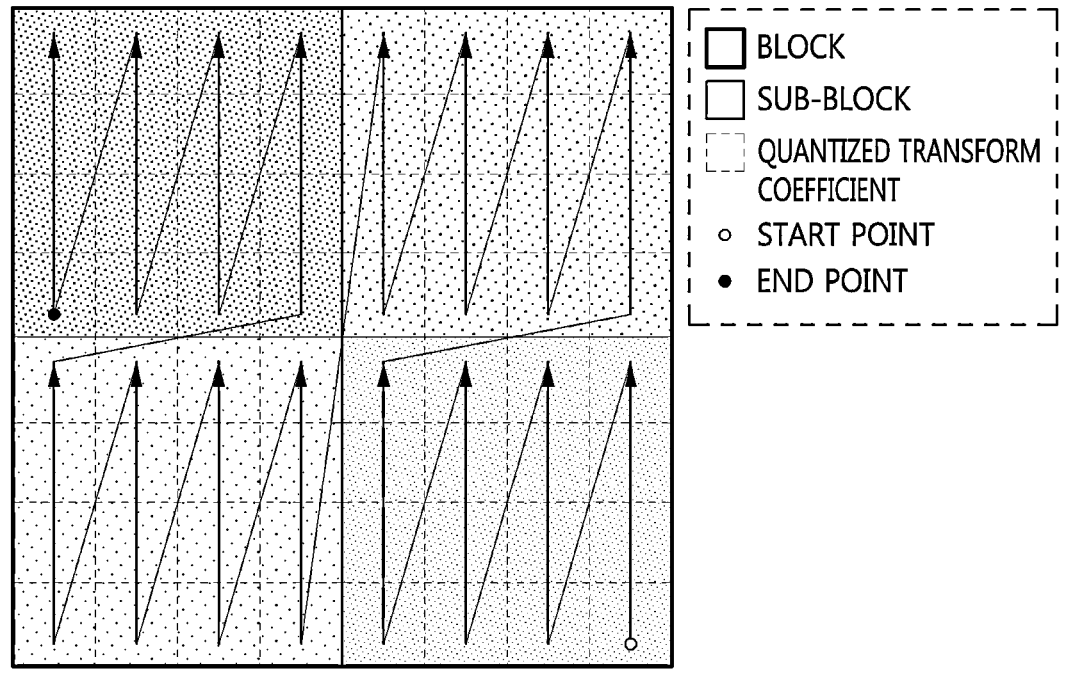
FIG. 15 illustrates vertical scanning according to an example.

FIG. 15 illustrates vertical scanning according to an example.

Quantized transform coefficients may be scanned via at least one of (up-right) diagonal scanning, vertical scanning, and horizontal scanning depending on at least one of an intra prediction mode, a block size, and a block shape. The block may be a Transform Unit (TU).

Each scanning may be initiated at a specific start point, and may be terminated at a specific end point.

For example, quantized transform coefficients may be changed to 1D vector forms by scanning the coefficients of a block using diagonal scanning of FIG. 13. Alternatively, horizontal scanning of FIG. 14 or vertical scanning of FIG. 15, instead of diagonal scanning, may be used depending on the size and/or intra prediction mode of a block.

Vertical scanning may be the operation of scanning 2D block-type coefficients in a column direction. Horizontal scanning may be the operation of scanning 2D block-type coefficients in a row direction.

In other words, which one of diagonal scanning, vertical scanning, and horizontal scanning is to be used may be determined depending on the size and/or inter prediction mode of the block.

As illustrated in FIGS. 13, 14, and 15, the quantized transform coefficients may be scanned along a diagonal direction, a horizontal direction or a vertical direction.

The quantized transform coefficients may be represented by block shapes. Each block may include multiple sub-blocks. Each sub-block may be defined depending on a minimum block size or a minimum block shape.

In scanning, a scanning sequence depending on the type or direction of scanning may be primarily applied to sub-blocks. Further, a scanning sequence depending on the direction of scanning may be applied to quantized transform coefficients in each sub-block.

For example, as illustrated in FIGS. 13, 14, and 15, when the size of a target block is 8×8, quantized transform coefficients may be generated through a first transform, a secondary transform, and quantization on the residual signal of the target block. Therefore, one of three types of scanning sequences may be applied to four 4×4 sub-blocks, and quantized transform coefficients may also be scanned for each 4×4 sub-block depending on the scanning sequence.

The encoding apparatus 100 may generate entropy-encoded quantized transform coefficients by performing entropy encoding on scanned quantized transform coefficients, and may generate a bitstream including the entropy-encoded quantized transform coefficients.

The decoding apparatus 200 may extract the entropy-encoded quantized transform coefficients from the bitstream, and may generate quantized transform coefficients by performing entropy decoding on the entropy-encoded quantized transform coefficients. The quantized transform coefficients may be aligned in the form of a 2D block via inverse scanning. Here, as the method of inverse scanning, at least one of up-right diagonal scanning, vertical scanning, and horizontal scanning may be performed.

In the decoding apparatus 200, dequantization may be performed on the quantized transform coefficients. A secondary inverse transform may be performed on the result generated by performing dequantization depending on whether to perform the secondary inverse transform. Further, a first inverse transform may be performed on the result generated by performing the secondary inverse transform depending on whether the first inverse transform is to be performed. A reconstructed residual signal may be generated by performing the first inverse transform on the result generated by performing the secondary inverse transform.

For a luma component which is reconstructed via intra prediction or inter prediction, inverse mapping having a dynamic range may be performed before in-loop filtering.

The dynamic range may be divided into 16 equal pieces, and mapping functions for respective pieces may be signaled. Such a mapping function may be signaled at a slice level or a tile group level.

An inverse mapping function for performing inverse mapping may be derived based on the mapping function.

In-loop filtering, the storage of a reference picture, and motion compensation may be performed in an inverse mapping area.

A prediction block generated via inter prediction may be changed to a mapped area through mapping using a mapping function, and the changed prediction block may be used to generate a reconstructed block. However, since intra prediction is performed in the mapped area, a prediction block generated via intra prediction may be used to generate a reconstructed block without requiring mapping and/or inverse mapping.

For example, when the target block is a residual block of a chroma component, the residual block may be changed to an inversely mapped area by scaling the chroma component of the mapped area.

Whether scaling is available may be signaled at a slice level or a tile group level.

For example, scaling may be applied only to the case where mapping is available for a luma component and where the partitioning of the luma component and the partitioning of the chroma component follow the same tree structure.

Scaling may be performed based on the average of the values of samples in a luma prediction block, which corresponds to a chroma prediction block. Here, when the target block uses inter prediction, the luma prediction block may mean a mapped luma prediction block.

A value required for scaling may be derived by referring to a look-up table using the index of a piece to which the average of sample values of the luma prediction block belongs.

The residual block may be changed to an inversely mapped area by scaling the residual block using a finally derived value. Thereafter, for the block of a chroma component, reconstruction, intra prediction, inter prediction, in-loop filtering, and the storage of a reference picture may be performed in the inversely mapped area.

For example, information indicating whether the mapping and/or inverse mapping of a luma component and a chroma component are available may be signaled through a sequence parameter set.

A prediction block for the target block may be generated based on a block vector. The block vector may indicate displacement between the target block and a reference block. The reference block may be a block in a target image.

In this way, a prediction mode in which the prediction block is generated by referring to the target image may be referred to as an "Intra-Block Copy (IBC) mode".

An IBC mode may be applied to a CU having a specific size. For example, the IBC mode may be applied to an M×N CU. Here, M and N may be less than or equal to 64.

The IBC mode may include a skip mode, a merge mode, an AMVP mode, etc. In the case of the skip mode or the merge mode, a merge candidate list may be configured, and a merge index is signaled, and thus a single merge candidate may be specified among merge candidates present in the merge candidate list. The block vector of the specified merge candidate may be used as the block vector of the target block.

In the case of the AMVP mode, a differential block vector may be signaled. Also, a prediction block vector may be derived from the left neighbor block and the above neighbor block of the target block. Further, an index indicating which neighbor block is to be used may be signaled.

A prediction block in the IBC mode may be included in a target CTU or a left CTU, and may be limited to a block within a previously reconstructed area. For example, the value of a block vector may be limited so that a prediction block for a target block is located in a specific area. The specific area may be an area defined by three 64×64 blocks that are encoded and/or decoded prior to a 64×64 block including the target block. The value of the block vector is limited in this way, and thus memory consumption and device complexity caused by the implementation of the IBC mode may be decreased.

Figure 16:
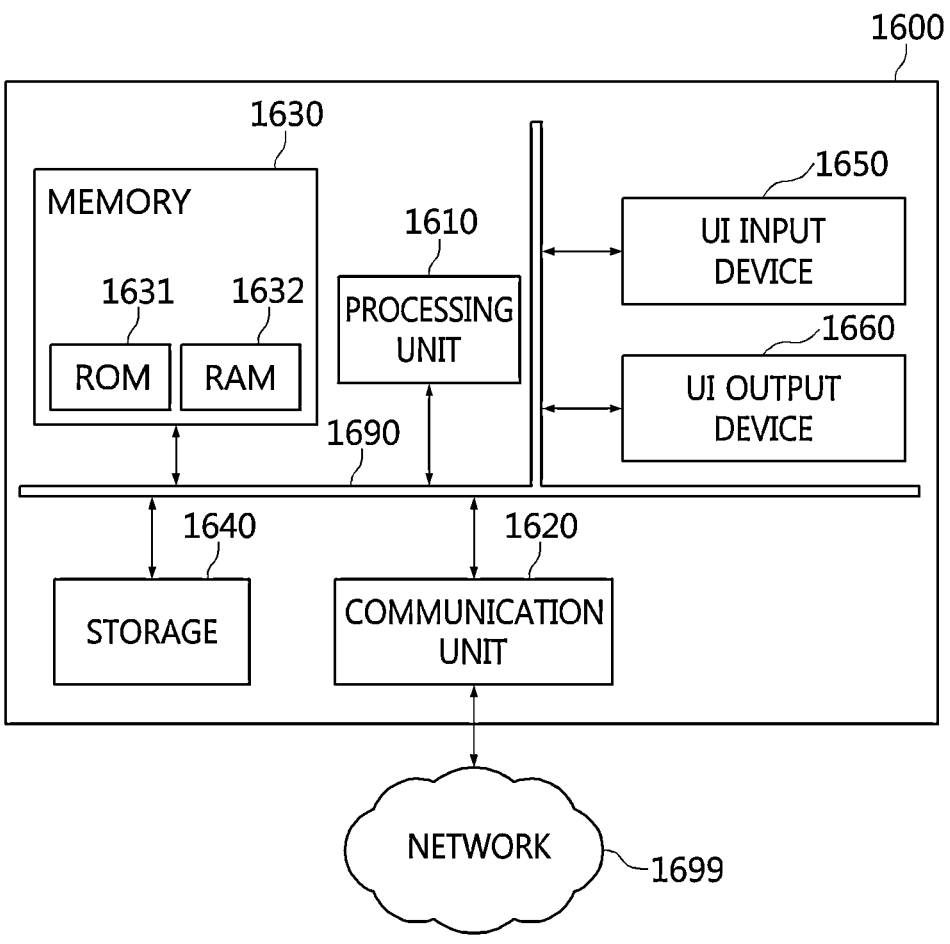
FIG. 16 is a configuration diagram of an encoding apparatus according to an embodiment.

FIG. 16 is a configuration diagram of an encoding apparatus according to an embodiment.

An encoding apparatus 1600 may correspond to the above-described encoding apparatus 100.

The encoding apparatus 1600 may include a processing unit 1610, memory 1630, a user interface (UI) input device 1650, a UI output device 1660, and storage 1640, which communicate with each other through a bus 1690. The encoding apparatus 1600 may further include a communication unit 1620 coupled to a network 1699.

The processing unit 1610 may be a Central Processing Unit (CPU) or a semiconductor device for executing processing instructions stored in the memory 1630 or the storage 1640. The processing unit 1610 may be at least one hardware processor.

The processing unit 1610 may generate and process signals, data or information that are input to the encoding apparatus 1600, are output from the encoding apparatus 1600, or are used in the encoding apparatus 1600, and may perform examination, comparison, determination, etc. related to the signals, data or information. In other words, in embodiments, the generation and processing of data or information and examination, comparison and determination related to data or information may be performed by the processing unit 1610.

The processing unit 1610 may include an inter prediction unit 110, an intra prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

At least some of the inter prediction unit 110, the intra prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190 may be program modules, and may communicate with an external device or system. The program modules may be included in the encoding apparatus 1600 in the form of an operating system, an application program module, or other program modules.

The program modules may be physically stored in various types of well-known storage devices. Further, at least some of the program modules may also be stored in a remote storage device that is capable of communicating with the encoding apparatus 1200.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the encoding apparatus 1600.

The processing unit 1610 may execute instructions or code in the inter prediction unit 110, the intra prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190.

A storage unit may denote the memory 1630 and/or the storage 1640. Each of the memory 1630 and the storage 1640 may be any of various types of volatile or nonvolatile storage media. For example, the memory 1630 may include at least one of Read-Only Memory (ROM) 1631 and Random Access Memory (RAM) 1632.

The storage unit may store data or information used for the operation of the encoding apparatus 1600. In an embodiment, the data or information of the encoding apparatus 1600 may be stored in the storage unit.

For example, the storage unit may store pictures, blocks, lists, motion information, inter prediction information, bitstreams, etc.

The encoding apparatus 1600 may be implemented in a computer system including a computer-readable storage medium.

The storage medium may store at least one module required for the operation of the encoding apparatus 1600. The memory 1630 may store at least one module, and may be configured such that the at least one module is executed by the processing unit 1610.

Functions related to communication of the data or information of the encoding apparatus 1600 may be performed through the communication unit 1620.

For example, the communication unit 1620 may transmit a bitstream to a decoding apparatus 1600, which will be described later.

Figure 17:
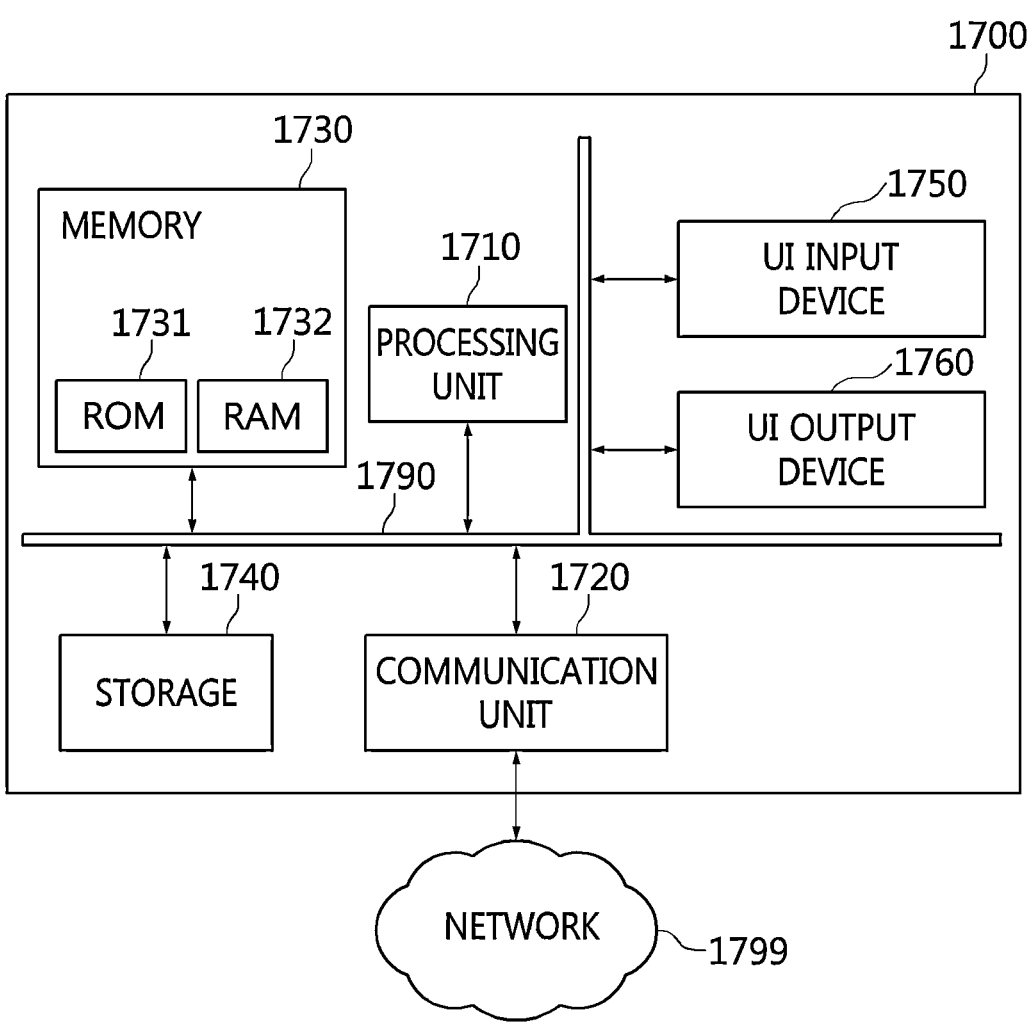
FIG. 17 is a configuration diagram of a decoding apparatus according to an embodiment.

FIG. 17 is a configuration diagram of a decoding apparatus according to an embodiment.

The decoding apparatus 1700 may correspond to the above-described decoding apparatus 200.

The decoding apparatus 1700 may include a processing unit 1710, memory 1730, a user interface (UI) input device 1750, a UI output device 1760, and storage 1740, which communicate with each other through a bus 1790. The decoding apparatus 1700 may further include a communication unit 1720 coupled to a network 1799.

The processing unit 1710 may be a Central Processing Unit (CPU) or a semiconductor device for executing processing instructions stored in the memory 1730 or the storage 1740. The processing unit 1710 may be at least one hardware processor.

The processing unit 1710 may generate and process signals, data or information that are input to the decoding apparatus 1700, are output from the decoding apparatus 1700, or are used in the decoding apparatus 1700, and may perform examination, comparison, determination, etc. related to the signals, data or information. In other words, in embodiments, the generation and processing of data or information and examination, comparison and determination related to data or information may be performed by the processing unit 1710.

The processing unit 1710 may include an entropy decoding unit 210, a dequantization unit 220, an inverse transform unit 230, an intra prediction unit 240, an inter prediction unit 250, a switch 245, an adder 255, a filter unit 260, and a reference picture buffer 270.

At least some of the entropy decoding unit 210, the dequantization unit 220, the inverse transform unit 230, the intra prediction unit 240, the inter prediction unit 250, the adder 255, the switch 245, the filter unit 260, and the reference picture buffer 270 of the decoding apparatus 200 may be program modules, and may communicate with an external device or system. The program modules may be included in the decoding apparatus 1700 in the form of an operating system, an application program module, or other program modules.

The program modules may be physically stored in various types of well-known storage devices. Further, at least some of the program modules may also be stored in a remote storage device that is capable of communicating with the decoding apparatus 1700.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the decoding apparatus 1700.

The processing unit 1710 may execute instructions or code in the entropy decoding unit 210, the dequantization unit 220, the inverse transform unit 230, the intra prediction unit 240, the inter prediction unit 250, the switch 245, the adder 255, the filter unit 260, and the reference picture buffer 270.

A storage unit may denote the memory 1730 and/or the storage 1740. Each of the memory 1730 and the storage 1740 may be any of various types of volatile or nonvolatile storage media. For example, the memory 1730 may include at least one of ROM 1731 and RAM 1732.

The storage unit may store data or information used for the operation of the decoding apparatus 1700. In an embodiment, the data or information of the decoding apparatus 1700 may be stored in the storage unit.

For example, the storage unit may store pictures, blocks, lists, motion information, inter prediction information, bitstreams, etc.

The decoding apparatus 1700 may be implemented in a computer system including a computer-readable storage medium.

The storage medium may store at least one module required for the operation of the decoding apparatus 1700. The memory 1730 may store at least one module, and may be configured such that the at least one module is executed by the processing unit 1710.

Functions related to communication of the data or information of the decoding apparatus 1700 may be performed through the communication unit 1720.

For example, the communication unit 1720 may receive a bitstream from the encoding apparatus 1700.

FIG. 18 is a flowchart of an encoding method according to an embodiment.

At step 1810, the processing unit 1610 may generate a recovered low-quality image corresponding to an original image.

The recovered low-quality image may be a recovered low-resolution image and/or a recovered low-bitrate image.

Step 1810 may include steps 1811, 1812, and 1813.

At step 1811, the processing unit 1610 may generate an encoded low-quality image by performing encoding on the original image.

The encoded low-quality image may be an encoded low-resolution image and/or an encoded low-bitrate image.

For example, the processing unit 1610 may generate an encoded low-resolution image by performing encoding on the recovered low-resolution image corresponding to the original image.

At step 1812, the processing unit 1610 of the encoding apparatus 1600 may generate a bitstream including the encoded low-quality image.

The storage 1640 may store the bitstream.

At step 1813, the processing unit 1610 may generate a recovered low-quality image using the encoded low-quality image.

The processing unit 1610 may generate a recovered low-quality image by performing decoding on the encoded low-quality image in the bitstream.

Unlike steps 1811, 1812, and 1813, the processing unit 1610 may generate a recovered low-quality image while generating an encoded low-quality image by performing encoding on the original image at steps 1181 and 1182.

At step 1820, the processing unit 1610 may generate a recovered high-quality image using the recovered low-quality image.

The recovered high-quality image may include a recovered high-resolution image and/or a coding-distortion-corrected image.

When the encoded low-quality image is an encoded low-resolution image, the recovered high-quality image may be a recovered high-resolution image. The recovered high-resolution image may have a resolution higher than that of the recovered low-resolution image.

When the encoded low-quality image is an encoded low-bitrate image, the recovered high-quality image may be a coding-distortion-corrected image. The coding-distortion-corrected image may have a bit rate higher than that of the recovered low-bitrate image. The coding-distortion-corrected image may have an image quality higher than that of the recovered low-bitrate image.

The coding-distortion-corrected image may be an image generated by applying recovery of reducing coding distortion to the recovered low-bitrate image.

When the recovered low-quality image is a recovered low-resolution image, the processing unit 1610 may generate a recovered high-resolution image using the recovered low-quality image.

When the recovered low-quality image is a recovered low-bitrate image, the processing unit 1610 may generate a coding-distortion-corrected image using the recovered low-quality image.

For example, the processing unit 1610 may generate a recovered high-resolution image by performing scaling on the recovered low-resolution image.

Generation of a recovered high-resolution image and/or a coding-distortion-corrected image using a recovered low-quality image may be regarded as generation of a super-resolution image.

Generation of a recovered high-resolution image using a recovered low-resolution image may be called "Super Resolution (SR) recovery". The recovered high-resolution image may be called an "SR image".

Generation of a coding-distortion-corrected image using a recovered low-bitrate image may be called "Artifact Reduction (AR) recovery". A coding-distortion-corrected image may be called an "AR image".

Further, hereinafter, "super-resolution recovered image" may be a "recovered high-resolution image" and/or a "coding-distortion-corrected image".

Furthermore, hereinafter, characteristic operations according to an embodiment, distinguished from normal operations used for video encoding and/or decoding, may be identified using "SR" and "AR".

At step 1830, the processing unit 1610 may segment an image into multiple regions by performing segmentation on the image. Here, the image may be at least one of an original image, a recovered low-quality image, a recovered high-quality image, a recovered high-resolution image, and a coding-distortion-corrected image. Alternatively, the image may be at least one of an original image, a recovered low-quality image, a recovered high-quality image, a recovered high-resolution image, or a coding-distortion-corrected image.

At step 1840, the processing unit 1610 may generate encoded reconstruction information by performing encoding on a region. Here, the region may be at least one of the above-described multiple regions.

The processing unit 1610 may generate, for the corresponding region, encoded reconstruction information using a specific method selected in consideration of the features of the region. In other words, the processing unit 1610 may perform encoding differential for respective regions on the multiple regions. By means of encoding differential for respective regions, the processing unit 1610 may generate encoded reconstruction information based on the features of each of the multiple regions.

The encoded reconstruction information may be information used to generate a reconstructed high-quality image corresponding to the original image.

The reconstructed high-quality image may be a reconstructed high-resolution image and/or a reconstructed high-bitrate image.

The recovered high-resolution image and/or the coding-distortion-corrected image may be used as a kind of prediction image required to generate the encoded reconstruction information.

At step 1850, the processing unit 1610 may generate a bitstream including the encoded reconstruction information.

The bitstream may include the above-described encoded low-quality image and the encoded reconstruction information.

The encoded low-quality image may be transmitted through a first bitstream. The encoded reconstruction information may be transmitted through a separate second bitstream, and the second bitstream may be selectively transmitted.

The first bitstream may be a base bitstream.

The first bitstream may include type information including the type of the first bitstream. The processing unit 1610 may generate type information indicating the type of the first bitstream, and may include the type information in the first bitstream.

The type information may indicate the type of the first bitstream. The type of the first bitstream may be one of a low-resolution bitstream and a low-bitrate bitstream. The type information may indicate which one of the encoded low-resolution image and the encoded low-bitrate image is included in the first bitstream.

When the low-quality image is a low-resolution image, the type of the first bitstream may be a low-resolution bitstream. In other words, when the type of the first bitstream is a low-resolution bitstream, the first bitstream may include an encoded low-resolution image.

When a low-quality image is a low-bitrate image, the type of the first bitstream may be a low-bitrate bitstream. In other words, when the type of the first bitstream is a low-bitrate bitstream, the first bitstream may include an encoded low-bitrate image.

The second bitstream may be an additional bitstream.

At step 1860, the communication unit 1620 may transmit the bitstream to the decoding apparatus 1700.

Figure 19:
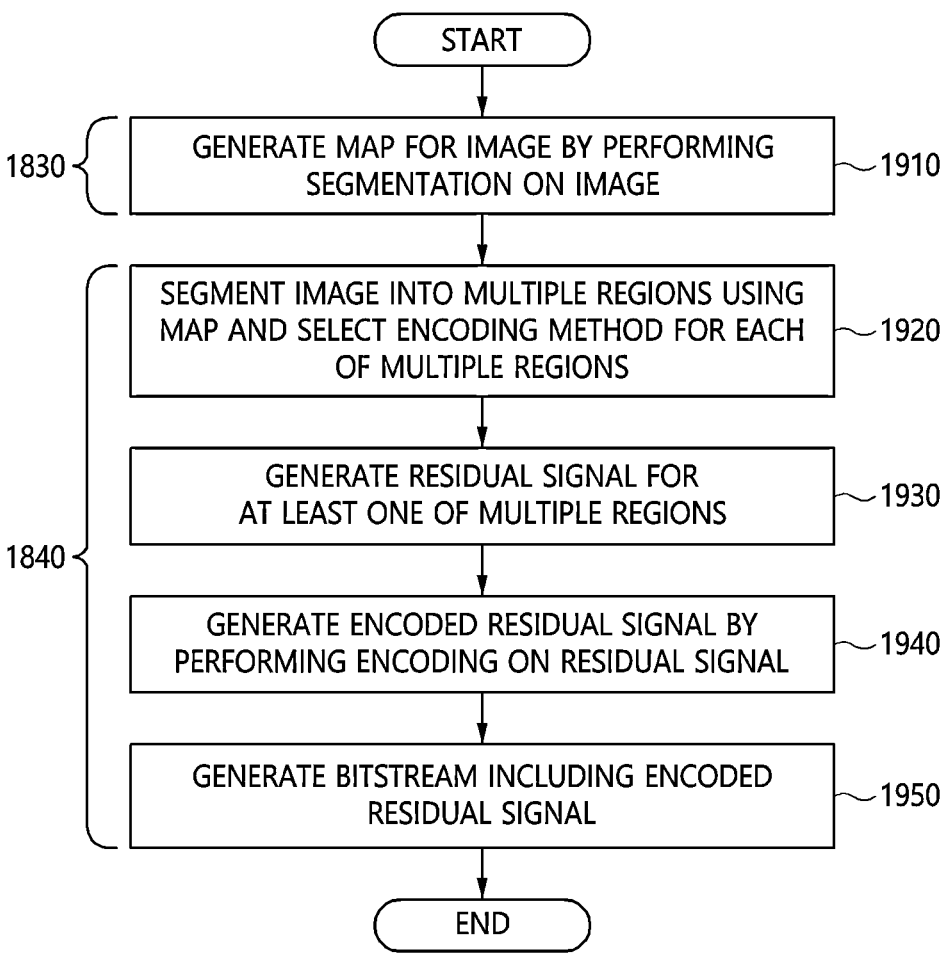
FIG. 19 is a flowchart of a method for generating encoded information using a map according to an embodiment.

FIG. 19 is a flowchart of a method for generating encoded information using a map according to an embodiment.

The embodiment to be described with reference to FIG. 19 may be an example and part of the embodiment described with reference to FIG. 18.

Step 1830, described above with reference to FIG. 18, may include step 1910.

At step 1910, the processing unit 1610 may generate a map for an image by performing segmentation on the image.

The map may indicate multiple regions. In other words, the map may be generated by segmenting the image into multiple regions, and may indicate the multiple segmented regions. In this context, the "map" may be called a "region-segmented map".

For example, the map may indicate multiple regions by different respective values.

For example, the map may indicate a first region, among the multiple regions, by "0", and may indicate a second region, among the multiple regions, by "1". In other words, the first region may be a region indicated by "0" in the map. The second region may be a region indicated by "1" in the map.

Alternatively, the map may indicate the first region, among the multiple regions, by "1", and may indicate the second region, among the multiple regions, by "0". In other words, the first region may be a region indicated by "1" in the map. The second region may be a region indicated by "0" in the map.

For each of the multiple regions indicated by the map, a prediction image may be generated.

Step 1840, described above with reference to FIG. 18, may include steps 1920, 1930, 1940, and 1950.

At step 1920, the processing unit 1610 may segment an image into multiple regions using the map, and may select an encoding method for each of the multiple regions.

The multiple regions may include a first region and a second region.

In an embodiment, the processing unit 1610 may generate a reconstructed high-quality image using "copying" for the first region of the map. In this aspect, the first region in which copying is used may be called a "copy region".

Here, "copying" may mean an operation of copying the first region of the recovered high-quality image to a first region of a reconstructed high-quality image without change, or an operation of using the first region of the recovered high-quality image as a first region of the reconstructed high-quality image without change. Therefore, for the first region, additional information, other than the recovered high-quality image and the map, may not be required.

In an example, the processing unit 1610 may generate a reconstructed to high-quality image using "prediction" for the second region of the map. In this aspect, the second region in which prediction is used may be called a "prediction region".

Here, "prediction" may mean an operation of using the second region of the recovered high-quality image as a prediction image for the second region of a reconstructed high-quality image. In other words, prediction may be an operation of using the sum of the second region of the recovered high-quality image and a reconstructed residual image for the second region as the second region of the reconstructed high-quality image. Therefore, for the second region, a residual signal indicating the result of subtracting the second region of the recovered high-quality image from the second region of the original image may be required, and an encoded residual signal (obtained through an existing encoding method or the like) may be transmitted from the encoding apparatus 1600 to the decoding apparatus 1700. The decoding apparatus 1700 may acquire a reconstructed residual signal by performing decoding on the encoded residual signal.

In an embodiment, the processing unit 1610 may divide the image into 1) the first region to be encoded/decoded from the aspect of perception quality and 2) the second region to be encoded/decoded from the aspect of a pixel difference.

Here, the first region to be encoded/decoded from the aspect of perception quality may be called a "perception-oriented region" and 2) the second region to be encoded/ decoded from the aspect of a pixel difference may be called a "distortion-oriented region".

In an embodiment, the processing unit 1610 may generate a prediction image using the "perception-oriented super-resolution (SR) network" for the first region of the map.

In other words, the sum of the prediction image for the first region, generated using the perception-oriented SR network, and the reconstructed residual image for the first region may be used as the first region of the reconstructed high-quality image. Therefore, for the first region, a residual signal indicating the result of subtracting the prediction image from the first region of the original image may be required, and an encoded residual signal (obtained through an existing encoding method or the like) may be signaled from the encoding apparatus 1600 to the decoding apparatus 1700. The decoding apparatus 1700 may acquire a reconstructed residual signal by performing decoding on the encoded residual signal.

The processing unit 1610 may generate a prediction image using a distortion-oriented SR network for the second region of the map.

In other words, the sum of the prediction image for the second region, generated using the distortion-oriented SR network, and the reconstructed residual image for the second region may be used as the second region of the reconstructed high-quality image. Therefore, for the second region, a residual signal indicating the result of subtracting the prediction image from the second region of the original image may be required, and an encoded residual signal (obtained through an existing encoding method or the like) may be signaled from the encoding apparatus 1600 to the decoding apparatus 1700. The decoding apparatus 1700 may acquire a reconstructed residual signal by performing decoding on the encoded residual signal.

In an embodiment, the image may be segmented into two regions, but it may alternatively be segmented into three or more regions, and different encoding methods may be respectively used for multiple regions indicated by the map.

The different encoding methods may use different neural networks. That is, encoding may be performed on multiple respective regions indicated by the map using different neural networks.

At step 1930, the processing unit 1610 may generate a residual signal for at least one of the multiple regions of the original image.

The residual signal may be used for a region in which the prediction image is used.

For example, a residual signal may not be generated for the first region in which copying is used.

For example, at least one region for which the residual signal is generated, among the multiple regions, may include at least some of 1) a region in which prediction is used, 2) a region in which a prediction image is generated using a perception-oriented SR network, 3) a region in which a prediction image is generated using a distortion-oriented SR network, 4) a region in which a prediction image is generated using a Mean-Squared Error Artifact Reduction (MSE AR) network, and 5) a region in which a prediction image is generated using a Generative Adversarial Network (GAN) AR network.

For example, a residual signal may be generated for the second region in which prediction is used.

The residual signal may be a result obtained by subtracting the prediction image from the region of the original image.

At step 1940, the processing unit 1610 may generate an encoded residual signal by performing encoding on the residual signal.

Here, the encoding may include recovery and quantization.

Further, the encoding may include encoding operations for an existing encoded image or an encoded residual signal.

The encoded reconstruction information, described above with reference to FIG. 18, may include an encoded residual signal.

The second bitstream may include an encoded residual signal.

At step 1950, the processing unit 1610 may generate a bitstream including the encoded residual signal.

FIG. 20 is a flowchart of a decoding method according to an embodiment.

At step 2010, the communication unit 1720 may receive a bitstream from the encoding apparatus 1600.

The bitstream may include the above-described encoded low-quality image and the encoded reconstruction information.

The bitstream may include a first bitstream and a second bitstream.

The first bitstream may be a base bitstream.

The first bitstream may include type information indicating the type of the first bitstream. The processing unit 1710 may acquire type information from the first bitstream, and may identify the type of the first bitstream using the type information.

The type information may indicate the type of the first bitstream. The type of the first bitstream may be one of a low-resolution bitstream and a low-bitrate bitstream. The type information may indicate which one of the encoded low-resolution image and the encoded low-bitrate image is included in the first bitstream.

When the low-quality image is a low-resolution image, the type of the first bitstream may be a low-resolution bitstream. In other words, when the type of the first bitstream is a low-resolution bitstream, the first bitstream may include an encoded low-resolution image.

When a low-quality image is a low-bitrate image, the type of the first bitstream may be a low-bitrate bitstream. In other words, when the type of the first bitstream is a low-bitrate bitstream, the first bitstream may include an encoded low-bitrate image.

When the encoded low-quality image is an encoded low-resolution image, the recovered high-quality image may be a recovered high-resolution image.

When the encoded low-quality image is an encoded low-bitrate image, the recovered high-quality image may be a coding-distortion-corrected image.

The second bitstream may be an additional bitstream.

The encoded low-quality image may be received through the first bitstream.

The encoded reconstruction information may be received through the separate second bitstream. The second bitstream may be selectively received.

At step 2020, the processing unit 1710 may generate a recovered low-quality image by performing decoding on the encoded low-quality image.

At step 2030, the processing unit 1710 may generate a recovered high-quality image using the recovered low-quality image.

The recovered high-quality image may include a recovered high-resolution image and/or a coding-distortion-corrected image.

For example, when the recovered low-quality image is a recovered low-resolution image (or when the type of the first bitstream is a low-resolution bitstream), the processing unit 1710 may generate a recovered high-resolution image using the recovered low-resolution image.

For example, when the recovered low-quality image is a recovered low-bitrate image (or when the type of the first bitstream is a low-bitrate bitstream), the processing unit 1710 may generate a coding-distortion-corrected image using the recovered low-bitrate image.

For example, the processing unit 1710 may generate a recovered high-resolution image by performing scaling on the recovered low-resolution image.

At step 2040, the processing unit 1710 may segment an image into multiple regions by performing segmentation on the image. Here, the image may be at least one of an original image, a recovered low-quality image, a recovered high-quality image, a recovered high-resolution image, and a coding-distortion-corrected image. Alternatively, the image may be at least one of an original image, a recovered low-quality image, a recovered high-quality image, a recovered high-resolution image, or a coding-distortion-corrected image.

Here, the encoding apparatus 1600 and the decoding apparatus 1700 may segment the image into multiple regions using the same method. Therefore, the image may be equally segmented into multiple regions by the encoding apparatus 1600 and the decoding apparatus 1700.

Alternatively, information indicating the multiple regions or information for segmenting the image into multiple regions may be signaled from the encoding apparatus 1600 to the decoding apparatus 1700 through the bitstream.

At step 2050, the processing unit 1710 may generate reconstruction information by performing decoding on the regions. Here, the region may be at least one of the above-described regions The processing unit 1710 may generate, for a region, reconstruction information using a specific method selected in consideration of the features of the region. In other words, the processing unit 1710 may perform differential decoding for respective multiple regions. Through decoding differential for respective regions, the processing unit 1710 may generate encoded reconstruction information based on the features of each of the multiple regions.

The reconstruction information may be information used to generate a reconstructed high-quality image corresponding to the original image.

At step 2060, the processing unit 1710 may generate a reconstructed image using the reconstruction information.

Figure 21:
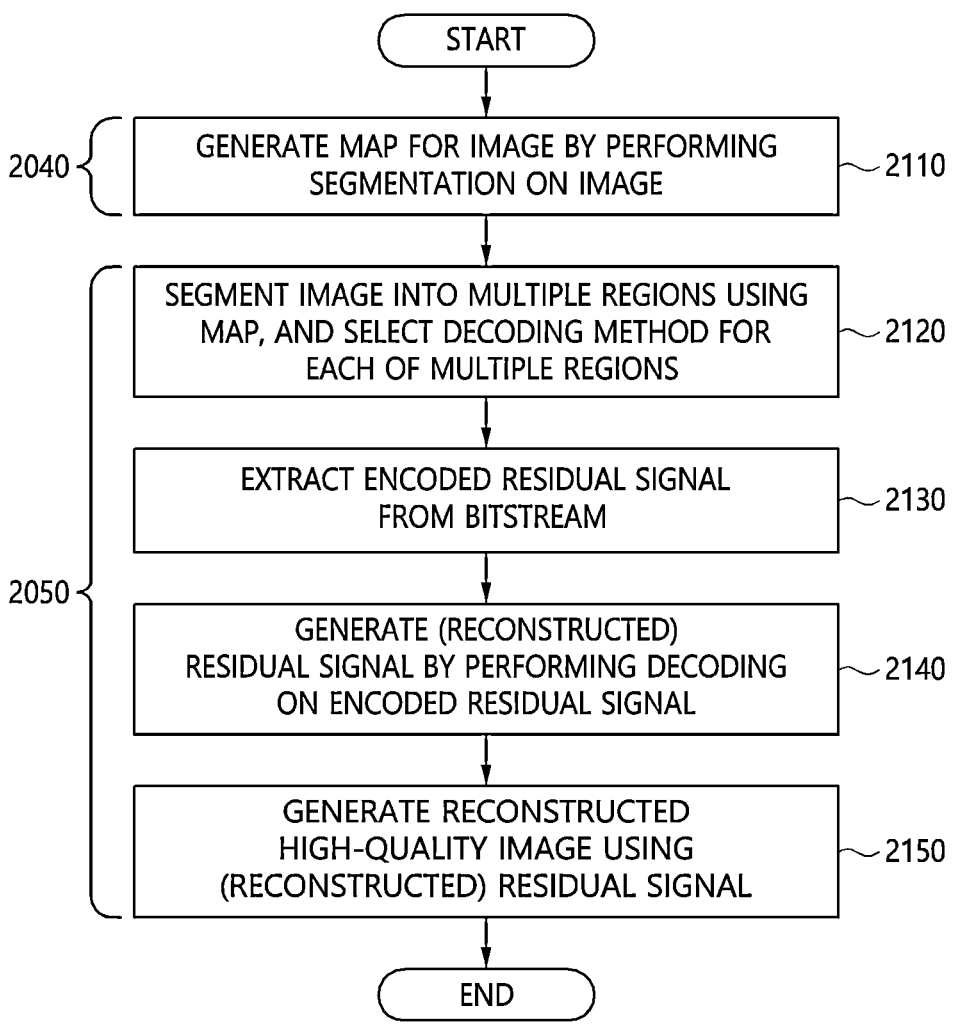
FIG. 21 is a flowchart of a method for generating decoded information using a map according to an embodiment.

FIG. 21 is a flowchart of a method for generating decoded information using a map according to an embodiment.

The embodiment to be described with reference to FIG. 21 may be an example and part of the embodiment described with reference to FIG. 20.

Step 2040, described above with reference to FIG. 20, may include step 2110.

At step 2110, the processing unit 1710 may generate a map for an image by performing segmentation on the image.

The map may indicate multiple regions. In other words, the map may be generated by segmenting the image into multiple regions, and may indicate the multiple segmented regions. In this context, the "map" may be called a "region-segmented map".

For example, the map may indicate multiple regions by different respective values.

For example, the map may indicate a first region, among the multiple regions, by "0", and may indicate a second region, among the multiple regions, by "I". In other words, the first region may be a region indicated by "0" in the map. The second region may be a region indicated by "1" in the map.

Alternatively, the map may indicate the first region, among the multiple regions, by "1", and may indicate the second region, among the multiple regions, by "0". In other words, the first region may be a region indicated by "1" in the map. The second region may be a region indicated by "0" in the map.

Here, the map generated by the decoding apparatus 1700 and the method for generating the map may be identical to the map generated by the encoding apparatus 1600 and the method for generating the map, respectively.

Alternatively, the map, information indicating the map, or information indicating the multiple regions may be signaled from the encoding apparatus 1600 to the decoding apparatus 1700 through the bitstream.

Step 2050, described above with reference to FIG. 20, may include steps 2120, 2130, 2140, and 2150.

At step 2120, the processing unit 1710 may segment an image into multiple regions using the map, and may select a decoding method for each of the multiple regions.

For example, the processing unit 1710 may generate a reconstructed high-quality image using "copying" for a first region of the map.

Here, "copying" may mean an operation of copying the first region of the recovered high-quality image to a first region of a reconstructed high-quality image without change, or an operation of using the first region of the recovered high-quality image as a first region of the reconstructed high-quality image without change. Therefore, for the first region, additional information, other than the recovered high-quality image and the map, may not be required.

In an example, the processing unit 1710 may generate a reconstructed high-quality image using "prediction" for the second region of the map.

Here, "prediction" may mean an operation of using the second region of the recovered high-quality image as a prediction image for the second region of a reconstructed high-quality image. In other words, prediction may be an operation of using the sum of the second region of the recovered high-quality image and a reconstructed residual image for the second region as the second region of the reconstructed high-quality image. Therefore, for the second region, a residual signal indicating the result of subtracting the second region of the recovered high-quality image from the second region of the original image may be required, and an encoded residual signal (obtained through an existing encoding method or the like) may be transmitted from the encoding apparatus 1600 to the decoding apparatus 1700.

In an embodiment, the processing unit 1710 may generate a prediction image using the "perception-oriented super-resolution (SR) network" for the first region of the map.

In other words, the sum of the prediction image for the first region generated using the perception-oriented SR network and the reconstructed residual image for the first region may be used as the first region of the reconstructed high-quality image. Therefore, for the first region, a residual signal indicating the result of subtracting the prediction image from the first region of the original image may be required, and an encoded residual signal (obtained through an existing encoding method or the like) may be signaled from the encoding apparatus 1600 to the decoding apparatus 1700. The decoding apparatus 1700 may acquire a reconstructed residual signal by performing decoding on the encoded residual signal.

The processing unit 1710 may generate a prediction image using a distortion-oriented SR network for the second region of the map.

In other words, the sum of the prediction image for the second region generated using the distortion-oriented SR network and the reconstructed residual image for the second region may be used as the second region of the reconstructed high-quality image. Therefore, for the second region, a residual signal indicating the result of subtracting the prediction image from the second region of the original image may be required, and an encoded residual signal (obtained through an existing encoding method or the like) may be signaled from the encoding apparatus 1600 to the decoding apparatus 1700. The decoding apparatus 1700 may acquire a reconstructed residual signal by performing decoding on the encoded residual signal.

In an embodiment, the image may be segmented into two regions, but it may alternatively be segmented into three or more regions, and different decoding methods may be respectively used for the multiple regions indicated by the map.

The different decoding methods may use different neural networks. That is, decoding may be individually performed on multiple respective regions indicated by the map using different neural networks.

At step 2130, the processing unit 1710 may extract an encoded residual signal from the bitstream.

The processing unit 1710 may extract an encoded residual signal from a second bitstream.

At step 2140, the processing unit 1710 may generate a (reconstructed) residual signal by performing decoding on the encoded residual signal.

Here, decoding may include dequantization and inverse transform. Further, decoding may include decoding operations on an existing encoded image or an encoded residual signal.

At step 2150, the processing unit 1710 may generate a reconstructed high-quality image using the (reconstructed) residual signal.

Here, the reconstructed high-quality image may be a reconstructed image, which is the result at step 2060, and may be a final image. Further, the reconstructed high-quality image may be understood to be a super-resolution image.

For example, the processing unit 1710 may generate a first region of the reconstructed high-quality image by copying the first region of the recovered high-quality image to the first region of the reconstructed high-quality image. In other words, the first region of the reconstructed high-quality image may be identical to the first region of the recovered high-quality image, or may be generated based on the first region of the recovered high-quality image.

For example, the processing unit 1710 may generate the second region of the reconstructed high-quality image by summing the second region of the recovered high-quality image and an image of the (reconstructed) residual signal. In other words, the second region of the reconstructed high-quality image may be identical to the sum of the second region of the recovered high-quality image and an image of the (reconstructed) residual signal. Alternatively, the second region of the reconstructed high-quality image may be generated based on the sum of the second region of the recovered high-quality image and the image of the (reconstructed) residual signal.

For example, the processing unit 1710 may generate the first region of the reconstructed high-quality image by adding a prediction image for the first region, generated using the perception-oriented SR network, to the image of the (reconstructed) residual signal. In other words, the first region of the reconstructed high-quality image may be identical to the sum of a prediction image for the first region, generated using the perception-oriented SR network, and an image of the (reconstructed) residual image. Alternatively, the first region of the reconstructed high-quality image may be generated based on the sum of a prediction image for the first region, generated using the perception-oriented SR network, and an image of the (reconstructed) residual image.

For example, the processing unit 1710 may generate the second region of the reconstructed high-quality image by adding a prediction image for the second region, generated using the distortion-oriented SR network, to the image of the (reconstructed) residual signal. In other words, the second region of the reconstructed high-quality image may be identical to the sum of a prediction image for the second region, generated using the distortion-oriented SR network, and an image of the (reconstructed) residual image. Alternatively, the second region of the reconstructed high-quality image may be generated based on the sum of a prediction image for the second region, generated using the perception-oriented SR network, and an image of the (reconstructed) residual image.

Hereinafter, detailed operations will be described in relation to the foregoing methods. It may be considered that the operations, which will be described later, are performed by the processing unit 1610 of the encoding apparatus 1600, and are performed by the processing unit 1710 of the decoding apparatus 1700.

A method using the foregoing super-resolution recovered image as a prediction image may be configured to 1) perform signaling of a bitstream including an encoded low-resolution image, and to 2) perform additional signaling of a bitstream including an encoded (high-resolution) image, generated using a low-resolution image as a prediction image.

Here, the image may be segmented into multiple regions, and differential encoding/decoding may be performed on the respective multiple regions.

That is, the image may be segmented into n regions, and different encoding/decoding methods may be applied to the n segmented regions.

In an embodiment, the description of the recovered high-resolution image may also be applied to a coding-distortion-corrected image.

A method using the coding-distortion-corrected image as a prediction image may be configured to generate a prediction image by correcting coding distortion in a low-resolution image instead of using a high-resolution recovered image as a prediction image, and to additionally transfer an encoded bitstream using the prediction image.

Here, the image may be segmented into multiple regions, and differential encoding/decoding may be performed on the respective multiple regions.

That is, the image may be segmented into n regions, and different encoding/decoding methods may be applied to the n segmented regions.

Figure 22:
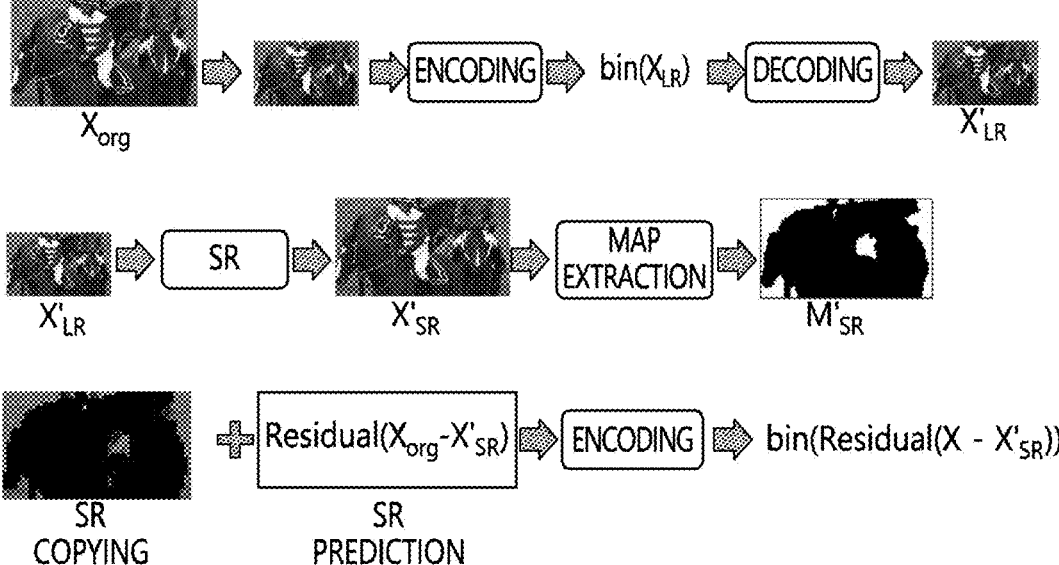
FIG. 22 illustrates a procedure for processing an image encoding method using a super-resolution recovered image according to an example.

FIG. 22 illustrates a procedure for processing an image encoding method using a super-resolution recovered image according to an example.

In FIG. 22, $X_{org}$ may be an original image. $X_{LR}$ may be a low-resolution image corresponding to the original image. $Bin(X_{LR})$ may be a bitstream corresponding to the low-resolution image. $X'_{LR}$ may be a reconstructed low-resolution image.

In an embodiment, SR may indicate the generation of a recovered high-resolution image using a recovered low-resolution image. $X'_{SR}$ may be a recovered high-resolution image. The extraction of a map may represent an operation of extracting a map by segmenting a target image. The target image may be a recovered high-resolution image. $M'_{SR}$ may represent a map extracted from the recovered high-resolution image.

Further, in consideration of the fact that the above-described copying and prediction are characteristic copying and characteristic prediction in an embodiment, which are performed on the recovered high-resolution image $M'_{SR}$, the above-described copying and prediction may be referred to as "SR copying" and "SR prediction", respectively. In other words, SR copying may be copying of the first region. SR prediction may be prediction for the second region of the map.

"SR copying" may be a method for generating a prediction image using an SR network and copying the prediction image as a reconstructed high-quality image.

"SR prediction" may be a method for generating a prediction image using an SR network and encoding/decoding a difference (residual) between the prediction image and the original image.

"AR copying" may be a method for generating a prediction image using an AR network and copying the prediction image as a reconstructed high-quality image.

"AR prediction" may be a method for generating a prediction image using an AR network and encoding/decoding a residual between the prediction image and the original image.

For example, the region to which SR copying is to be applied may be a region in which it is possible to copy a prediction image if the prediction image is similar to the original image from a subjective aspect. For example, the region to which SR copying is to be applied may include a texture region.

For example, the region to which SR prediction is to be applied may be a region in which an error (e.g., Mean Squared Error (MSE)) between pixels in the original image is to be minimized. For example, the region to which SR prediction is to be applied may include a Region of Interest (RoI) or an edge region.

Also, Residual $(X_{org}-X'_{SR})$ may be a residual between an original image and a reconstructed high-quality image. bin $(Residual(X-X'_{SR}))$ may be a bitstream for a residual between an image and a reconstructed high-quality image.

In an embodiment, the recovered high-resolution image may be replaced with a coding-distortion-corrected image. For example, $X'_{SR}$ may be the coding-distortion-corrected image.

In an embodiment, the unit of encoding, decoding and/or prediction may be a block.

For an "SR copy block", a prediction image may be generated using the SR network, and the generated prediction image may be copied. In other words, the SR copy block may be the block to which copying or SR copying is to be applied.

For an "SR prediction block", a prediction image may be generated using the SR network, and a residual between the prediction image and the original image may be encoded. In other words, the SR prediction block may be the block to which prediction or SR prediction is to be applied.

For an "AR copy block", a prediction image may be generated using the AR network, and the generated prediction image may be copied. In other words, the AR copy block may be the block to which copying or AR copying is to be applied.

For an "AR prediction block", a prediction image may be generated using the AR network, and a residual between the prediction image and the original image may be encoded. In other words, the AR prediction block may be the block to which prediction or AR prediction is to be applied.

The above-described first region may be regarded as a "block corresponding to the first region". The above-described second region may be regarded as a "block corresponding to the second region". In other words, the description of the first region may be regarded as the description of each block corresponding to the first region. The description of the second region may be regarded as the description of each block corresponding to the second region.

Figure 23:
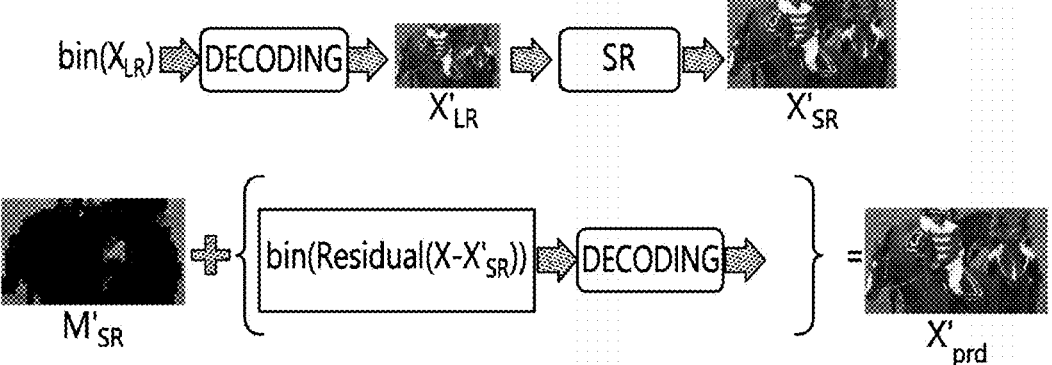
FIG. 23 illustrates a procedure for processing an image decoding method using a super-resolution recovered image according to an example.

FIG. 23 illustrates a procedure for processing an image decoding method using a super-resolution recovered image according to an example.

In FIG. 23, bin($X_{LR}$) may be a bitstream corresponding to a low-resolution image. $X'_{LR}$ may be a recovered low-resolution image. SR may indicate the generation of a recovered high-resolution image using a recovered low-resolution image. $X'_{SR}$ may be a recovered high-resolution image.

Further, $M'_{SR}$ may indicate a map extracted from the recovered high-resolution image. bin(Residual($X-X'_{SR}$)) may be a bitstream corresponding to a residual between an image and a reconstructed high-quality image. $X'_{prd}$ may be a reconstructed high-quality image that is the final result.

In an embodiment, the recovered high-resolution image may be replaced with a coding-distortion-corrected image. For example, $X'_{SR}$ may be a coding-distortion-corrected image.

Figure 24:
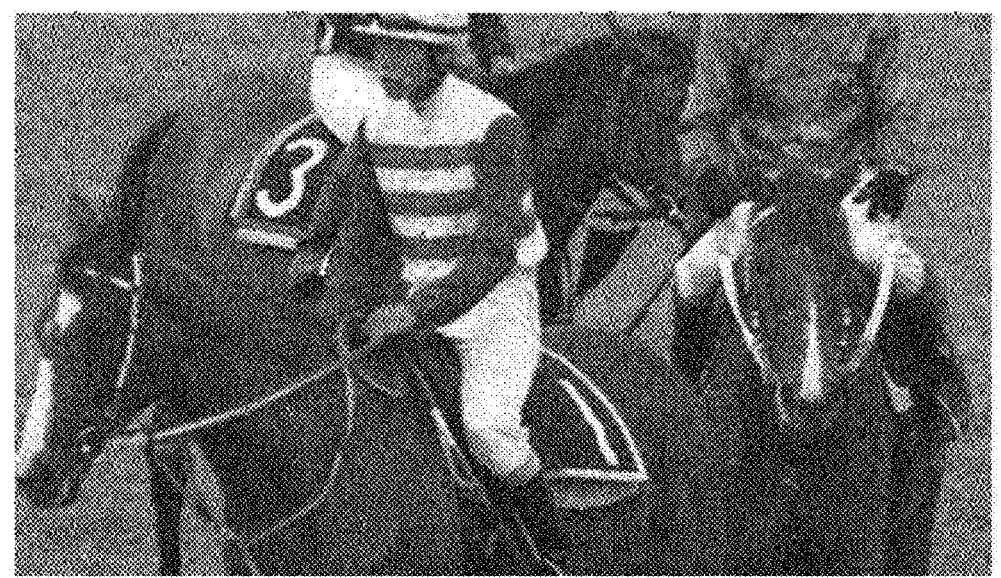
FIG. 24 illustrates an original image used for semantic segmentation according to an example.

FIG. 24 illustrates an original image used for semantic segmentation according to an example.

Figure 25:
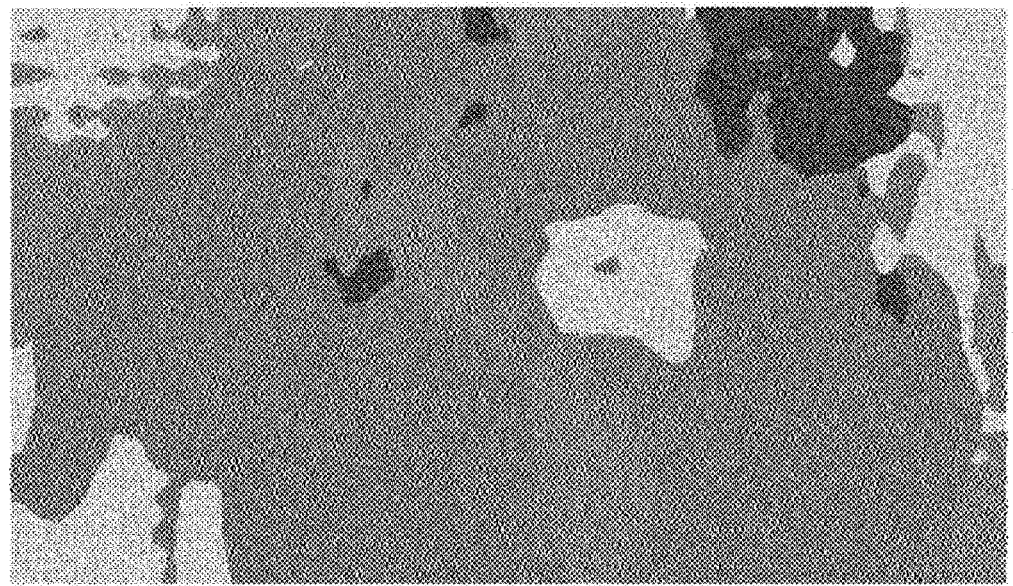
FIG. 25 illustrates the results of semantic segmentation according to an example.

FIG. 25 illustrates the results of semantic segmentation according to an example.

In an embodiment, an image of a map generated to segment regions may have a bit depth corresponding to the number of images to be segmented. In other words, the bit depth of pixels in the image of the map may correspond to the number of segmented regions indicated by the map.

For example, when an image is segmented into two regions, the map may be represented by a binary image.

First Segmentation Depending on Complexity of Image

As an embodiment of map generation, segmentation may be performed based on complexity of an image.

For each region, an encoding method for the corresponding region may be classified into a perception-oriented encoding method and a distortion-oriented encoding method. The correlation between the features of each encoding method and image complexity may be analyzed.

Traditionally, it is known that human beings are perceptively less sensitive to an error caused by the difference between pixels in a region having high complexity. Due to this characteristic, a map for segmenting regions depending on complexity may be generated.

In an embodiment, the complexity of an image may be determined based on the edge energy of the image. For example, the complexity may be calculated based on the magnitude of spatial information at the location of each pixel using a horizontal kernel and a vertical kernel of a Sobel filter.

For example, the average value of pieces of spatial information may be used as the complexity of the image, as shown in the following Equations 1 and 2.

$$SI_r = \sqrt{s_h^2 + s_v^2} \qquad \text{[Equation 1]}$$

$$SI_{mean} = \frac{1}{P}\sum SI_r \qquad \text{[Equation 2]}$$

When the encoding method is determined based on the complexity of the image, the processing unit 1610 and the processing unit 1710 may acquire a map corresponding to the original image by deriving the complexity of the original image, and may acquire a map for a low-quality image by deriving the complexity of the low-quality image. In other words, the above-described map may be the map corresponding to the original image and/or the map corresponding to the low-quality image.

Alternatively, the processing unit 1610 and the processing unit 1710 may acquire a map based on complexity in consideration of both the original image and the low-quality image.

By means of this method, an SR prediction image generation error attributable to a coding error may be reduced. That is, when the original image has a texture region having high complexity, but high frequency information in the texture region disappears due to a coding error, and only low-frequency information remains, recovery based on the SR network may have a limitation. However, when the region having such high complexity is encoded using a method for copying an SR prediction image without change, serious deterioration in image quality may occur in the corresponding region. Therefore, a map in which the complexity of a low-quality image is also taken into consideration may be generated, and SR prediction for encoding/decoding a residual signal between an original image and a prediction image, rather than SR copying, is used for the region having high complexity, and thus deterioration of image quality may be prevented.

Second Segmentation Depending on Complexity of Image

As an embodiment of map generation, a machine learning-based semantic segmentation technology may be used for semantic segmentation.

For example, entities such as a tree, sky, turf, grass, road, water, and a person that frequently appear in an image of nature may be designated as labels, and learning of the designated labels may be performed. Also, when an image is input as an original image after learning, the image may be segmented into regions on a pixel basis depending on the semantics of the image, as illustrated in FIG. 25.

Based on labels designated in semantic segmentation technology, a texture region and a non-texture region may be defined, and a map segmented into a texture region and a non-texture region may be generated. In other words, multiple regions indicated by the map may include a texture region and a non-texture region.

With the utilization of this technology, the category of an image may be determined based on an application.

Figure 26:
FIG. 26 illustrates an original image when a texture region is segmented.

FIG. 26 illustrates an original image when a texture region is segmented.

Figure 27:
FIG. 27 illustrates the results of segmentation of a texture region according to an example.

FIG. 27 illustrates the results of segmentation of a texture region according to an example.

In FIGS. 26 and 27, the results of generating a map in which regions are segmented so as to encode and/or decode an image using the method described in the foregoing embodiments are illustrated. That is, an original image may be segmented into trees corresponding to a texture region and the remaining region based on semantic segmentation labels of the original image.

The map in the embodiment may be generated using a neural network for automatically segmenting an image into a texture region and a non-texture region. Alternatively, the map in the embodiment may be generated using a neural network for automatically segmenting regions corresponding to features depending on the encoding/decoding method.

As described above, a map in which regions are segmented through semantic segmentation of a target image may be extracted. Such a target image may be either an original image or a recovered high-quality image generated by converting a recovered low-quality image. Further, the target image may indicate both the original image and the recovered high-quality image.

Furthermore, in order to solve the deterioration of image quality occurring when encoding/decoding and SR recovery or encoding/decoding and AR recovery are applied, semantic segmentation and edge power may be utilized when the map is generated.

For example, the edge power of an image may be calculated, and the map may be changed based on the edge power of the image.

Utilization of edge power will be described in detail below.

As illustrated in the drawing, the analysis of an image may be performed by applying semantic segmentation technology. By means of this analysis, respective regions to which copying and prediction are to be applied may be segmented.

Figure 28:
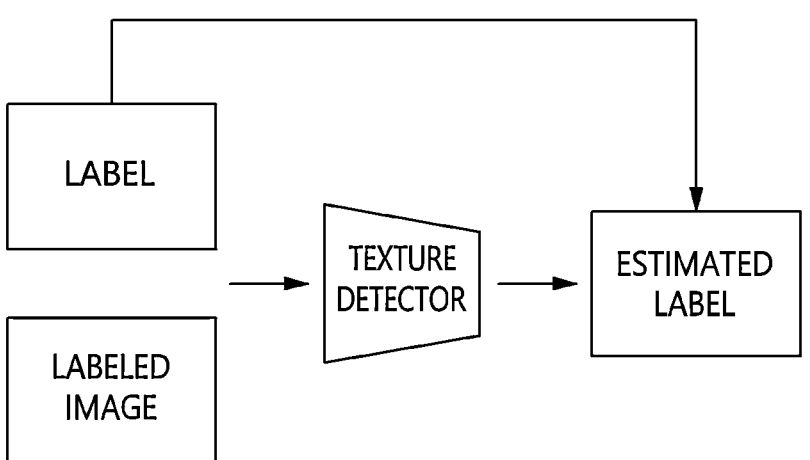
FIG. 28 illustrates the generation of a map using a neural network according to an example.

FIG. 28 illustrates the generation of a map using a neural network according to an example.

The map in which regions are segmented based on the foregoing encoding/decoding method may be generated using a neural network for automatically segmenting an actual input image into a texture region and a non-texture region.

In an embodiment, the neural network may perform learning so that the region of the actual texture is segmented on a block basis, and the map may be automatically extracted from the image using the trained neural network.

As illustrated in FIG. 28, a label and a labeled image may be input to a texture detector (i.e., the neural network). The texture detector may output an estimated label.

Here, loss may be cross entropy between the label and the estimated label.

The map in which regions are segmented according to the encoding/decoding method in the embodiment may be generated in consideration of the features of the encoding/decoding method. For example, the neural network may perform learning so that the image is segmented in consideration of the degree to which distortion attributable to encoding/decoding is visually perceived, and such a trained neural network may generate the map.

Figure 29:
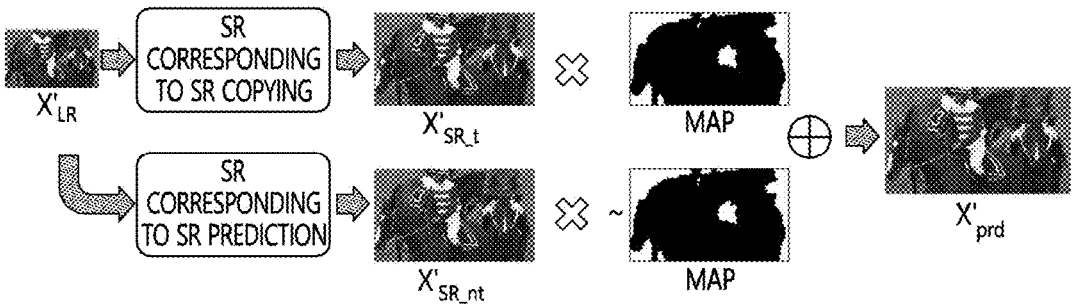
FIG. 29 illustrates the generation of a region-differential super-resolution recovered image according to an embodiment.

FIG. 29 illustrates the generation of a region-differential super-resolution recovered image according to an embodiment.

In an embodiment, the reconstructed image generated through decoding may be referred to as a "super-resolution recovered image".

When a super-resolution recovered image is generated, a low-resolution image input to the encoding apparatus 1600 and the decoding apparatus 1700 may be recovered to a high-resolution image using an SR network. Such a recovered high-resolution image may be used as a prediction image in encoding and decoding.

As described above with reference to the embodiments, when the recovered high-resolution image is generated, a method for generating a recovered high-resolution image according to the encoding method for an original image or the region of the original image may be determined. In other words, there can be selected a method for generating a recovered high-resolution image corresponding to the encoding method that is determined depending on which one of encoding methods is to be used for the original image or the region of the original image.

In FIG. 29, it is shown that SR is separately applied to a region to which SR copying is to be applied and a region to which SR prediction is to be applied.

For example, compared to an image having a small error from the standpoint of a Mean Squared Error (MSE), an image that is less influenced on subjective image quality even if the image is copied without change, may be more profitably used as a copy region for a reconstructed image. Therefore, as the copy region, a recovered high-resolution image may be generated using a method for producing fewer artifacts caused by encoding.

For example, when a difference (residual) from the original image is encoded using an existing method (e.g., a DCT for transforming the residual into a signal in a frequency domain), an image in which energy compaction can easily occur may be more profitably used as a prediction image for a reconstructed image. Therefore, in relation to a copy region, a recovered high-resolution image may be generated using the existing method.

As is exemplified, the encoding method may be applied differentially to respective regions depending on the features of respective multiple regions, and a recovered high-quality image to be used as a prediction image may also be differentially generated by means of this differential application. Alternatively, the recovered high-quality image may be segmented into multiple regions, and different recovery methods may be respectively applied to multiple regions when the recovered high-quality image is used.

For example, when an encoded low-quality image is an encoded low-resolution image, differential recovery from low-resolution to high resolution of the image may be performed based on the map, and a prediction image may be generated through differential recovery. Here, the term "differential recovery" may mean that different recovery methods are performed on respective multiple regions of the map.

For example, when the encoded low-quality image is an encoded low-bitrate image, differential correction may be performed on a coding error occurring in the image based on the map, and a prediction image may be generated through differential correction. Here, the term "differential correction" may mean that different correction methods are performed on respective multiple regions of the map.

For example, when a recovered high-quality image is generated using a recovered low-quality image, a Generative Adversarial Network (GAN) method may be used. By utilizing the GAN, a natural image may be generated through the learning of a neural network, rather than from the aspect of MSE. Such a recovered high-quality image may be used as a prediction image for the copy region. That is, the copy region of the recovered high-quality image may be generated through the GAN using the recovered low-quality image.

For example, for a prediction region in which a residual from the original image is encoded, a recovered high-quality image may be generated using an existing interpolation method so that compression of the residual signal is more desirably performed, and such a recovered high-quality image may be used as a prediction image corresponding to the prediction region. In other words, the prediction region of the recovered high-quality image may be generated through interpolation using the recovered low-quality image.

As illustrated in FIG. 29, multiple prediction images for multiple regions generated through segmentation may be combined based on the map.

In FIG. 29, $X'_{LR}$ may be a recovered low-resolution image.

For example, $X'_{SR\_t}$ may be a recovered high-resolution image generated by a recovery method corresponding to SR copying. For example, the recovery method corresponding to SR copying may be a GAN generation method using the recovered low-resolution image $X'_{LR}$. $X'_{SR\_t}$ may be a recovered high-resolution image for a region indicating a texture.

For example, $X'_{SR\_m}$ may be a recovered high-resolution image generated by a recovery method corresponding to SR prediction. For example, the recovery method corresponding to SR prediction may be interpolation to be used for the recovered low-resolution image $X'_{LR}$. $X'_{SR\_nt}$ may be a recovered high-resolution image for a region indicating a non-texture.

Using the map, a texture region is selected from $X'_{SR\_t}$, and a non-texture region is selected from $X'_{SR\_m}$, and thus a reconstructed high-quality image $X'_{prd}$, which is the final result, may be generated. For example, a region indicated by "0" in the map may be generated using $X'_{SR\_t}$, and a region indicated by "1" in the map may be generated using $X'_{SR\_nt}$.

Figure 30:
FIGS. 30 and 31 illustrate the deterioration of image quality in a low-bitrate environment according to an example.
Figure 31:

FIGS. 30 and 31 illustrate the deterioration of image quality in a low-bitrate environment according to an example.

FIG. 30 illustrates a reconstructed image for quantization parameter (qp) 37 in High Efficiency Video Coding (HEVC) according to an example.

FIG. 31 illustrates a reconstructed high-quality image for qp 37 in low-resolution HEVC according to an example.

In FIGS. 30 and 31. qp 37 may be a quantization parameter in encoding and/or decoding. Also, a circle in FIG. 31 represents a region in which severe blurring occurs.

When regions are segmented based on semantic segmentation, the encoding apparatus 1600 can access an original image itself, and thus the original image may be segmented by applying semantic segmentation technology to the original image, and may be segmented into a region for SR copying and a region for SR prediction.

However, the target of SR copying may be a recovered high-quality image generated using a recovered low-quality image rather than using the original image. Therefore, it may not be preferable to copy the recovered high-quality image without change.

In order to solve the copying problem, in an embodiment, the complexity of the image may be derived using edge power as an image quality control path.

In the encoding and/or decoding method in an embodiment, control between a bitrate and image quality may be performed by adjusting a quantization parameter. For example, in a low-bitrate environment, the quantization parameter may be set to a high value.

Because the bitstream of a low-quality image encoded using a high quantization parameter is input, an image used to generate a recovered high-quality image may be either an image that has already been encoded or an image to which encoding artifacts attributable to encoding are added.

Even if a recovered high-quality image is generated using the image to which coding artifacts are added, the quality of the recovered high-quality image used as a prediction image may already be deteriorated. In particular, in a recovered high-quality image, severe blurring may occur. When the recovered high-quality image in this state is copied without change as a prediction image using SR copying, deterioration of the quality of a reconstructed high-quality image generated using SR copying may be more severe. Therefore, in order to prevent this deterioration or the like, the method which will be described below may be used.

In the encoding and/or decoding method in the embodiment, a recovered low-resolution image that is given when encoding is performed in a low-bitrate environment may be assumed to be a bitstream generated through encoding in the low-bitrate environment.

When an image for a low-bitrate is recovered at high resolution, the image generated through this recovery may be completely different from the image recovered in a high-bitrate environment. Because the deterioration of image quality attributable to encoding of a low-resolution image has already occurred, severe blurring may appear in a high-frequency region, especially in a texture region, even if a low-resolution image is recovered at high resolution.

Figure 32:
FIG. 32 illustrates a region in which edge power of a threshold value or more occurs when a recovered high-quality image is generated using a low-bitrate low-resolution image is generated according to an example.

FIG. 32 illustrates a region in which edge power of a threshold value or more occurs when a recovered high-quality image is generated using a low-bitrate low-resolution image according to an example.

In FIG. 32, a recovered high-quality image generated using a low-bitrate low-resolution image according to an example is depicted. In FIG. 32, a circle indicates a region in which edge power equal to or greater than a threshold value occurs.

A region in which blurring appears may be excluded from the region to which copying is to be applied. In order to prevent the region in which blurring appears from being designated as the region to which SR copying is to be applied, the region in which blurring appears must be filtered out from a map. In other words, the map may show that the region in which blurring appears is not the region to which copying is to be applied.

For such exclusion, in an embodiment, a recovered high-quality image is generated using a recovered low-quality image, after which, for each of the blocks in the recovered high-quality image edge power of each block may be calculated.

SR copying may be selected for the region of the block only when the edge power of the block is greater than a specific threshold value. For example, when the edge power of the block is greater than the specific threshold value, SR copying may be selected for the region of the block. When the edge power of the block is less than or equal to the specific threshold value, SR prediction may be selected for the region of the block.

Edge power may be a value generated by dividing the number of edges in the block by the size of the block. Edge power may be generated as given by the following Equation 3.

$$\text{Edge Power} = \frac{\text{Number of Edge}}{N \times N} \qquad \text{[Equation 3]}$$

In Equation 3, N may be the width of the block or the height of the block.

"Number of Edge" may be the number of edges in the block.

N×N may be replaced with the multiplication of the width of the block by the height of the block.

As illustrated in FIG. 31, after a recovered high-quality image has been generated using a low-bitrate recovered low-quality image, edge power may be calculated for the recovered high-quality image, and only a region having edge power higher than the threshold value may be displayed. The region having edge power higher than the threshold value may be regarded and extracted as a texture region in which blurring appears after SR recovery.

FIGS. 33, 34, 35, and 36 illustrate images for segmenting texture regions according to an example.

Figure 33:
FIGS. 33, 34, 35, and 36 illustrate images for segmenting texture regions according to an example.

FIG. 33 illustrates an original image according to an example.

Figure 34:

FIG. 34 illustrates a recovered high-resolution image obtained through SR recovery according to an example.

Figure 35:

FIG. 35 illustrates edge power of the recovered high-resolution image according to an example.

Figure 36:
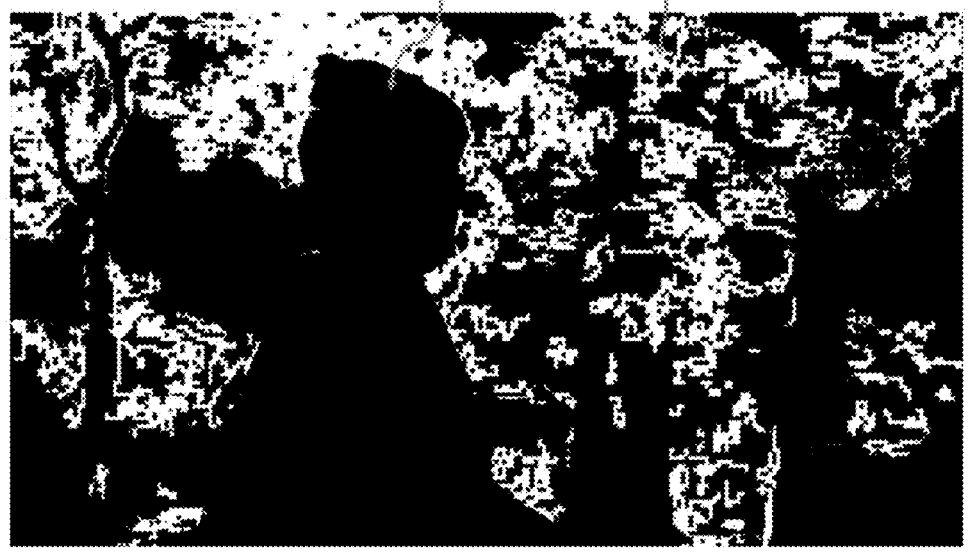

FIG. 36 illustrates the results of segmenting the recovered high-resolution image into regions according to an example.

A map for performing encoding differential for respective regions in an embodiment may be generated through a combination of multiple different maps. In other words, the map may be generated by combining 1) the above-described map based on semantic segmentation of an image with 2) an edge power map for improving deterioration of image quality attributable to encoding and SR recovery. The map generated through the combination may be used to generate a reconstructed image.

Here, the combination of multiple maps may be determined based on the values indicated by multiple maps for a specific region. For example, in the map generated through the combination of multiple maps, a value for a specific region of the map generated through the combination may be determined using a specific calculation formula that uses values for the specific regions of the multiple maps used for combination. For example, the specific calculation formula may be a calculation formula for deriving an average value, a median value, a minimum value, a maximum value, a mode value, etc.

In an example, for the regions to which SR copying is commonly applied in all of the multiple maps. SR copying may also be applied to the corresponding region in the map generated through the combination. For the region to which SR copying is not applied in at least one of the multiple maps, SR prediction may be applied to the corresponding region of the map generated through the combination.

Alternatively, for the regions to which SR prediction is commonly applied in all of the multiple maps, SR prediction may also be applied to the corresponding region in the map generated through combination. For the region to which SR prediction is not applied in at least one of the multiple maps, SR copying may be applied to the corresponding region of the map generated through the combination.

For example, for the regions to which AR copying is commonly applied in all of the multiple maps. AR copying may also be applied to the corresponding region in the map generated through combination. For the region to which AR copying is not applied in at least one of the multiple maps, AR prediction may be applied to the corresponding region of the map generated through the combination.

Alternatively, for the regions to which AR prediction is commonly applied in all of the multiple maps, AR prediction may also be applied to the corresponding region in the map generated through combination. For the region to which AR prediction is not applied in at least one of the multiple maps, AR copying may be applied to the corresponding region of the map generated through the combination.

In another embodiment in which information related to semantic segmentation is utilized, a smooth region such as that of sky may be additionally included as the region to which SR copying is to be applied. However, in a smooth region in the recovered high-quality image, a phenomenon in which blocking artifacts become more conspicuous may occur. In particular, in a low-bitrate environment, severe blocking artifacts may appear in the smooth region, and a phenomenon in which the blocking artifacts are mitigated may occur when SR copying from the recovered high-quality image is applied to the smooth region.

Due to these characteristics, the map may be corrected based on semantic classification in the image.

For example, using semantic classification based on semantic segmentation, the size of the region of the map to which SR copying is to be applied may be increased, and thus the number of bits for the image may be decreased through such an increase.

Figure 37:
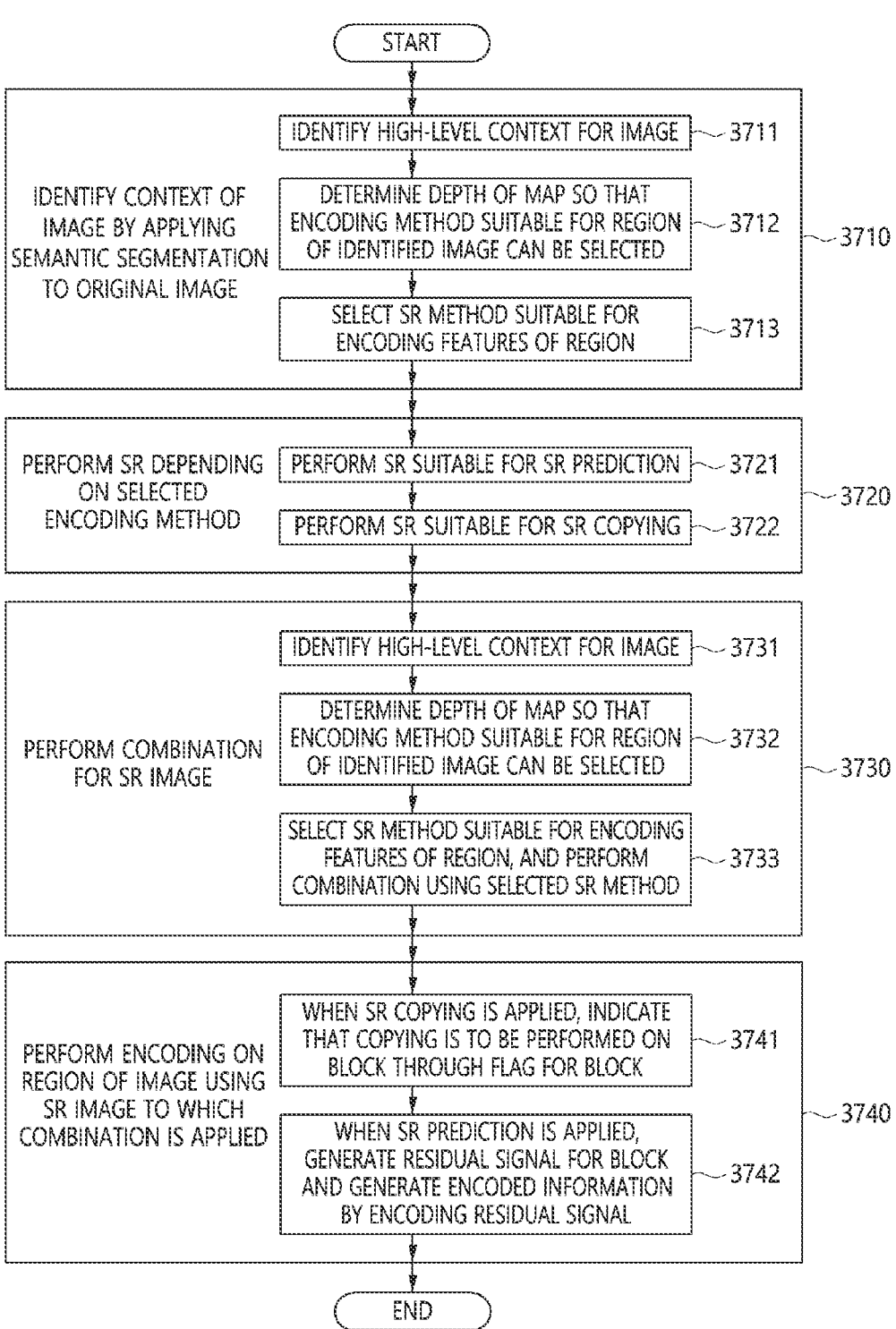
FIG. 37 is a flowchart illustrating the generation and use of a map for segmentation of regions according to an embodiment.

FIG. 37 is a flowchart illustrating the generation and use of a map for segmentation of regions according to an embodiment.

At step 3710, the context of an original image may be identified by applying semantic segmentation to the original image.

Step 3710 may include steps 3711, 3712, and 3713.

At step 3711, a high-level context for the image may be identified.

At step 3712, the depth of the map may be determined such that an encoding method suitable for the region of the identified image can be selected.

At step 3713, an SR method suitable for the encoding features of the region may be selected.

At step 3720, the SR method may be performed depending on the selected encoding method. An SR image may be generated based on the SR method.

Step 3720 may include steps 3721 and 3722.

At step 3721, an SR method suitable for SR prediction may be performed. In other words, an SR method suitably to be used as a prediction image of DCT-based transform encoding may be performed.

At step 3722, an SR method suitable for SR copying may be performed.

At step 3730, combination with the SR image at step 3620 may be performed.

At step 3731, a high-level context for the image may be identified.

At step 3732, the depth of the map may be determined such that an encoding method suitable for the region of the identified image can be selected.

At step 3733, an SR method suitable for the encoding features of the region may be selected, and combination using the selected SR method may be performed.

At step 3740, encoding of the region in the image may be performed using the SR image to which combination is applied.

Step 3740 may include steps 3741 and 3742. Steps 3741 and 3742 may be performed on each block in the SR image.

At step 3741, when SR copying is applied to the block, it may be indicated that copying is performed on the block through a flag of the block.

At step 3742, when SR prediction is applied to the block, a residual signal may be generated for the block, and encoded information may be generated by encoding the residual signal. The residual signal may be the result obtained by subtracting the SR image from the original image for the region of the block. Encoding may include transform and quantization including a frequency domain function.

The description of the above-described encoding may be applied to the encoding apparatus 1600, and it may be understood that the description of encoding is replaced with the description of decoding in the decoding apparatus 1700.

FIG. 38 illustrates the syntax for signaling the type of a base bitstream according to an example.

In an embodiment, one of the input to the encoding apparatus 1600 and/or the input to the decoding apparatus 1700 is a primarily encoded bitstream required to recover a high-quality image.

A base bitstream may be a primarily encoded bitstream required to recover a high-quality image.

The type of the base bitstream may indicate which one of a low-resolution bitstream pertaining a low-resolution image and a low-bitrate bitstream pertaining a low-bitrate image corresponds to the base bitstream.

The type of the base bitstream may indicate which one of the encoded low-resolution image and the encoded low-bitrate image is included in the base bitstream.

In FIG. 38, the syntax for signaling the type of the base bitstream is illustrated. In FIG. 38, as part of a sequence parameter set Raw Byte Sequence Payload (RBSP) syntax, the type of the base bitstream is included.

A syntax element indicating the type of the base bitstream (e.g., base_bitstream_type) may be included in a sequence parameter.

For example, the type of the base bitstream may be a flag, which may be signaled from the encoding apparatus 1600 to the decoding apparatus 1700. The syntax of the coding unit for interoperation with an existing encoding/decoding method may be corrected, as shown in FIG. 38.

The flag may correspond to the type information of the above-described first bitstream.

When the value of base_bitstream_type is "1", a prediction image may be generated through an SR network, and the prediction image may be encoded/decoded using the SR network. The use of the SR network may mean that SR copying and SR prediction are used.

When the value of base_bitstream_type is "0", a prediction image may be generated through an AR network, and the prediction image may be encoded/decoded using the AR network. The use of the AR network may mean that AR copying and AR prediction are used.

FIG. 39 illustrates signaling information for coding of SR copying and SR prediction according to an example.

After an image is segmented into semantic regions, signaling using a bitstream from the encoding apparatus 1600 to the decoding apparatus 1700 may be utilized so as to perform encoding and/or decoding that use a method suitable for the features of each region.

For example, the syntax of the target unit may be modified as exemplified in FIG. 39 so that, when copying is used, signaling using a flag may be used, and when prediction is used, signaling operates in conjunction with an existing encoding and/or decoding method. Here, the target unit may be a CU, as illustrated in the drawing. Further, the elements of the modified syntax may also be applied to other units, such as a CTU, a PU, and a TU.

The syntax elements exemplified in FIG. 39 may have the following meanings. x0 and y0 may be the coordinates of a unit. In other words, x0 and y0 may specify the unit to which elements are to be applied.

SRARcopy_flag[x0][y0]: SRARcopy_flag may be a flag indicating whether copying is to be applied to the unit.

For example, when the value of SRARcopy_flag of the unit is "1", SR copying may be applied to the unit. In other words, the unit in a reconstructed high-quality image may be generated by SR-copying a co-located block in a reference image. The reference image may be a recovered high-resolution image. For example, when the value of SRARcopy_flag of the unit is "0", SR prediction may be applied to the unit. In other words, the unit in the reconstructed high-quality image may be generated by decoding an encoded residual signal. The encoded residual signal may be generated by encoding the difference (residual) between the prediction image and the original image.

intra_chroma_pred_mode[x0][y0]: intra_chroma_pred_mode may indicate a color (chroma) encoding mode when SRAR prediction is applied to the unit.

rqt_root_cbf: rqt_root_cbf may indicate whether a transform_tree (transform_tree) syntax is present for the unit. For example, when the value of rqt_root_cbf is "1", the transform_tree_syntax for the unit may be present.

Figure 40:
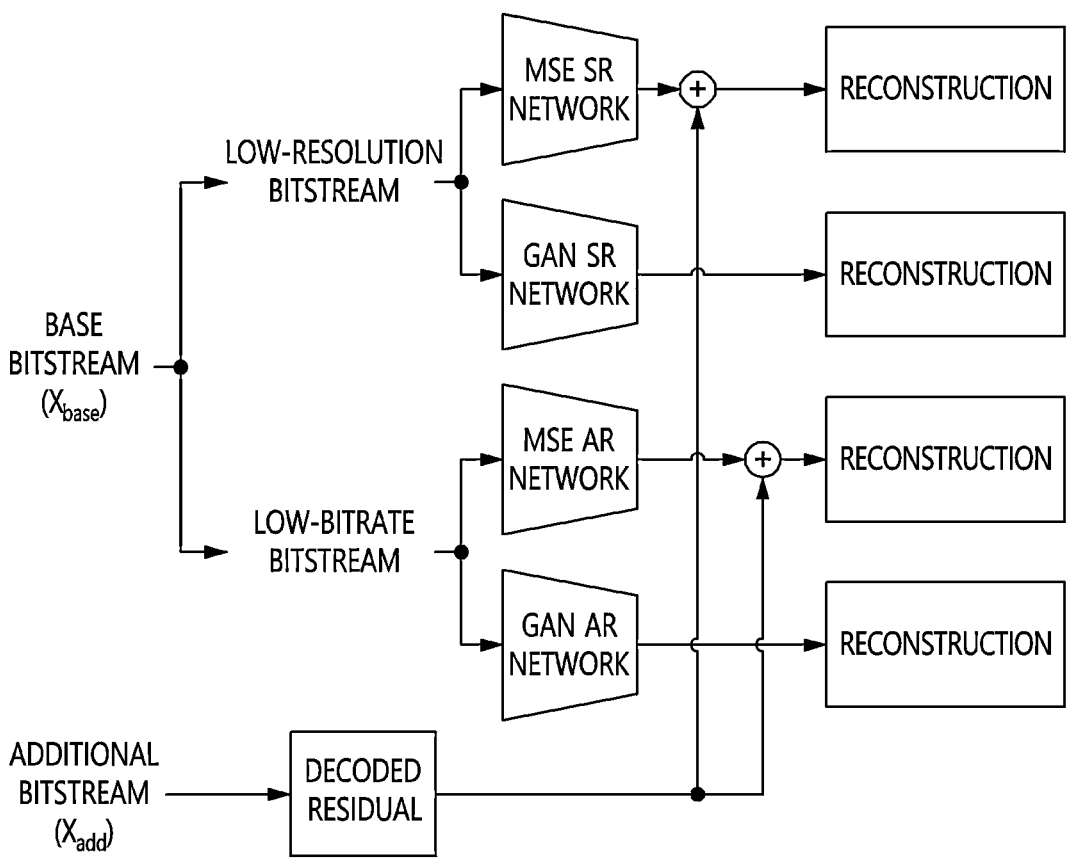
FIG. 40 illustrates the configuration of a decoding apparatus according to an embodiment.

FIG. 40 illustrates the configuration of a decoding apparatus according to an embodiment.

The type of a base bitstream may be a low-resolution bitstream or a low-bitrate bitstream.

The low-resolution bitstream may be a bitstream generated by encoding an image having resolution lower than that of an original image.

The low-bitrate bitstream may be a bitstream generated by encoding the original image at a low bitrate.

The type of the base bitstream may be identified by a flag in the base bitstream.

The flag indicating the type of the base bitstream may be signaled for each specific unit. The specific unit may be a sequence and/or a frame.

An additional bitstream may include encoded additional information about a reconstructed image generated using the base bitstream.

The additional bitstream may be selectively used. Whether the additional bitstream is to be used may be determined depending on the type of the base bitstream and the neural network used for the base bitstream.

Figure 41:
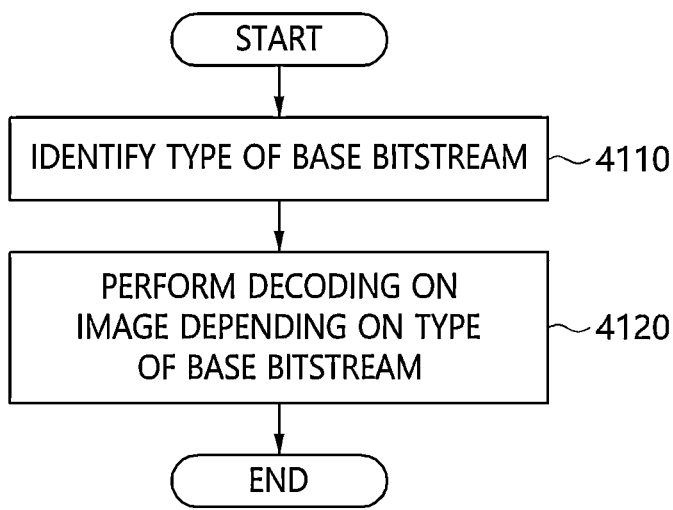
FIG. 41 is a flowchart of a decoding method using a base bitstream according to an embodiment.

FIG. 41 is a flowchart of a decoding method using a base bitstream according to an embodiment.

At step 4110, the processing unit 1710 may identify the type of a bitstream.

For example, the processing unit 1710 may check a flag for a specific unit, and may identify the type of a base bitstream depending on the value of the flag.

At step 4120, the processing unit 1710 may perform decoding on the image depending on the type of the base bitstream.

Decoding may be performed on each block of the image. In other words, the processing unit 1710 may perform decoding on the block of the image depending on the type of the base bitstream.

Figure 42:
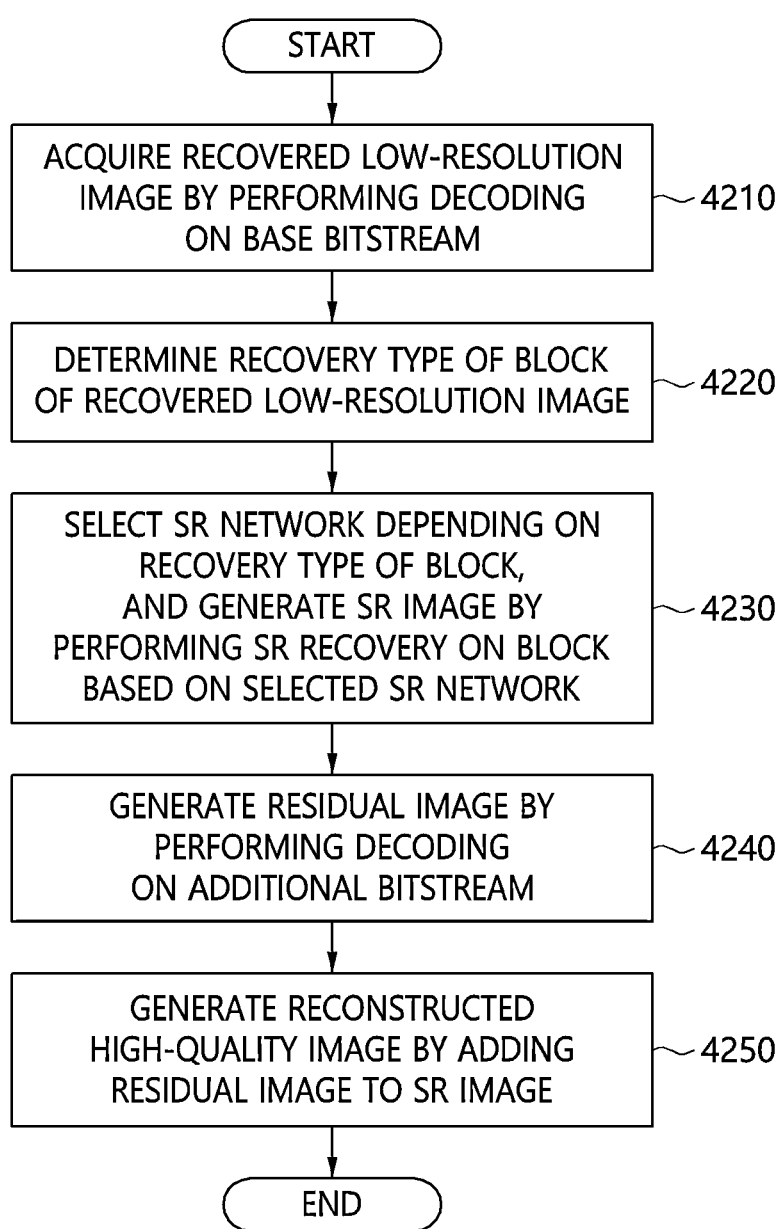
FIG. 42 is a flowchart of a decoding method for a low-resolution bitstream according to an example.

FIG. 42 is a flowchart of a decoding method for a low-resolution bitstream according to an example.

Step 4120, described above with reference to FIG. 41, may include steps 4210, 4220, 4230, 4240, and 4250.

In an embodiment, when a base bitstream is a low-resolution bitstream, steps 4210, 4220, 4230, 4240, and 4250 may be performed.

At step 4210, the processing unit 1710 may acquire a recovered low-resolution image by performing decoding on the base bitstream. The resolution of the recovered low-resolution image may be lower than that of the original image.

At step 4220, the processing unit 1710 may determine the recovery type of the block of the recovered low-resolution image. The recovery type may be determined for each of multiple blocks of the image.

For example, the recovery type of the block may indicate which one of an MSE SR block and a texture SR block corresponds to the block.

The MSE SR block may be the block to which SR prediction is to be applied. The texture SR block may be the block to which SR copying is to be applied.

At step 4230, the processing unit 1710 may select an SR network depending on the recovery type of the block, and may generate an SR image by performing SR recovery on the block based on the selected SR network. SR recovery may be recovery/reconstruction using SR copying and/or SR prediction.

When the block is an MSE SR block, an MSE SR network may be selected.

A recovered low-resolution image may be input to the MSE SR network. When the recovered low-resolution image (or the block of the recovered low-resolution image) is input, the MSE SR network may output an SR image (or the block of the SR image) having the same resolution as the original image. The SR image may be the above-described recovered high-resolution image.

When the block is a texture SR block, a GAN SR network may be selected.

A recovered low-resolution image may be input to the GAN SR network. When the recovered low-resolution image (or the block of the recovered low-resolution image) is input, the GAN SR network may output an SR image (or the block of the SR image) having the same resolution as the original image. The SR image may be the above-described recovered high-resolution image.

When the block is an MSE SR block, step 4240 and step 4250 may be performed.

At step 4240, the processing unit 1710 may perform decoding on an additional bitstream. The processing unit 1710 may generate a residual image (or a block of the residual image) by performing decoding on the additional bitstream.

At step 4250, the processing unit 1710 may generate a reconstructed high-quality image by adding the residual image to the SR image.

FIG. 43 is a flowchart of a decoding method for a low-bitrate bitstream according to an example.

Step 4120, described above with reference to FIG. 41, may include steps 4310, 4320, 4330, 4340, and 4350.

In an embodiment, when a base bitstream is a low-bitrate bitstream, steps 4310, 4320, 4330, 4340, and 4350 may be performed.

At step 4310, the processing unit 1710 may acquire a recovered low-bitrate image by performing decoding on the base bitstream. The bitrate of the recovered low-bitrate image may be lower than that of the original image.

At step 4320, the processing unit 1710 may determine the recovery type of the block of the recovered low-bitrate image. The recovery type may be determined for each of multiple blocks of the image.

For example, the recovery type of the block may indicate which one of an MSE AR block and a texture AR block corresponds to the block.

An MSE AR block may be the block to which AR prediction is to be applied. A texture AR block may be the block to which AR copying is to be applied.

At step 4330, the processing unit 1710 may select an AR network depending on the recovery type of the block, and may generate an AR image by performing AR recovery on the block based on the selected AR network. AR recovery may be recovery/reconstruction using AR copying and/or AR prediction.

When the block is the MSE AR block, an MSE AR network may be selected.

A recovered low-resolution image may be input to the MSE AR network. When the recovered low-resolution image (or the block of the recovered low-resolution image) is input, the MSE AR network may output an AR image (or the block of the AR image) in which coding artifacts are eliminated. The AR image may be the above-described coding-distortion-corrected image.

When the block is the texture AR block, a GAN AR network may be selected.

A recovered low-resolution image may be input to the GAN AR network. When the recovered low-resolution image (or the block of the recovered low-resolution image) is input, the GAN AR network may output an image from which coding artifacts are eliminated and in which a high-frequency region is recovered (or the block of the image from which coding artifacts are eliminated and in which the high-frequency region is recovered). The image from which coding artifacts are eliminated and in which the high-frequency region is recovered may be the above-described coding-distortion-corrected image.

When the block is the MSE AR block, step 4340 and step 4350 may be performed.

At step 4340, the processing unit 1710 may perform decoding on an additional bitstream. The processing unit 1710 may generate a residual image (or the block of the residual image) by performing decoding on the additional bitstream.

At step 4350, the processing unit 1710 may generate a reconstructed high-quality image by adding the residual image to the AR image from which coding artifacts are eliminated.

The above embodiments may be performed by the encoding apparatus 1600 and by the decoding apparatus 1700 using methods identical and/or corresponding to each other. Also, for encoding and/or decoding of an image, a combination of one or more of the above embodiments may be used.

The order of application of the embodiments may be different from each other in the encoding apparatus 1600 and the decoding apparatus 1700. Alternatively, the order of application of the embodiments may be (at least partially) identical to each other in the encoding apparatus 1600 and the decoding apparatus 1700.

The order of application of the embodiments may be different from each other in the encoding apparatus 1600 and the decoding apparatus 1700, or the order of application of the embodiments may be identical to each other in the encoding apparatus 1600 and the decoding apparatus 1700.

The embodiments may be performed on each of a luma signal and a chroma signal. The embodiments may be equally performed on the luma signal and the chroma signal.

The form of a block to which the embodiments of the present disclosure are applied may have a square or non-square shape.

The embodiments of the present disclosure may be applied according to the size of at least one of a target block, a coding block, a prediction block, a transform block, a current block, a coding unit, a prediction unit, a transform unit, a unit, and a current unit. Here, the size may be defined as a minimum size and/or a maximum size so that the embodiments are applied, and may be defined as a fixed size at which the embodiments are applied. Further, in the embodiments, a first embodiment may be applied to a first size, and a second embodiment may be applied to a second size. That is, the embodiments may be compositely applied according to the size. Further, the embodiments of the present disclosure may be applied only to the case where the size is equal to or greater than the minimum size and is less than or equal to the maximum size. That is, the embodiments may be applied only to the case where a block size falls within a certain range.

Further, the embodiments of the present disclosure may be applied only to the case where the condition of the size equal to or greater than a minimum size and the condition of the size less than or equal to a maximum size are satisfied, wherein each of the minimum size and the maximum size may be the size of one of the blocks described above in the embodiments and the units described above in the embodiments. That is, the block that is the target of the minimum size may be different from the block that is the target of the maximum size. For example, the embodiments of the present disclosure may be applied only to the case where the size of the target block is equal to or greater than the minimum size of the block and less than or equal to the maximum size of the block.

For example, the embodiments may be applied only to the case where the size of the target block is equal to or greater than 8×8. For example, the embodiments may be applied only to the case where the size of the target block is equal to or greater than 16×16. For example, the embodiments may be applied only to the case where the size of the target block is equal to or greater than 32×32. For example, the embodiments may be applied only to the case where the size of the target block is equal to or greater than 64×64. For example, the embodiments may be applied only to the case where the size of the target block is equal to or greater than 128×128. For example, the embodiments may be applied only to the case where the size of the target block is 4×4. For example, the embodiments may be applied only to the case where the size of the target block is less than or equal to 8×8. For example, the embodiments may be applied only to the case where the size of the target block is less than or equal to 16×16. For example, the embodiments may be applied only to the case where the size of the target block is equal to or greater than 8×8 and less than or equal to 16×16. For example, the embodiments may be applied only to the case where the size of the target block is equal to or greater than 16×16 and less than or equal to 64×64.

The embodiments of the present disclosure may be applied depending on a temporal layer. In order to identify a temporal layer to which the embodiments are applicable, a separate identifier may be signaled, and the embodiments may be applied to the temporal layer specified by the corresponding identifier. Here, the identifier may be defined as the lowest (bottom) layer and/or the highest (top) layer to which the embodiments are applicable, and may be defined as being indicating a specific layer to which the embodiments are applied. Further, a fixed temporal layer to which the embodiments are applied may also be defined.

For example, the embodiments may be applied only to the case where the temporal layer of a target image is the lowermost layer. For example, the embodiments may be applied only to the case where the temporal layer identifier of a target image is equal to or greater than 1. For example, the embodiments may be applied only to the case where the temporal layer of a target image is the highest layer.

A slice type or a tile group type to which the embodiments of the present invention to which the embodiments are applied may be defined, and the embodiments of the present invention may be applied depending on the corresponding slice type or tile group type.

In the above-described embodiments, it may be construed that, during the application of specific processing to a specific target, assuming that specified conditions may be required and the specific processing is performed under a specific determination, a specific coding parameter may be replaced with an additional coding parameter when a description has been made such that whether the specified conditions are satisfied is determined based on the specific coding parameter, or such that the specific determination is made based on the specific coding parameter. In other words, it may be considered that a coding parameter that influences the specific condition or the specific determination is merely exemplary, and it may be understood that, in addition to the specific coding parameter, a combination of one or more additional coding parameters functions as the specific coding parameter.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments include examples in various aspects. Although all possible combinations for indicating various aspects cannot be described, those skilled in the art will appreciate that other combinations are possible in addition to explicitly described combinations. Therefore, it should be understood that the present disclosure includes other replacements, changes, and modifications belonging to the scope of the accompanying claims.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software.

A computer-readable storage medium may include information used in the embodiments of the present disclosure. For example, the computer-readable storage medium may include a bitstream, and the bitstream may contain the information described above in the embodiments of the present disclosure.

The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

The invention claimed is:

1. An encoding method, comprising:

determining a plurality of regions for one or more images comprised in a video; and performing encoding on the plurality of regions, wherein different encoding methods are used for the plurality of regions, respectively, wherein for each region of the plurality of regions, an encoding method selected from the different encoding methods determines whether scaling is applied to a region to generate a higher-resolution image of the region, wherein the higher-resolution image is generated using a neural network which uses input information comprising a coding parameter for a quantization parameter, wherein outputs from a plurality of neural networks are used as inputs of an operation to generate the higher-resolution image by combining the outputs from the plurality of neural networks, respectively, wherein each of the plurality of networks uses an image as input, wherein types of a plurality of images used respectively as inputs to the plurality of neural networks are different, wherein the plurality of images comprises a first image and a second image, wherein the plurality of neural networks comprises a first neural network which uses a reconstructed image as input and a second neural network which uses a prediction image as input, wherein the prediction image is an image generated by at least one of intra prediction and inter prediction, wherein the reconstructed image is an image generated based on the prediction image and a reconstructed residual image, and wherein a bitstream comprising first image information for the first image and second image information for the second image is generated.

2. The encoding method of claim 1, wherein encoding is performed on the plurality of regions using different neural networks, respectively.

3. A decoding method, comprising:

receiving a bitstream;

determining a plurality of regions for one or more images comprised in a video; and performing decoding on the plurality of regions, wherein different decoding methods are used for the plurality of regions, respectively, wherein for each region of the plurality of regions, a decoding method selected from the different decoding methods determines whether scaling is applied to a region to generate a higher-resolution image of the region, wherein the higher-resolution image is generated using a neural network which uses input information comprising a coding parameter for a quantization parameter, wherein outputs from a plurality of neural networks are used as inputs of an operation to generate the higher-resolution image by combining the outputs from the plurality of neural networks, respectively, wherein each of the plurality of networks uses an image as input, wherein types of a plurality of images used respectively as inputs to the plurality of neural networks are different, wherein the plurality of images comprises a first image and a second image, wherein the plurality of neural networks comprises a first neural network which uses a reconstructed image as input and a second neural network which uses a prediction image as input, wherein the prediction image is an image generated by at least one of intra prediction and inter prediction, wherein the reconstructed image is an image generated based on the prediction image and a reconstructed residual image, and wherein the bitstream comprises first image information for the first image and second image information for the second image.

4. The encoding method of claim 1, wherein for each region of the plurality of regions, a neural network is selected for a region.

5. The encoding method of claim 1, wherein the higher-resolution image is generated by applying the scaling to the reconstructed image.

6. The encoding method of claim 5, wherein the higher-resolution image is generated based on a plurality of low-quality images and the plurality of neural networks into which the plurality of low-quality images are input, respectively.

7. The encoding method of claim 1, wherein the higher-resolution image is generated using a neural network which uses input information comprising a coding parameter for a slice type.

8. The encoding method of claim 1, wherein scaling-related information for the scaling is determined by a formula using a coding parameter, and wherein the scaling-related information comprises at least one of a scaling size of the scaling and a scaling method of the scaling.

9. The encoding method of claim 8, wherein the scaling-related information is pre-set in an encoding apparatus performing the encoding method.

10. The encoding method of claim 8, wherein the bitstream comprises the scaling-related information.

11. The encoding method of claim 8, wherein the scaling-related information is signaled via the bitstream from an encoding device performing the encoding method to a decoding device performing a decoding method using the bitstream.

12. The encoding method of claim 1, wherein different scaling sizes are applied to the plurality of regions, respectively.

13. The encoding method of claim 1, wherein the bitstream comprises information indicating the plurality of regions.

14. A method for sending a bitstream, the method comprising:

sending the bitstream comprising first image information for a first image and second image information for a second image, wherein the first information and the second information is information used to perform decoding on a plurality of regions, wherein the decoding comprises to determine the plurality of regions for one or more images comprised in a video wherein different decoding methods are used for the decoding on the plurality of regions, respectively, wherein, in the decoding, for each region of the plurality of regions, a decoding method selected from the different decoding methods determines whether scaling is applied to a region to generate a higher-resolution image of the region, wherein the decoding generates the higher-resolution image using a neural network which uses input information comprising a coding parameter for a quantization parameter, wherein the decoding generates the higher-resolution image by combining outputs from a plurality of neural networks, wherein each of the plurality of networks uses an image as input, wherein types of a plurality of images used respectively as inputs to the plurality of neural networks are different, and wherein the plurality of images comprises the first image and the second image.

15. A non-transitory computer-readable recording medium storing program instructions for transmitting a bitstream, the program instructions comprising:

an instruction to perform generating the bitstream; and an instruction to transmit the bitstream, wherein the generating the bitstream comprises:

generating the bitstream comprising first image information for a first image and second information for a second image, generated by a video encoding method, wherein the video encoding method comprises:

determining a plurality of regions for one or more images comprised in a video; and performing encoding on the plurality of regions, wherein different encoding methods are used for the plurality of regions, respectively, wherein for each region of the plurality of regions, an encoding method selected from the different encoding methods determines whether scaling is applied to a region to generate a higher-resolution image of the region, and wherein the higher-resolution image is generated using a neural network which uses input information comprising a coding parameter for a quantization parameter, wherein the higher-resolution image is generated by combining outputs from a plurality of neural networks, wherein each of the plurality of networks uses an image as input, wherein types of a plurality of images used respectively as inputs to the plurality of neural networks are different, and wherein the plurality of images comprises the first image and the second image.

* * * * *